United States Patent
Smolyaninov et al.

(10) Patent No.: US 12,267,114 B1
(45) Date of Patent: Apr. 1, 2025

(54) APPARATUS, METHODS AND SYSTEMS FOR SURFACE ELECTROMAGNETIC WAVE (SEW)-BASED UNDERWATER AND UNDERGROUND COMMUNICATION AND IMAGING

(71) Applicant: Saltenna LLC, McLean, VA (US)

(72) Inventors: Igor Smolyaninov, Columbia, MD (US); Quirino Balzano, Annapolis, MD (US)

(73) Assignee: Saltenna LLC, McLean, VA (US)

( * ) Notice: Subject to any disclaimer, the term of this patent is extended or adjusted under 35 U.S.C. 154(b) by 346 days.

(21) Appl. No.: 17/570,968

(22) Filed: Jan. 7, 2022

Related U.S. Application Data

(60) Provisional application No. 63/155,937, filed on Mar. 3, 2021, provisional application No. 63/134,918, filed on Jan. 7, 2021.

(51) Int. Cl.
    H04B 13/02    (2006.01)
    H04B 1/04     (2006.01)
    H04B 1/18     (2006.01)

(52) U.S. Cl.
    CPC ........... *H04B 13/02* (2013.01); *H04B 1/0483* (2013.01); *H04B 1/18* (2013.01)

(58) Field of Classification Search
    CPC .......... H04B 1/0483; H04B 1/18; H04B 3/00; H04B 3/02; H04B 5/00; H04B 5/20; H04B 5/40; H04B 13/00; H04B 13/02; G01S 17/02; G01S 17/04; G01S 17/06; G01S 17/89
    See application file for complete search history.

(56) References Cited

U.S. PATENT DOCUMENTS

| | | | |
|---|---|---|---|
| 4,008,469 A | 2/1977 | Chapman | |
| 5,841,288 A | 11/1998 | Meaney | |
| 6,218,993 B1 | 4/2001 | Chao | |
| 9,000,994 B2 * | 4/2015 | Shylo | G01S 13/89 |
| | | | 343/762 |
| 10,051,488 B1 | 8/2018 | Vannucci | |

(Continued)

FOREIGN PATENT DOCUMENTS

CN          113206388 A    *   8/2021   ............... G01V 3/12

OTHER PUBLICATIONS

Ran et al., "Imaging System Based On Phase Modulation Active Frequency Selection Surface And Imaging Method Thereof", Aug. 3, 2021, CN 113206388 A—English Text. (Year: 2021).*

(Continued)

*Primary Examiner* — Quochien B Vuong
(74) *Attorney, Agent, or Firm* — Esplin & Associates, PC

(57) ABSTRACT

Embodiments described herein include an apparatus including an antenna and a processor operatively coupled to the antenna. The processor can generate an input signal and send the input signal to the antenna. The antenna can, in response to the input signal, transmit first surface electromagnetic signals along an interface between a first medium and a second medium. The antenna can receive second surface electromagnetic signals in response to the first surface electromagnetic signals being scattered by an object disposed in the first medium. The processor can produce an image of the object based on the first surface electromagnetic signals and the second surface electromagnetic signals.

20 Claims, 56 Drawing Sheets

(56) References Cited

U.S. PATENT DOCUMENTS

| | | | |
|---|---|---|---|
| 10,555,249 | B2 | 2/2020 | Barzegar |
| 10,698,079 | B2 | 6/2020 | Kushnir |
| 10,805,013 | B2 | 10/2020 | Smolyaninov |
| 10,976,461 | B2 * | 4/2021 | Arumugam ......... G01S 13/9011 |
| 11,121,896 | B1 | 9/2021 | Bendlin |
| 11,125,866 | B2 * | 9/2021 | Sumi ................. G01S 7/52046 |
| 11,408,982 | B2 * | 8/2022 | Okada .................. G01S 7/4865 |
| 2003/0001793 | A1 | 1/2003 | Park |
| 2003/0135326 | A1 | 7/2003 | Brown |
| 2004/0201531 | A1 | 10/2004 | Fujimura |
| 2007/0146219 | A1 | 6/2007 | Rhodes |
| 2008/0061997 | A1 | 3/2008 | Miyashita |
| 2016/0015993 | A1 | 1/2016 | Turner |
| 2016/0171790 | A1 | 6/2016 | Abraham |
| 2017/0030853 | A1 | 2/2017 | Hodges, Jr. |
| 2018/0198536 | A1 | 7/2018 | Smolyaninov |
| 2019/0150072 | A1 | 5/2019 | Barzegar |
| 2020/0274239 | A1 | 8/2020 | Amano |
| 2024/0089743 | A1 | 3/2024 | Smolyaninov |

OTHER PUBLICATIONS

"On the ionospheric conductivity", 3 pages, published online on Feb. 22, 2010 according to Wayback Machine, Retrieved online, 2021 via: http://wdc.kugi.kyoto-u.ac.jp/ionocond/exp/icexp.html.

Akinci et al. "Tuning the group velocity of light for 1D photonic crystal with defect", IARJSET 3, 2016, p. 155-157.

Alu et al. "Epsilon-near-zero metamaterials and electromagnetic sources: Tailoring the radiation phase pattern", Physical Review, B 75, 2007, 155410.

Applin et al. "Ultraviolet spectral reflectance of carbonaceous materials", Icarus, vol. 307, 2018, p. 40-82.

Auty, R. H. Cole, "Dielectric properties of ice and solid D2O", Journal of Chemical Physics, vol. 20, No. 8, 1952, p. 1309-1314.

Balzano Q. et al. "Field and temperature gradients from short conductors in a dissipative medium," International Journal of Antennas and Propagation, vol. 2007, Article ID 57670 (9 pages).

Balzano Q. et al. "The Near Field of Dipole Antennas", Part 1—Theory, IEEE Transactions on Vehicular Technology, vol. VT-30, No. 4, 1981, p. 161-174.

Balzano Q. et al. "The near field of helical antennas," IEEE Trans. on Vehicular Technology, vol. 31, No. 4, 1982, p. 173-185.

Bethe, H. A., Theory of diffraction by small holes, the Physical Review, vol. 66, No. 7 and 8, 1944, p. 163-182.

Cheng, D. K., Fundamentals of Engineering Electromagnetics, Chapter 8, London, Pearson, 1992, 53 pages.

Ditkin and A.P. Prudnikov, "Integral Transforms and Operational Calculus", Pergamon Press, First Edition, 1965, p. 400-412 (eq. 9,302.).

Drude P., "Zur elektronentheorie der metalle," Annalen der Physik, vol. 306, 566-613, 1900, with machine translation, 96 pages.

Ebbesen, T. W. et al. "Extraordinary optical transmission through sub-wavelength hole arrays," Nature, vol. 391, 1998, p. 667-669.

Elliott J. et al. "Polarization control of optical transmission of a periodic array of elliptical holes in a metal film," Optics Letters, vol. 29, 2004, p. 1414-1416.

Giordano et al. "Phase-resolved terahertz self-detection near-field microscopy," Optic Express, vol. 26, No. 14, 2018, 18423-18435.

Harrington, "Time-Harmonic Electromagnetic Fields", Mc-Graw-Hill Book Company, 1961, N.Y., N.Y. Chapter 5, p. 198-263, p. 331-338.

Jordan et al. "Radiation", Electromagnetic Waves and Radiating Systems, Prentice-Hall, Second Edition, 1968, Chapter 10, p. 311-343.

Lezec, H. J., et al. "Beaming light from a subwavelength aperture," Science, vol. 297, 2002, p. 820-822.

Li, Y. & Oldenburg, D. W., "Aspects of Charge Accumulation in d.c. Resistivity Experiments", Geophysical Prospecting, 39, 1991, p. 803-826.

Lianlin L. et al. "Towards super-resolution microwave imaging: General framework", 10th International Symposium on Antennas, Propagation & EM Theory (ISAPE), 2012, 4 pages.

McLachlan, Bessel Functions for Engineers, second edition, 1961, Oxford University Press, London, U.K. p. 157, 195, 227, 228, eq.6-7, eq. 76-77, 10 pages.

Michalski et al. "The Sommerfeld half-space problem revisited: from radio frequencies and Zenneck waves to visible light and Fano modes" Journal of Electromagnetic Waves and Applications, 30, 2016, p. 1-42.

Midi et al. "Broadband Complex Dielectric Constants of Water and Sodium Chloride Aqueous Solutions with Different DC Conductivities", IEEJ Transactions on Electrical and Electronic Engineering, 9, 2014, S8-S12.

Mitrofanov et al. "Near-field terahertz probes with room-temperature nanodetectors for subwavelength resolution imaging," Science Reports, vol. 7, 2017, 44240, 10 pages.

Muller et al. "Mapping the magnetic susceptibility and electric conductivity of marine surficial sediments by benthic EM profiling", Geophysics, vol. 77, No. 1, 2012, p. 1-14.

Nie et al. "Seabed-Rock-Layer Electromagnetic Communication Channel Model with Low Path Loss Based on Evanescent Wave", Radioengineering, vol. 27, No. 2, 2018, p. 431-439.

Pethig "Interfacial Dielectric Phenomena in Biological Systems", John Wiley & Sons, 1979, Chapter 5, p. 167-168.

Politano et al. "Optoelectronic devices, plasmonics and photonics with topological insulators," APL Materials, vol. 5, 2017, 035504 (11 pages).

Politano et al. "The influence of chemical reactivity of surface defects on ambient-stable InSebased nanodevices," Nanoscale, vol. 8, 2016, p. 8474-8479.

Politano et al. "The role of surface chemical reactivity in the stability of electronic nanodevices based on two-dimensional materials 'beyond graphene' and topological insulators," Flat Chem., vol. 1, 2017, p. 60-64.

Price "ELF electromagnetic waves from lightning: the Schumann Resonances", Atmosphere 7, 2016, 116 (20 pages).

Sanne et al. "Radio frequency transistors and circuits based on CVD MoS2," Nano Letters, vol. 15, 2015, p. 5039-5045.

Schwalenberg et al. "The effect of seafloor topography on magnetotelluric fields: An analytical formulation confirmed with numerical results", Geophys. J. Int. 159, 2004, p. 607-621.

Shaw et al. "Experimental investigations of electromagnetic wave propagation in seawater", European Microwave Conference, Manchester (UK), 2006, p. 572-575.

Smith G. "Loop Antennas", Antenna Engineering Handbook, John L. Volakis ed. Fourth edition, McGraw-Hill, 2007, Chapter 5, p. 5_1-5_25.

Smolyaninov et al. "Development of Broadband Underwater Radio Communication for Application in Unmanned Underwater Vehicles", Journal of Marine Science and Engineering 8, 2020, p. 370 (10 pages).

Smolyaninov et al. "Experimental study of surface plasmon scattering by individual surface defects." Physical Review B, 1997, 56, p. 1601-1611.

Smolyaninov et al. "Imaging of surface plasmon scattering by lithographically created individual surface defects," Physical Review Letters, vol. 77, 1996, p. 3877-3880.

Smolyaninov et al. "Optical control of photon tunneling through an array of nanometer scale cylindrical channels," Physical Review B, vol. 66, 2002, p. 205414 (5 pages).

Smolyaninov et al. "Plasmon-polaritons on the surface of a pseudosphere", Physical Review B 72, 2005, p. 165412 (5 pages).

Smolyaninov et al. "Surface Wave Based Underwater Radio Communication", IEEE Antennas and Wireless Propagation Letters, vol. 17, Issue: 12, 2018, p. 2503-2507.

Smolyaninova et al. "Self-assembled tunable photonic hyper-crystals", Scientific Reports 4, 2014, p. 5706 (9 pages).

Tyler et al. "Electrical conductivity of the global ocean", Earth, Planets and Space 69, 2017, p. 156-166.

Viti, L et al. "Black phosphorus nanodevices at terahertz frequencies: Photodetectors and future challenges," APL Materials, vol. 5, 2017, p. 035602 (11 pages).

(56) References Cited

OTHER PUBLICATIONS

Volakis et al. Antenna Theory Analysis and Design, John Wiley & Sons, Third Edition, 2005, p. 231-281.
Wang et al. "Black phosphorus radio-frequency transistors," Nano Letters, vol. 14, 2014, p. 6424-6429.
Zayats A. V. et al. "Nano-optics of surface plasmon-polaritons," Physics Reports, vol. 408, 2005, p. 131-314.
Zheng et al. "Analytical solution for band-gap structures in photonic crystal with sinusoidal period", Physics Letters A 321, 2004, p. 120-126.
Toledano, et al. "Experimental Demonstration of Multigigabit Data Communication Using Surface Waves on Twisted-Pair Cables" IEEE Transactions On Communications, vol. 70, No. 9, Sep. 2022 (11 pages).

\* cited by examiner

Transitional region between seawater medium and air medium 207

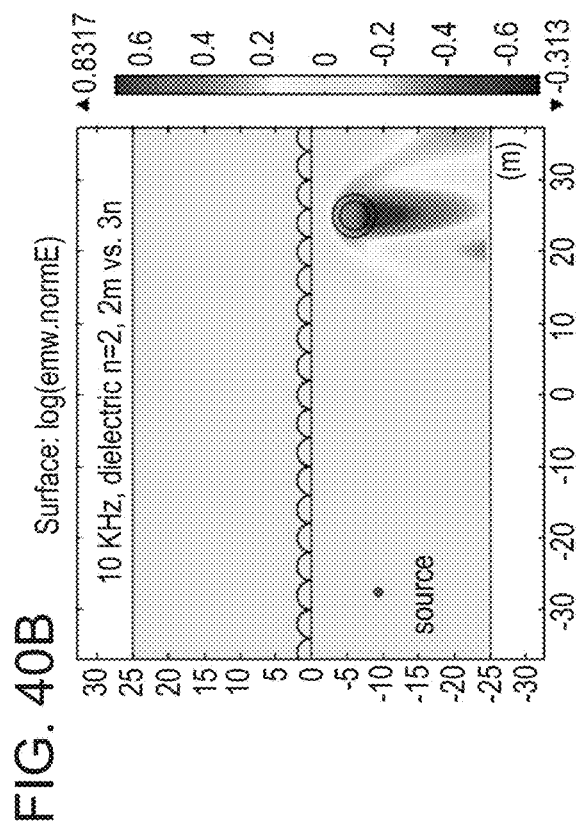
FIG. 40B
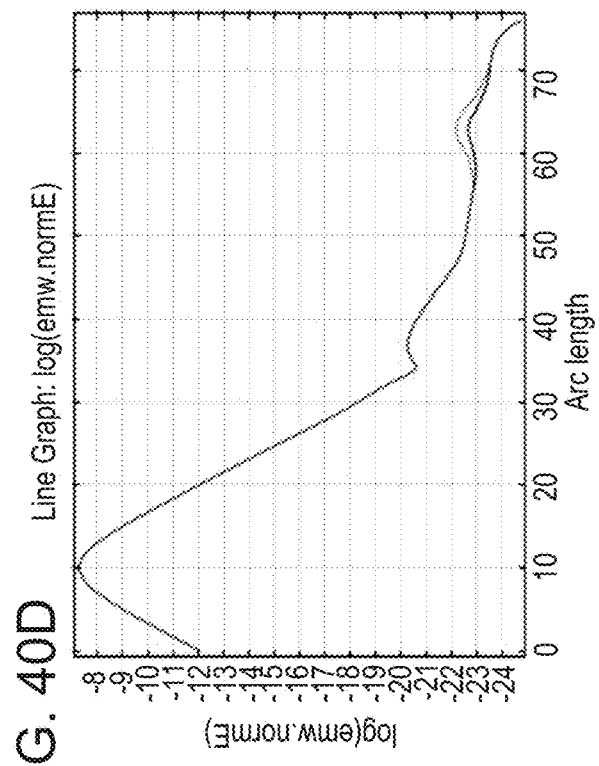
FIG. 40D
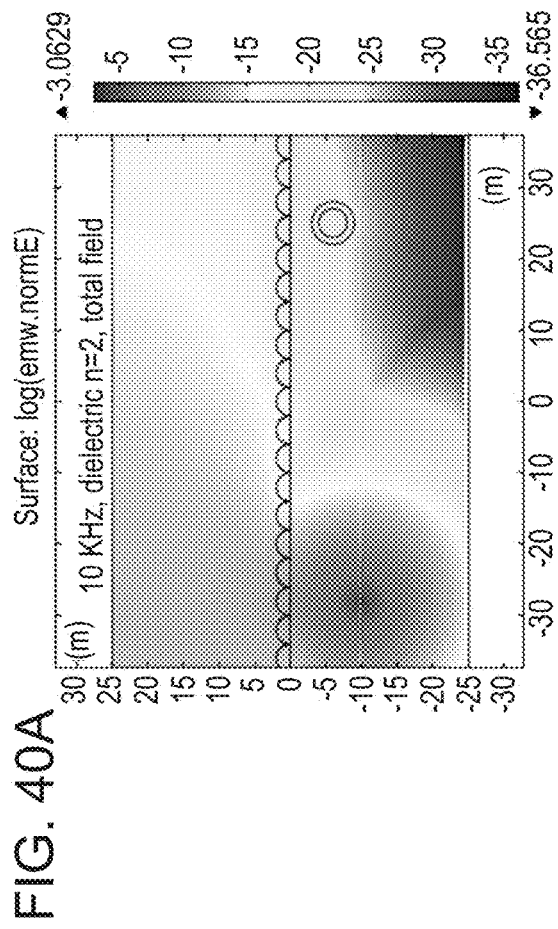
FIG. 40A
SEW-based imaging appears to be a viable technique based on power budget and signal levels
FIG. 40C

APPARATUS, METHODS AND SYSTEMS FOR SURFACE ELECTROMAGNETIC WAVE (SEW)-BASED UNDERWATER AND UNDERGROUND COMMUNICATION AND IMAGING

CROSS-REFERENCE TO RELATED APPLICATIONS

This application claims priority to and the benefit of U.S. Provisional Application No. 63/134,918, filed on Jan. 7, 2021 and entitled "Apparatus, Methods and Systems for Electromagnetic Signal Transmission Through A Conductive Medium," and U.S. Provisional Application No. 63/155,937, filed Mar. 3, 2021 and entitled "Apparatus, Methods and Systems for Surface Electromagnetic Wave-Based Underwater and Underground Communication and Imaging," each of which is incorporated herein by reference in its entity.

BACKGROUND

Some embodiments described herein relate generally to electromagnetic signal transmission. In particular, but not by way of limitation, some embodiments described herein relate to apparatus, methods and systems for surface electromagnetic wave (SEW)-based underwater and underground communication and imaging.

Surface electromagnetic waves can propagate along interfaces separating two media having different electromagnetic properties. For example, radio waves can travel as surface waves following the curvature of the Earth. Known methods use radio signals for long distance undersea communication. These known methods, however, have limited performance because radio signals are rapidly attenuated in fresh or salt water. This signal attenuation severely limits the ability to communicate over distance underwater. Thus, a need exists for a system that can provide high intensity and low attenuation electromagnetic fields for underwater and underground communication and imaging.

SUMMARY

Embodiments described herein include an apparatus including an antenna and a processor operatively coupled to the antenna. The processor can generate an input signal and send the input signal to the antenna. The antenna can, in response to the input signal, transmit first surface electromagnetic signals along an interface between a first medium and a second medium. The antenna can receive second surface electromagnetic signals in response to the first surface electromagnetic signals being scattered by an object disposed in the first medium. The processor can produce an image of the object based on the first surface electromagnetic signals and the second surface electromagnetic signals.

BRIEF DESCRIPTION OF THE FIGURES

FIGS. 40A-40D show example total field distribution and an example differential image of changes produced in the scattered field by variations in scatterer dimensions for the case of a dielectric cylinder, in some embodiments.

DETAILED DESCRIPTION

Figure 1:
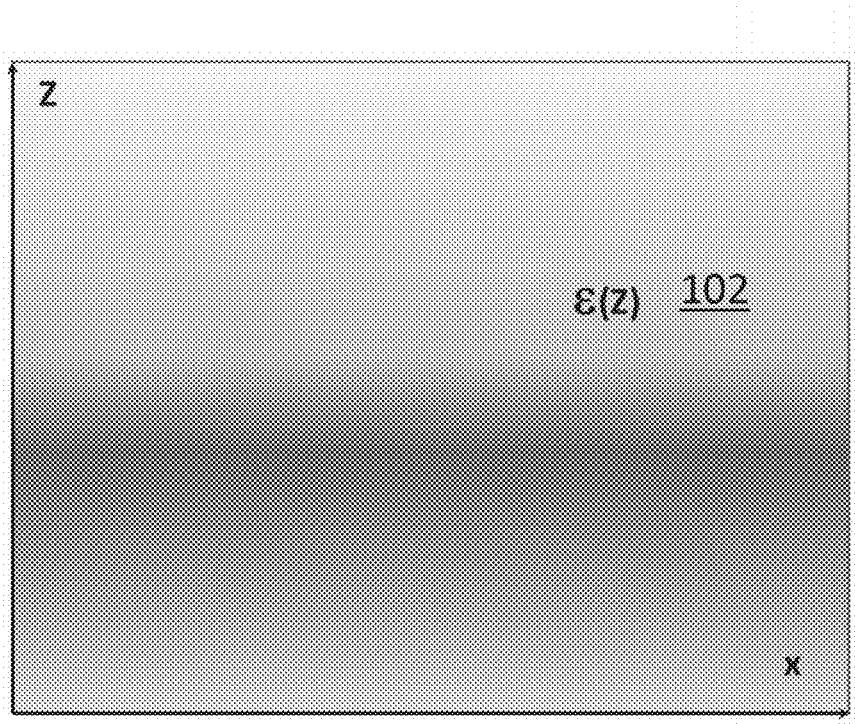
FIG. 1 shows a medium in which the dielectric permittivity $\varepsilon(z)$ depends only on the depth coordinate z, in some embodiments.

Interfaces separating media having different electromagnetic properties may support low-loss propagation of surface electromagnetic waves (SEWs). For example, surface plasmon-polaritons (SPP) propagate along an interface between a metal and a dielectric, and the Zenneck surface wave may exist at an interface between a highly lossy conductive medium (such as seawater) and a dielectric (such as air). The wave vector k of these surface waves along the interface can be defined as:

$$k = \frac{\omega}{c}\left(\frac{\varepsilon_1\varepsilon_2}{\varepsilon_1+\varepsilon_2}\right)^{1/2}, \tag{1}$$

where $\varepsilon_1$ and $\varepsilon_2$ are the dielectric permittivities of the neighboring media. Beside the trivial case when both $\varepsilon_1$ and $\varepsilon_2$ are mostly real and positive, Eq. (1) may produce an almost purely real answer if $Re(\varepsilon_1)$ and $Re(\varepsilon_2)$ have opposite signs, $Re(\varepsilon_1+\varepsilon_2)<0$, and the imaginary parts of both dielectric permittivities are small. This case corresponds to a SPP wave at a metal-dielectric interface. Another possibility may be the case when $Im(\varepsilon_1)>>Re(\varepsilon_2)$, which corresponds to the Zenneck wave at an interface between a highly lossy conductive medium and a good dielectric. However, in the latter case the resulting wave vector appears to be smaller than the wave vector of regular photons in the dielectric, which leads to the "leaky" character of this wave. In other words, while it can propagate over a perfectly smooth interface, surface imperfections can strongly scatter Zenneck waves into regular photons propagating inside the dielectric. $Re(\varepsilon_1)$ stands for the real part of the complex number of $\varepsilon_1$; $Re(\varepsilon_2)$ stands for the real part of the complex number of $\varepsilon_2$; $Re(\varepsilon_1+\varepsilon_2)$ stands for the real part of the sum of $\varepsilon_1+\varepsilon_2$; $Im(\varepsilon_1)$ stands for the imaginary part of the complex number $\varepsilon_1$.

Accordingly, a need exists for measuring electromagnetic waves propagating in a more general situation in which conductivity of a medium changes across some real or imaginary planar surface. Embodiments described herein include an apparatus, a method, and a system for transmitting a low-loss electromagnetic wave propagating along such a planar surface inside a conductive medium and the medium conductivity can remain very high on both sides of the surface. Embodiments described herein include a new surface wave solution of the macroscopic Maxwell equations in a situation when the interface between two conductive media is not abrupt. Embodiments described herein can apply to any portion of the electromagnetic spectrum from the extremely low radio frequencies (ELF) up to the visible range. Embodiments described herein include an apparatus, a method, and a system for transmitting a long-range, low-loss electromagnetic surface charge density wave along an interface between two strongly conductive media (or any imaginary surface inside a conductive medium if the medium conductivity changes across this surface).

Embodiments described herein include long-range electromagnetic wave propagation along, for example, in the seawater, or along a sandy seabed, which may enable applications including efficient underwater radio communication and imaging. The methods and apparatus have broad applicability in other applications where it is desirable to establish electromagnetic communication or to perform electromagnetic imaging through a highly conductive medium. The embodiments described herein may be applicable to the imaging of underground structures and mineral deposits, underground communication (e.g., to find layers of mineral deposits and oil underground), radio communication along the underwater seabed and/or through a plasma layer around a hypersonic vehicle (such as a returning space capsule), improving propagation through electromagnetic metamaterial structures which suffer from high losses, biomedical imaging (the discussed surface wave may propagate along the tissue boundaries), assessment (or reassessment) of mobile phone safety, and many other applications. The methods and apparatus described herein have broad applicability in situations in which electric conductivity gradually changes across some real or imaginary interface. Such interfaces may support low-loss propagation of surface waves of charge density.

Embodiments described herein can apply to any portion of the electromagnetic spectrum from the extremely low radio frequencies (ELF) up to the visible range. For example, the surface waves described herein can be used in building improved super-resolution optical microscopes and improving resolution of ultraviolet (UV) nanolithography techniques. Nanofocusing can be used for sensing and nonlinear optics through engineered antennas and waveguides. It can also be used in deep sub-wavelength optical lithography. The surface waves described herein can be used in gradient nanophotonics (or "gradionics"). Specifically, based on Eq. (9) discussed below, the second and the third terms can dominate if e changes on a scale $\xi$, which is shorter than $\lambda/n$. The k vector is defined by $\xi$ and not by $\lambda/n$, leading to super-resolution. Therefore, different set of materials can be used in gradient nanophotonics, such as graphite at 300 nm with its imaginary $\varepsilon$ (thus, overcoming the difficulties of UV plasmonics). The epsilon-near-zero (ENZ) metamaterials can be used in linear and nonlinear nanophotonics applications (e.g., with nonlinear optical effects because of possibility of super-resolution). The ENZ metamaterials can have very large light wavelengths $\sim \lambda/\varepsilon^{1/2}$. A gradient index waveguide made of ENZ metamaterials may exhibit tight light localization (due to the low-loss surface electromagnetic waves described herein), which in combination with nonlinear optical effects can be used in making nanophotonic devices.

In this disclosure, $\omega$ represents the temporal angular frequency of photon. k represents the wave number (or wave vector). $\lambda$ represents the wavelength. $\varepsilon$ represents the dielectric permittivity of the medium. c represents the speed of the photon. $\psi$ is the disturbance describing the wave (for example, for an ocean wave, $\psi$ can be the excess height of the water, or for a sound wave, $\psi$ would be the excess air pressure). $\sigma$ represents the conductivity of the medium. E represents the electric field. B represents the magnetic field. D represents the electric displacement.

FIG. 1 shows a medium in which the dielectric permittivity $\varepsilon(z)$ depends only on the depth coordinate z, in some embodiments. Specifically, in the geometry in which the medium is non-magnetic (B=H), the dielectric permittivity $\varepsilon(z)$ 102 of a medium is continuous, the macroscopic Maxwell equations depend only on z coordinate 101: $\varepsilon=\varepsilon(z)$. Under such conditions, spatial variables in the Maxwell equations separate, and without the loss of generality assuming electromagnetic mode propagation in the x direction, leading to field dependencies proportional to $e^{i(kx-\omega t)}$. Variable separation provides that the functional behavior of the electromagnetic fields may be represented as a product of factors, such that each factor depends, in some implementations, only on one spatial coordinate: $E=X(x)Y(y)Z(z)$. For a given plane wave solution, the spatial coordinates may be chosen in such a way that the plane wave propagates along the x coordinate, so that $Y(y)=$const. The macroscopic Maxwell equations may be written as $$\vec{\nabla}\vec{D} = 0, \ \vec{\nabla}\vec{B} = 0, \ \vec{\nabla}\times\vec{E} = i\frac{\omega}{c}\vec{B}, \text{ and } \vec{\nabla}\times\vec{B} = -i\frac{\omega\varepsilon}{c}\vec{E}, \tag{2}$$

leading to a wave equation $$\vec{\nabla}\times\left(\vec{\nabla}\times\vec{E}\right) = \frac{\omega^2\varepsilon}{c^2}\vec{E} \tag{3}$$

Since $$\vec{\nabla}\times\left(\vec{\nabla}\times\vec{E}\right) = -\nabla^2\vec{E} + \vec{\nabla}\left(\vec{\nabla}\vec{E}\right) \tag{4}$$

and $$\vec{\nabla}\vec{E} = E_z\frac{\partial\varepsilon/\partial z}{\varepsilon}, \tag{5}$$

the following equation is obtained $$-\nabla^2\vec{E} - \vec{\nabla}\left(E_z\frac{\partial\varepsilon}{\varepsilon\partial z}\right) = \frac{\varepsilon\omega^2}{c^2}\vec{E} \tag{6}$$

For the $E_z=0$ polarization we obtain an effective Schrodinger equation $$-\frac{\partial^2 E_x}{\partial z^2} - \frac{\varepsilon(z)\omega^2}{c^2}E_x = -k^2 E_x, \tag{7}$$

while for the $E_z \neq 0$ polarization the effective Schrodinger equation is $$-\frac{\partial^2 E_z}{\partial z^2} - \frac{\partial E_z}{\partial z}\frac{\partial \ln \varepsilon}{\partial z} - \left(\frac{\varepsilon(z)\omega^2}{c^2} + \frac{\partial^2 \ln \varepsilon}{\partial z^2}\right)E_z = -k^2 E_z, \qquad (8)$$

In the Eq. (8), the effective wave function may be introduced as $E_z = \psi/\varepsilon^{1/2}$, leading to $$-\frac{\partial^2 \psi}{\partial z^2} + \left(-\frac{\varepsilon(z)\omega^2}{c^2} - \frac{1}{2}\frac{\partial^2 \varepsilon}{\varepsilon \partial z^2} + \frac{3}{4}\frac{(\partial \varepsilon/\partial z)^2}{\varepsilon^2}\right)\psi = -\frac{\partial^2 \psi}{\partial z^2} + V\psi = -k^2\psi \qquad (9)$$

For both the $E_z = 0$ polarization and the $E_z \neq 0$ polarization, $-k^2$ plays the role of effective energy in the corresponding effective Schrodinger equations. The analytical properties of Eqs. (7) and (9) in the limit $\omega \to 0$ are relevant in the ELF range of radio signal propagation along the seawater-air and the seawater-seabed interfaces (note that this approximation is also relevant in the $\varepsilon \to 0$ limit, for example for the epsilon-near-zero (ENZ) metamaterials in the visible and near infrared ranges). In this limit, Eq. (7) becomes $$-\frac{\partial^2 E_x}{\partial z^2} = -k^2 E_x, \qquad (10)$$

which coincides with the Schrodinger equation in free space, and which does not exhibit any bound states. On the other hand, Eq. (9) becomes $$-\frac{\partial^2 \psi}{\partial z^2} - \left(\frac{1}{2}\frac{\partial^2 \varepsilon}{\varepsilon \partial z^2} - \frac{3}{4}\frac{(\partial \varepsilon/\partial z)^2}{\varepsilon^2}\right)\psi = -k^2\psi \qquad (11)$$

In the limit of very large imaginary $\varepsilon$ (for example, in the case of seawater at low frequencies) the second term contribution to the effective potential may be neglected (since $\varepsilon^2 \gg \varepsilon$), and we obtain the following one-dimensional (1D) Schrodinger equation for the $E_z \neq 0$ polarization:

$$-\frac{\partial^2 \psi}{\partial z^2} - \frac{1}{2}\frac{\partial^2 \varepsilon}{\varepsilon \partial z^2}\psi = -k^2\psi \qquad (12)$$

Figure 2A:
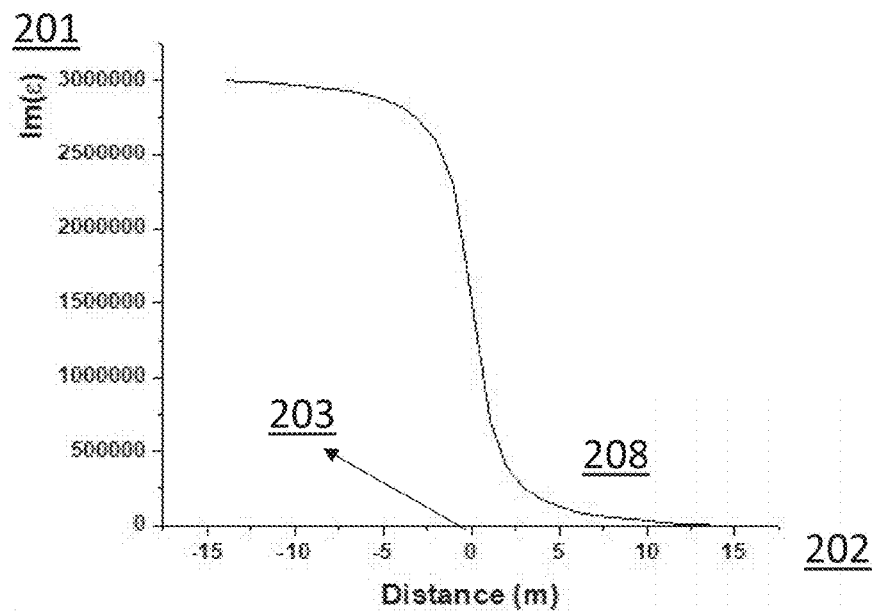
FIGS. 2(a)-2(b) show graphs illustrating the width of a $\varepsilon(z)$ transition layer in which the dielectric permittivity changes from $\varepsilon_{water}$ to $\varepsilon_{air}$, and the effective potential energy near the air-seawater interface for the 30 kHz frequency ban, respectively, in some embodiments.
Figure 2B:
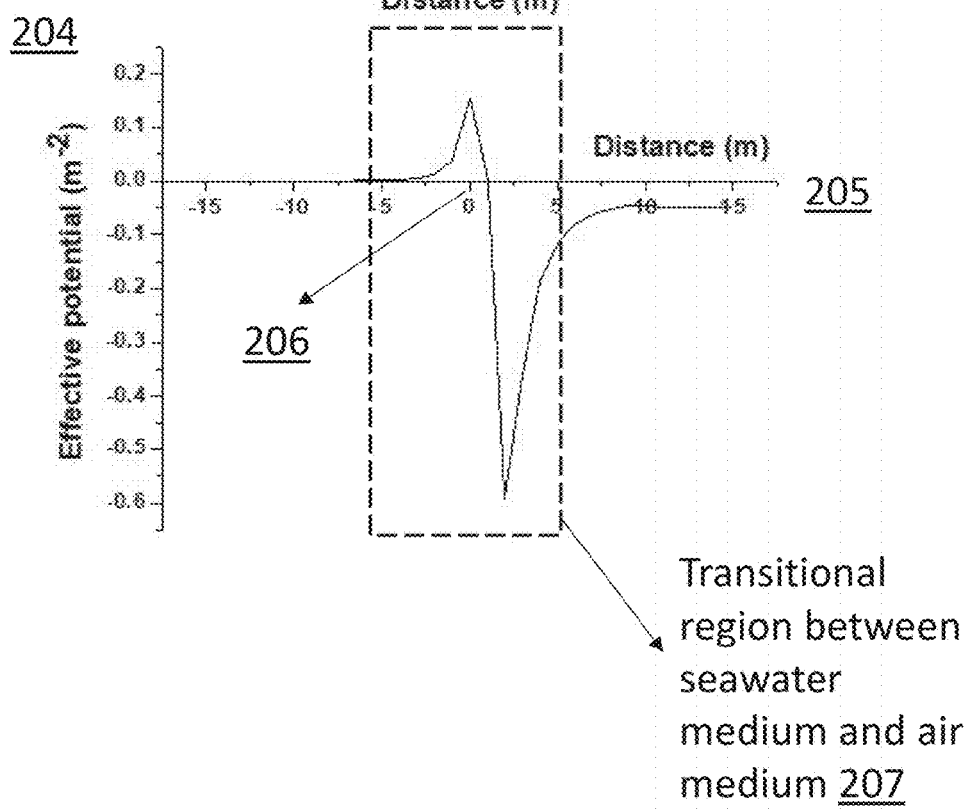

The effective potential energy $$V = -\frac{1}{2}\frac{\partial^2 \varepsilon}{\varepsilon \partial z^2}$$

in this equation (which is plotted FIG. 2(b) for the case of a gradual seawater-air interface) remains real even in the case of very large purely imaginary $\varepsilon(z)$ (corresponding to a highly conductive medium, such as seawater at 30 KHz). This means that similar to any other 1D Schrodinger equation, such a potential well can have at least one bound state. Such a bound state can give rise to at least one solution having almost purely real wave vector k, which corresponds to a surface mode with a long propagation length. FIG. 2(a) shows the width of the $\varepsilon(z)$ transition layer 201 as a function of the depth from the air-seawater interface 202 (in which the dielectric permittivity changes from $\varepsilon_{water}$ to $\varepsilon_{air}$) into the seawater (with 0 distance being at the air-seawater interface 203). It is assumed that the water surface is wavy, and the typical wave height is around 5 m. FIG. 2(b) shows effective potential energy 204 near the air-seawater interface calculated for the 30 kHz frequency band using Eq. (12) as a function of the depth 205 from the air-seawater interface into the seawater (with 0 distance being at the air-seawater interface 206). The transitional region 207 between the seawater medium and the air medium relates to a very rough sea state with a wave height of the order of 4-6 meters.

Figure 3:
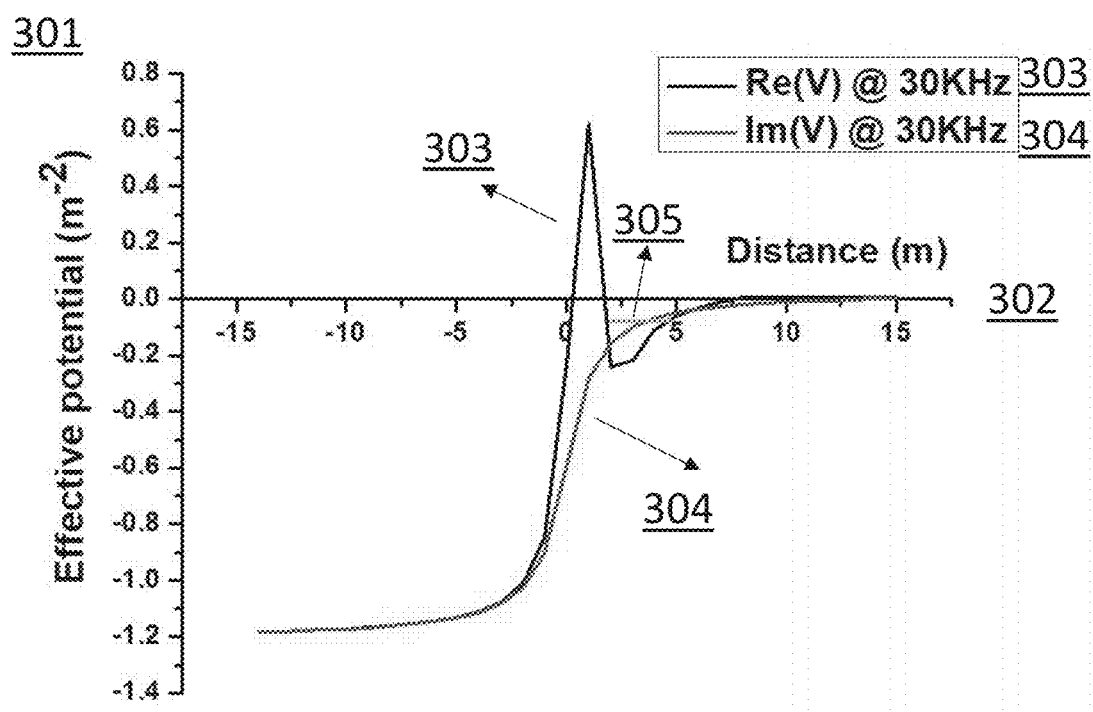
FIG. 3 shows a graph illustrating complete effective potential energy at the air-seawater interface for the 30 KHz band, in some embodiments.

This low frequency approximation remains valid in the very low frequency (VLF) range, for example at 30 KHz. FIG. 3 shows complete effective potential energy 301 defined by Eq. (9) (both real 303 and imaginary parts 304) at the air-seawater interface plotted for the 30 KHz band as a function of distance 302. It is assumed that the wave height is around 5 m and the same $\varepsilon(z)$ transition layer as shown in FIG. 2(a). Its low loss portion 208 appears to be similar to the potential energy shown in FIG. 2(b), while the high loss region of the potential well (located in bulk seawater) is separated from the low loss region by a potential barrier.

For the effective potential well V(z) in Eq. (9), the ground state may be approximately determined as $$k \approx -\frac{1}{2}\int_{-\infty}^{+\infty} \psi V(z)\psi * dz \approx -\frac{1}{2}\int_{-\infty}^{+\infty} V(z)dz \qquad (13)$$

where the wave function $\psi$ may be normalized, and the second approximation may be used for a shallow potential well in which $\psi \approx$ const. The wavelength of the resulting surface wave is $\lambda = 2\pi/k$, and $\text{Im}(k)^{-1}$ defines the propagation distance of the wave. The numerically obtained effective energy level is shown schematically as 305 in FIG. 3.

Figure 4A:
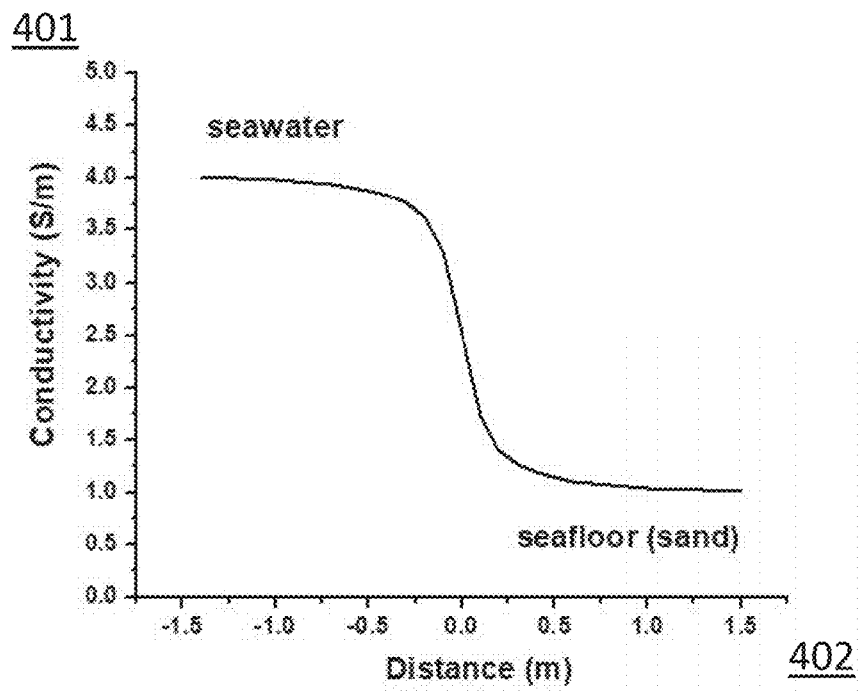
FIGS. 4(a)-4(b) show graphs illustrating the width of a $\varepsilon(z)$ transition layer in which the dielectric permittivity changes from water to sand and the complete effective potential energy at the water-seabed interface for the 10 KHz band, respectively, in some embodiments.
Figure 4B:
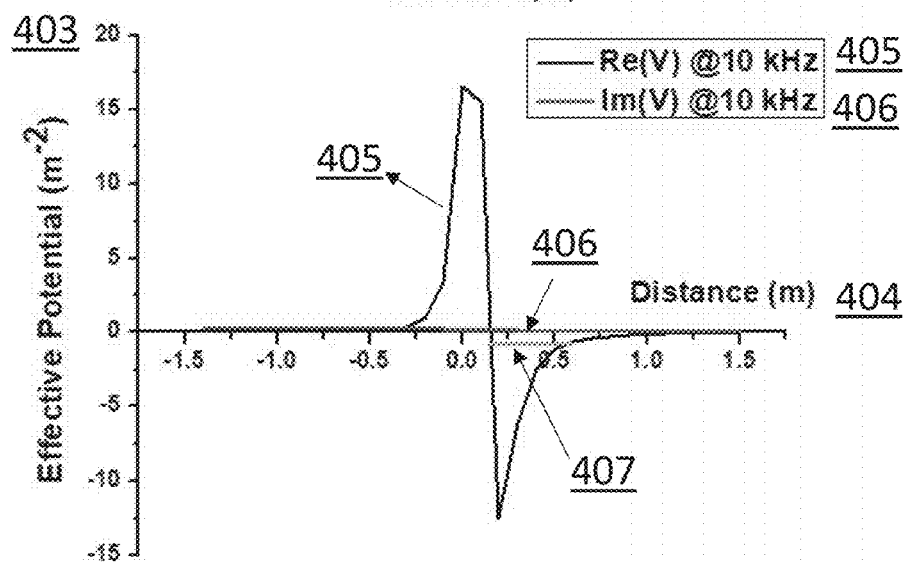

FIGS. 4(a) and 4(b) show long-distance radio wave propagation through a highly conductive medium (e.g., along the underwater seabed), in some embodiments. It is assumed the seabed is sandy and nearly flat with typical roughness on the order of 0.5 m. The sandy seabed conductivity of $\sigma = 1$ S/m is assumed in these simulations based on experimental measurements, while the average conductivity of seawater is assumed to be $\sigma = 4$ S/m. For both the seawater and the wet sand (located on the seabed), $$\varepsilon \approx \frac{i\sigma}{\varepsilon_0 \omega} \qquad (14)$$

in the ELF/VLF frequency range, where $\varepsilon_0$ is the dielectric permittivity of vacuum and $\sigma$ is expressed in SI units. Since $\text{Re}(\varepsilon) \ll \text{Im}(\varepsilon)$ for both the seawater and the wet sand in the ELF and VLF ranges, the effective potential energy near the seabed may be written as $$V = -\frac{i\sigma\omega}{\varepsilon_0 c^2} - \frac{1}{2}\frac{\partial^2 \sigma}{\sigma \partial z^2} + \frac{3}{4}\frac{(\partial \sigma/\partial z)^2}{\sigma^2} \qquad (15)$$

FIG. 4(a) shows the $\varepsilon(z)$ transition layer 401 in which the conductivity changes from $\sigma_{water}$ to $\sigma_{sand}$ as a function of the depth distance from the seawater-seafloor interface 402. FIG. 4(b) shows complete effective potential energy 403 (both real 405 and imaginary 406 parts) at the water-seabed interface as a function of the depth distance from the seawater-seafloor interface 404. Based on the numerical solution of the resulting Schrodinger equation (the obtained effective energy level is shown as 407 in FIG. 4(*b*)) and using Eq. (13), a 10 kHz radio signal propagation distance L=1/Im(k) in this case can reach about 50 m, which considerably exceeds the classical skin depth of about 3 m at 10 kHz in seawater. The surface wave propagation distance is about seven times larger than its wavelength computed numerically as λ=2π/Re(k)=7 m, which indicates the "propagating" character of the surface wave. Compared to the conventional exponentially decaying 3D signal propagation through the lossy bulk seawater, 2D signal propagation along the seawater-seabed interface can be highly advantageous. Moreover, based on Eq. (13), a more abrupt seawater-seabed interface can give rise to even longer-propagating surface wave solution due to reduction in Im(k). A comparison of FIG. 3 and FIGS. 4(*a*)-4(*b*) shows these results. The wave parameters (the wavelength, penetration depth and propagation distance), as well as the field configuration in the wave can be configured based on, for example, Eq. (13). These wave parameters can define the antenna size and its configuration (e.g., antennas 601 in FIG. 6), which can be optimized for excitation and detection of the described surface wave. In this example, the propagation distance is around 50 m, but the wave may be detected to at least 500 m distance using a radio signal having a sensitivity of at least −100 dBm. In this example, the wavelength is around 7 m (at 10 KHz frequency), the penetration depth is around 1.13 m. In some implementations where a strong radio signal is used, the penetration depth can be about 15 m from the interface. In some implementations, the dimensions of the antennas (e.g., antennas 601 in FIG. 6) can be ¼ or ½ of the wavelength. Although exact numerical values are provided to some parameters in some implementations, these numerical values can vary within a predetermined range.

The long-range propagating surface charge density wave described herein can be tightly localized near the seawater-seabed interface. Based on Eq. (9), far from the interface its electric field can attenuate approximately as $E_z \sim e^{-kz}$ away from the interface both inside the seawater and inside the wet sand. In the embodiments shown in FIGS. 4(*a*)-4(*b*), the attenuation distance away from the interface equals l=1 k~1.13 m. The field configuration in this wave can be partially longitudinal and the electric field component along the propagation direction can be non-zero. Based on Eqs. (2), far from the interface $E_x \sim iE_z$, while the only nonzero component of the magnetic field is By $\sim -(2kc/\omega)E_z \sim -(2\lambda_0/\lambda)E_z$, where $\lambda_0$ is the free space wavelength.

In some implementations, the long-range surface charge density waves described above, and the well-known SPP waves, may propagate along a metal-dielectric interface, and follow the dispersion law described by Eq. (1). When making the $E_z = \psi/\varepsilon^{1/2}$ substitution in transition from Eq. (8) to Eq. (9), and assuming continuity of ψ, the conventional SPP solution of Eq. (8) at a sharp interface between an ideal metal and a dielectric does not apply. Since $D_z = \varepsilon E_z$ can be continuous at such an interface, $D_z = \varepsilon^{1/2}\psi$ may not remain continuous and non-zero while ε(z) remains purely real, and while it changes sign from positive to negative (if continuity of ψ is assumed at the same time). In such a case ψ=0 condition can be applied, which leads to losing the SPP solution of Eq. (8). This indicates that the charge density wave solutions of Eq. (9), which is described above, arise due to different physics mechanisms. The origin of the charge density wave solutions may be traced back to the effect of charge accumulation whenever there is a gradient of conductivity in a medium and a non-zero component of electric field parallel to it. In the electrostatic case a volumetric charge density ρ can be $$\rho = -\frac{\varepsilon_0 \nabla \sigma \vec{E}}{\sigma} \tag{16}$$

Considerations similar to those applied to the charge density wave solutions can be applied to the Zenneck surface wave. The Zenneck surface wave solutions apply due to a sharp interface between a highly lossy medium $\varepsilon_1$ and a good dielectric $\varepsilon_2$ (such as for example, the interface between air and seawater) in which case Im($\varepsilon_1$)>>Re($\varepsilon_2$). However, the ψ=0 condition can be enforced at the sharp interface due to the necessity that $D_z = \varepsilon E_z$ can be continuous. This leads to losing the Zenneck surface wave solutions in transition from Eq. (8) to Eq. (9).

Eq. (9) allows the recovery of the SPP-like solutions in the case of a gradual interface between a non-ideal metal and a dielectric. In such a case the effective potential V(z) in Eq. (9) is dominated by the $$\frac{3}{4}\frac{(\partial \varepsilon/\partial z)^2}{\varepsilon^2}$$

term. This term becomes negative and strongly attractive whenever Re(ε(z)) passes through zero:

$$V(z) \sim \frac{3}{4}\frac{(\partial \varepsilon/\partial z)^2}{\varepsilon^2} \approx -\frac{3}{4}\frac{(\partial \text{Re}(\varepsilon)/\partial z)^2}{\text{Im}(\varepsilon)^2} \tag{17}$$

The deep potential well at the interface, which is described by Eq. (17), leads to the SPP-like solution propagating along the interface. The effective potential described by Eq. (17) can apply in the case of an interface between two lossy ENZ metamaterials.

In some embodiments, the surface wave solutions can be recovered at the gradual interface between air and seawater (as shown in FIG. 2(*b*) and FIG. 3). In some embodiments, a Zenneck surface wave does not exist at an interface between two highly lossy media. For example, when both $\varepsilon_1$ and $\varepsilon_2$ are large and imaginary, the wave vector k defined by Eq. (1) cannot be close to a real number. Therefore, the charge density wave at the seabed, as illustrated in FIG. 4(*b*), demonstrates a distinctly different nature of the long-range propagating surface charge density waves.

Figure 5A:
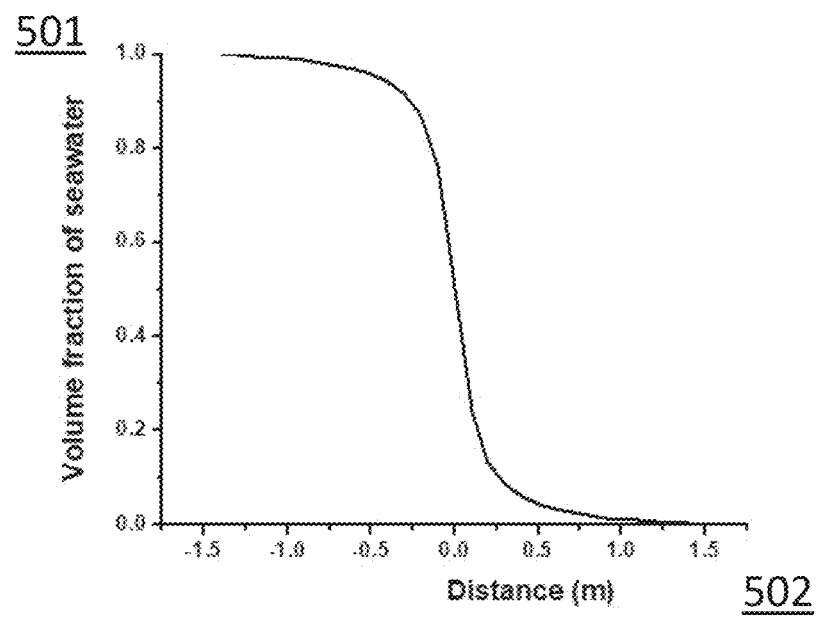
FIGS. 5(a)-5(b) show graphs illustrating a width of a transition layer in which the dielectric permittivity changes between air and seawater and the effective potential energy near the air-seawater interface for the 10 MHz frequency band, respectively, in some embodiments.
Figure 5B:
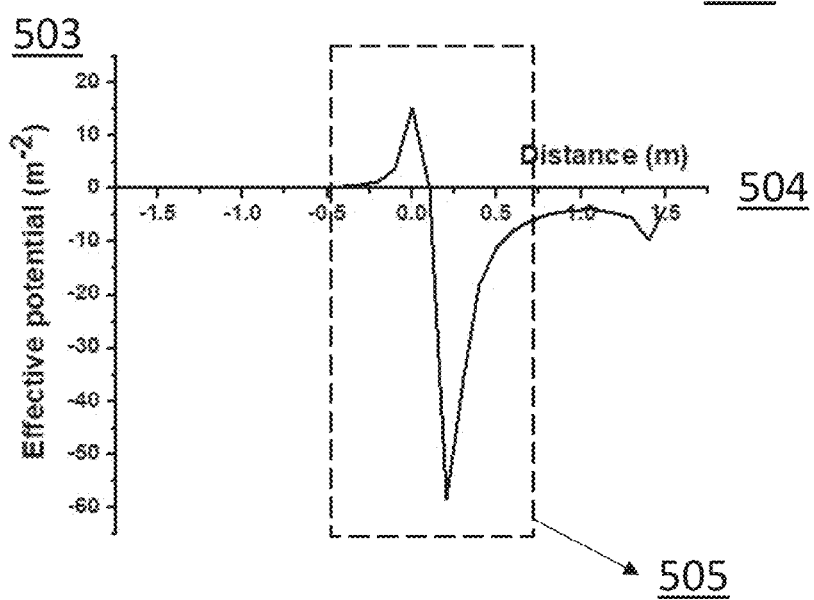

Moreover, the range of wave vectors k determined (or predicted) by the application of Eq. (13) to the shape of the effective potential wells calculated in FIGS. 2(*b*) and 3 differs (drastically in some implementations) from the result determined (or predicted) by Eq. (1). Application of Eq. (1) to the case of a sharp planar seawater-air interface at v=30 KHz can produce k~2πv/c~6.3·10⁻⁴ m⁻¹. On the other hand, the effective potential wells shown in FIGS. 2(*b*) and 3 together with Eq. (13) predict k~10⁻¹ m⁻¹. This three orders of magnitude discrepancy indicates a distinctly different nature of the long-range propagating surface charge density waves, as described herein. The small variations of the ε(z) profile near the air-seawater interface compared to the profile shown in FIGS. 2(*a*) and 2(*b*) can be an additional solution of Eq. (9), which can be much more "Zenneck-like", as shown in FIGS. 5(*a*) and 5(*b*). FIG. 5(*a*) shows a ~0.5 m wavy transition layer 501 between air and seawater as a function of the depth distance 502. FIG. 5(b) shows effective potential energy 503 as a function of depth distance 504 near the air-seawater interface 505 calculated for the 10 MHz frequency band using Eqs. (9) and (18). The second more shallow potential well at the very top edge of the transition layer gives rise to a Zenneck-like solution of Eq. (9).

In these simulations performed at v=10 MHz, both real and imaginary parts of ε(z) can be assumed to follow the simple mixing rule:

$$E(z)=n(z)\varepsilon_{water}+(1-n(z))\varepsilon_{air} \quad (18)$$

where n(z) is the volume fraction of water in the wavy seawater-air interface. Depending on the exact profile of n(z), the $$\frac{3}{4}\frac{(\partial\varepsilon/\partial z)^2}{\varepsilon^2}$$

term of the effective potential in Eq (9) may start to dominate at the very top region of the transition layer, which can lead to a second, more shallow potential well. Application of Eq. (1) to the case of a planar sharp seawater-air interface at v=10 MHz can produce k~2πv/c~0.21 m$^{-1}$, which is very close to the estimate based on Eq. (13) for the second, more shallow potential well. Thus, embodiments described herein recover the conventional SPP and Zenneck wave solutions, while revealing additional propagating surface charge density waves, which can appear when the medium conductivity experiences gradual change across an interface.

Figure 6:
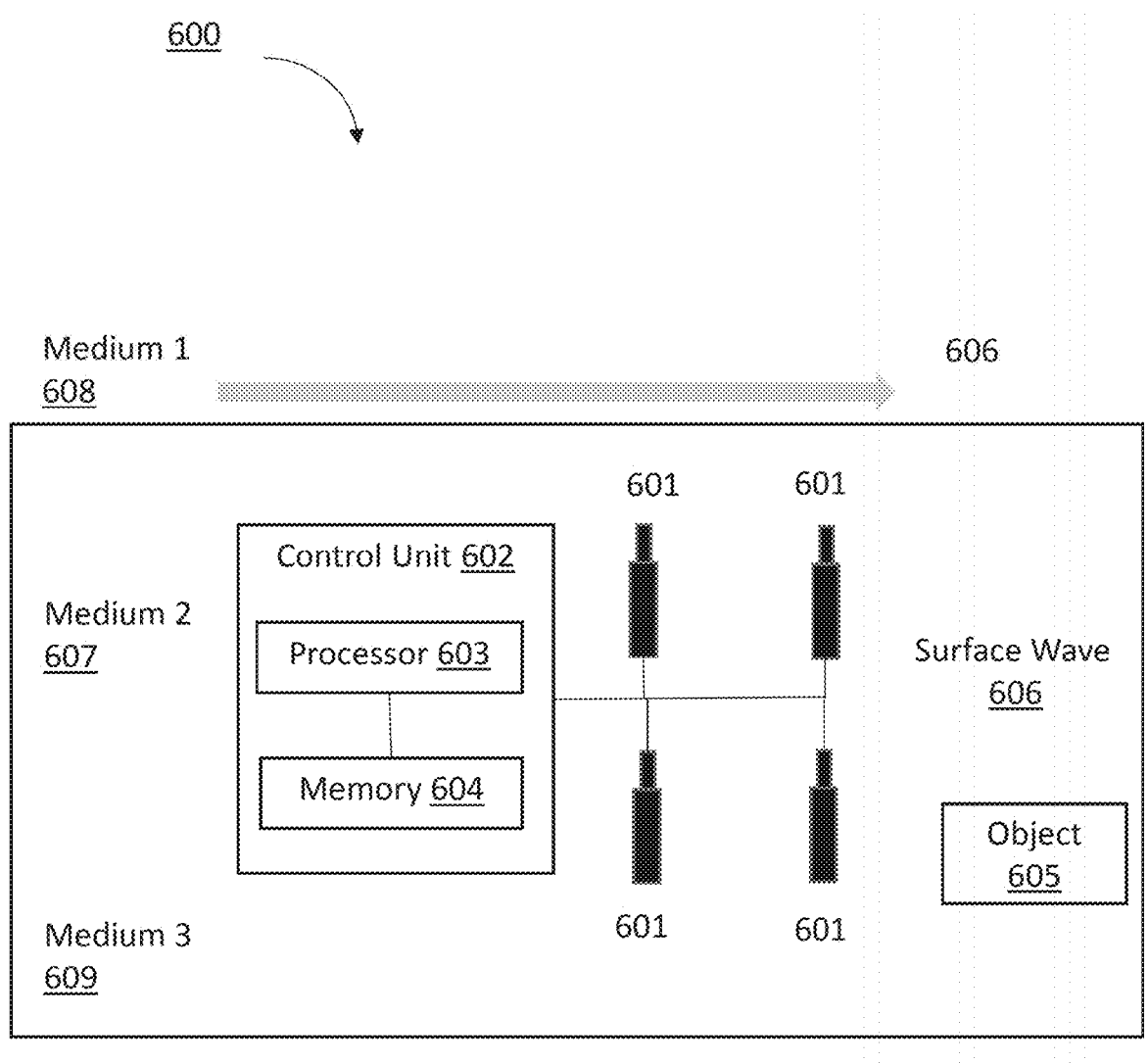
FIG. 6 shows an example of a surface wave communication and sensor system 600, in some embodiments.

FIG. 6 shows an example of a surface wave communication and sensor system 600, in some embodiments. The surface wave communication and sensor system 600 includes a plurality of antennas 601 to receive and transmit electromagnetic signals and a control unit 602 having a processor 603 and a memory 604. The control unit 602 is operatively and/or communicatively coupled to the plurality of antennas 601. In some implementations, the plurality of antennas 601 can be connected together such that their individual currents are transmitted in a specified amplitude or phase relationship. In other implementations, the plurality of antennas 601 are not connected together and operate independently with the control unit 602. In other words, each antenna from the set of antennas is operatively or commutatively coupled with the processor and each antenna from the set of antennas is not directly coupled with remaining antennas from the set of antennas (or each antenna is commutatively coupled with the remaining antennas via the processor and not via direct connections between that antenna and an antenna from the remaining antennas). The surface wave communication and sensor system 600 can be placed in a conductive medium 607, interfacing with a first medium 608 and in some implementations, interfacing with a third medium 609. For example, the surface wave communication and sensor system 600 can be placed in seawater 608 interfacing with air 608 and seafloor 609.

The control unit 602 may include a processor 603 and a memory 604 operatively coupled to the processor 603. The processor 603 can be or include any processing device or component configured to perform the data collecting, processing and transmitting functions. The processor 603 can be configured to, for example, write data into and read data from the memory 604, and execute the instructions stored within the memory 604. Processor 603 can also be configured to execute and/or control, for example, the operations of the memory 604. The memory 604 can be, for example, a random-access memory (RAM) (e.g., a dynamic RAM, a static RAM), a flash memory, a removable memory, and/or so forth. In some embodiments, the memory can include, for example, a database, process, application, virtual machine, and/or some other software modules (stored and/or executing in hardware) or hardware modules.

In some embodiments, the plurality of antennas 601 can be configured to generate electromagnetic signals (or surface waves 606) and communicate with (or image) an object 605. The plurality of antennas 601 may receive electromagnetic signals back from the object 605 and send them to the control unit 602 for processing. During operation, the processor 603 may generate an input signal (based on Eqs. (1)-(18) described above and stored in the memory 604) and send the input signal to at least one antenna from the plurality of antennas 601 to generate the electromagnetic signals. In some implementations, the processor 603 can send the input signal to the antenna 601 to alter the phase or signal delay electronically, thus steering the SEWs to a different direction. The processor 603 can be configured to individually adjust one or more parameters (e.g., phase, power level, wavelength, direction of the electromagnetic signal, relative position and distance from another antenna, depth in the medium 607, and/or the like) of each antenna from the plurality of antennas 601. Upon receiving the signals back from the antenna, the processor 603 can be configured to process the signals and in some implementations, produce an image of the object 605. In some implementations, the processor 603 can determine, depending on the locations of the object 605 and each antenna, one or more antennas from the plurality of antennas 601 to use for optimal performance.

In some implementations, the set of antennas can be at least one of a straight wire antenna, a circular loop antenna, a helical antenna, a monopole-type antenna, a dipole-type antenna, or a combination of thereof.

In some implementations, the set of antennas can include a single antenna or multiple antennas. In some implementations, the surface wave communication and sensor system 600 can include a set of antenna elements from an antenna. The set of antenna elements from the antenna can form, for example, a phased array antenna having the multiple antenna elements. For example, the processor 603 can send an input signal to at least one antenna element from a set of antenna elements. In response to the input signal, the at least one antenna element can transmit first surface electromagnetic signals along an interface between a first medium and a second medium. T dielectric permittivity of the first medium is greater than a dielectric permittivity of the second medium. The at least one antenna element can receive second surface electromagnetic signals in response to the first surface electromagnetic signals reaching an object disposed in the first medium and analyze the first surface electromagnetic signals and the second surface electromagnetic signals to extract information associated with the object (for example, to communicate with the object or produce an image of the object).

The surface electromagnetic waves (SEWs) are also referred to herein as surface electromagnetic signals, surface signals, surface waves, or surface electromagnetic wave signals. In some implementations, the surface electromagnetic signals can be generated by modulating a carrier surface electromagnetic wave with information (or a message) (e.g., using an electrical input), and the surface wave communication and sensor system 600 can send the modulated surface electromagnetic signals to an object 605 for communication. In some implementations, the processor 603 can send the input signal to the antenna 601 to alter the phase or signal delay electronically, thus steering the SEWs to a different direction, or to module the carrier SEW signals to carry information. In some implementations, SEWs can be generated and transmitted along a surface or interface (i.e., beam forming in a 2-dimentional space) similarly as in the beam forming methods in a 3-dimentional space.

Similar to surface plasmons, the wavelength of the low-loss surface electromagnetic wave (e.g., along a planar-surface inside a lossy medium if the medium permittivity changes continuously across such surface) may be considerably shorter than the light wavelength in free space, which enables its applications in super-resolution microscopy and nanolithography techniques. Plasmonics-based nanophotonic devices can be built using a limited number of low loss optical materials. The low-loss surface electromagnetic wave described herein, however, can be advantageously supported by a much broader range of lossy media.

Figure 7A:
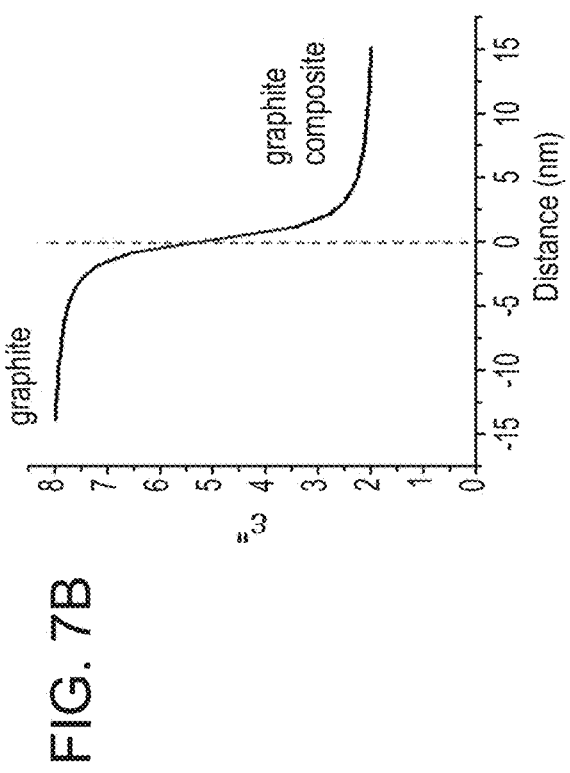
FIGS. 7A-7D show characteristics of the low-loss surface electromagnetic wave in a graphite interface, according to some embodiments.
Figure 7B:
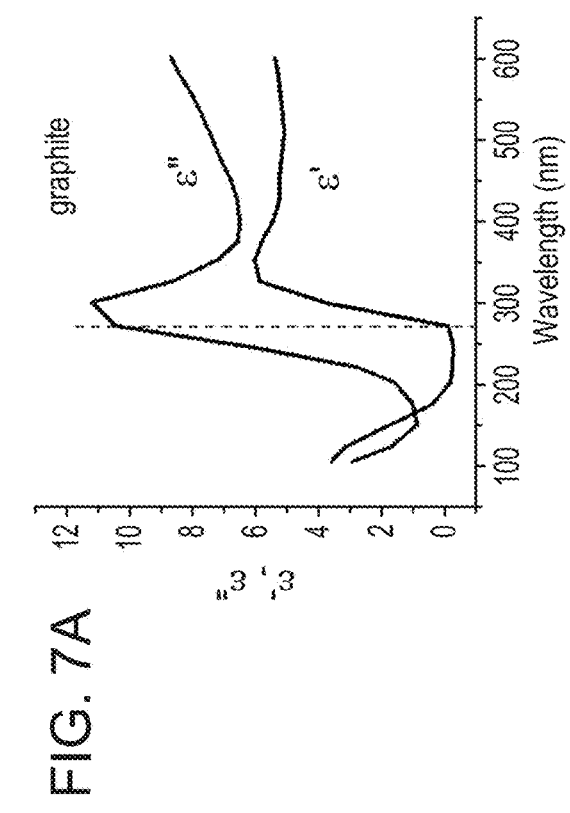
Figure 7C:
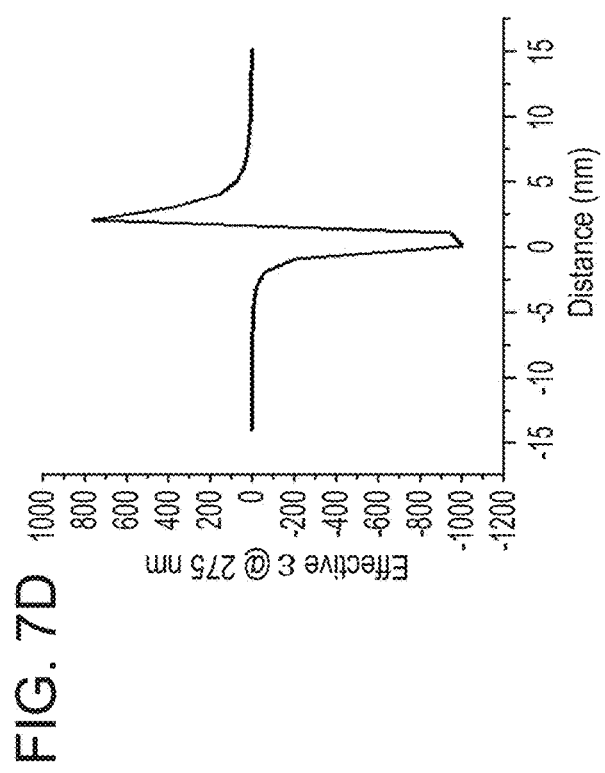
Figure 7D:
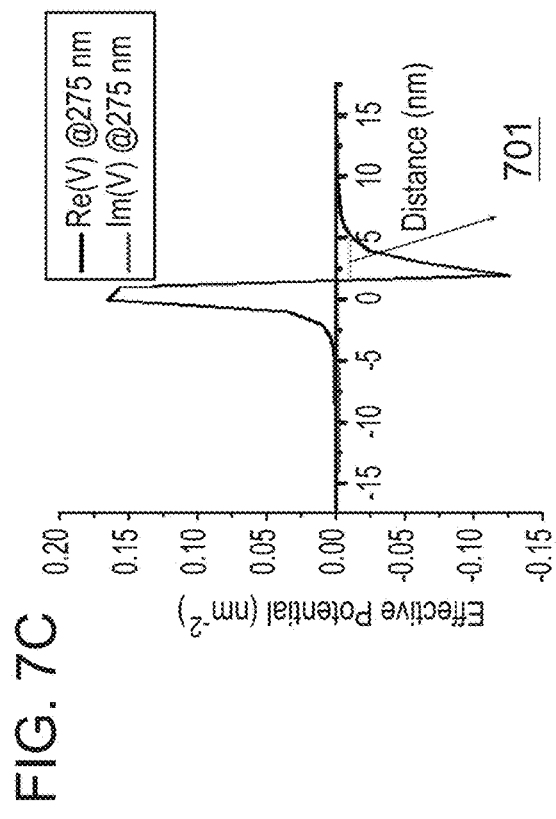

FIGS. 7A-7D show characteristics of the low-loss surface electromagnetic wave in a graphite interface, according to some embodiments. In some implementations, a gradient medium based on, for example, graphite, can have almost pure imaginary dielectric permittivity in the 200-300 nm UV range (as shown in FIG. 7A). A computing device having a processor (e.g., processor 603) can perform simulations for, for example, a planar $\xi=10$ nm thick gradual transition layer between bulk graphite and some graphite-based compound which has lower but also pure imaginary ε (as shown in FIG. 7B). The resulting effective potential for Transverse Magnetic polarization of light ("TM light") is at $\lambda_0=275$ nm (as shown in FIG. 7C). For instance, the magnetic field in the TM polarized wave can be perpendicular to the propagation direction. Based on Eq. (19) which shows the effective potential energy near a gradual interface between two media:

$$V(z) = -\frac{4\pi\varepsilon(z)}{\lambda_0^2} - \frac{1}{2}\frac{\partial^2 \varepsilon}{\varepsilon \partial z^2} + \frac{3}{4}\frac{(\partial \varepsilon/\partial z)^2}{\varepsilon^2}, \quad (19)$$

an "effective dielectric permittivity" distribution $\varepsilon_{eff}(z)$ (as shown in FIG. 7D) can be defined as $$\varepsilon_{eff} = -\frac{\lambda_0^2 V(z)}{4\pi} \quad (20)$$

Therefore, the effective potential well near the interface can be rather deep, and that Im(V)<<Re(V). Similar to any other 1-dimensional Schrodinger equation, the potential well can have at least one bound state. Such a bound state can give rise to at least one solution having almost pure real wave vector k, which corresponds to a surface mode with a long propagation length. For the effective potential well V(z) shown in FIG. 7C, in some implementations, the long-propagating-range eigenstate may be approximately determined using the virial theorem as $$k^2 \approx -\frac{\int_{-\infty}^{+\infty} \psi V(z)\psi * dz}{2\int_{-\infty}^{+\infty} \psi \psi * dz} \quad (21)$$

(due to almost ~1/z functional behavior of V(z) near the potential barrier located in the vicinity of the graphite surface, as shown in FIG. 7C).

Alternatively, the effective Schrodinger equation may be solved numerically. The numerically obtained effective energy level is shown schematically in green (701) in FIG. 7C. The wavelength of the resulting surface wave solution is $\lambda=2\pi/k$, and $L=Im(k)^{-1}$ defines the propagation distance of the wave. Based on the numerical solution, it appears that at $\lambda_0=275$ nm the surface wave propagation distance can reach about 500 nm, which considerably exceeds the surface wave's wavelength computed numerically as $\lambda=2\pi/Re(k)$ =67 nm. This indicates the "propagating" character ($\lambda$<<L) of the surface wave. The long-range propagating surface wave described herein can be tightly localized near the interface. Based on Eq. (9), far from the interface its electric field attenuates as $E_z \sim e^{-kz}$ away from the interface inside both media. In the example shown in FIG. 7C, the attenuation distance away from the interface equals $l=1/k\sim11$ nm. The field configuration in this wave is partially longitudinal, since the electric field component along the propagation direction is non-zero. Based on Eqs. (2), far from the interface $E_x \sim iE_z$, while the only nonzero component of the magnetic field is By $\sim -(2kc/\omega)E_z \sim -(2\lambda_0/\lambda)E_z$.

Figure 8:
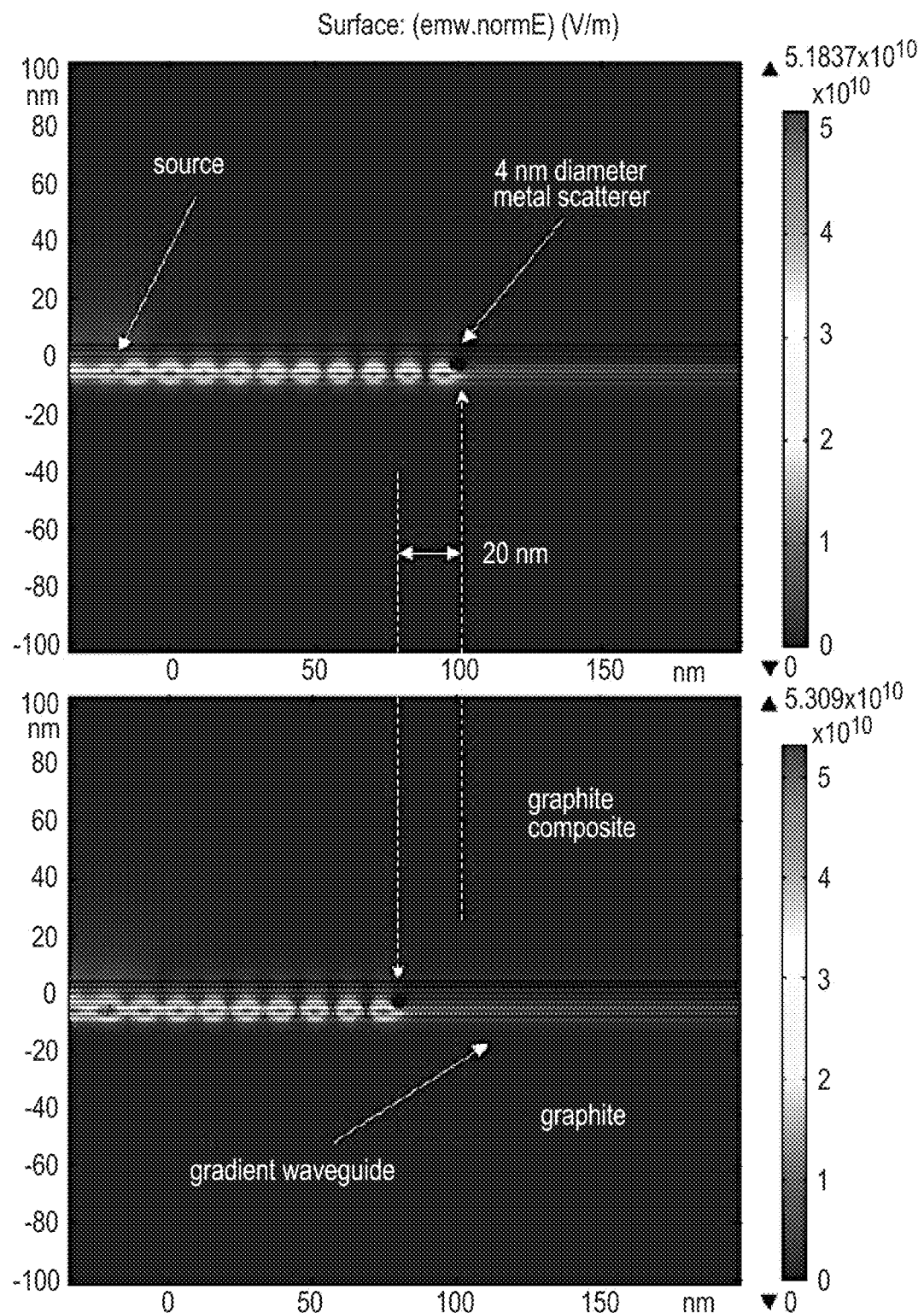
FIG. 8 shows numerical simulations of surface wave excitation and scattering in a graphite-based gradient waveguide at $\lambda_0=275$ nm, according to some embodiments.

Embodiments described herein can apply this low-loss surface electromagnetic wave in super-resolution microscopy and nanolithography techniques as shown in FIG. 8 which shows numerical simulations of surface wave excitation and scattering in a graphite-based gradient waveguide at $\lambda_0=275$ nm. In these simulations the UV light field in the graphite-based gradient surface waveguide can be scattered by a 4 nm diameter metal nanoparticle. A 20 nm shift in nanoparticle position can lead to a drastic change in the UV light distribution, which is consistent with the nanometer-scale wavelength of the surface wave.

In addition to the application to nanophotonics, the embodiments described herein have broad applicability in other applications where it is desirable to establish electromagnetic communication or to perform electromagnetic imaging through a highly lossy conductive medium. The developed theoretical model may be applicable to the imaging of underground structures and mineral deposits, radio communication along the underwater seabed and through a plasma layer around a hypersonic vehicle (such as a returning space capsule), improving propagation through electromagnetic metamaterial structures which typically suffer from high losses, bioimaging, assessment (or reassessment) of mobile phone safety, and many other applications. For example, the low-loss surface electromagnetic wave described herein propagates along the boundaries of different tissues inside a human body at 4G and 5G telecommunication frequencies. The boundaries of different tissues include, for example, the boundaries between the skull and the brain tissues, and the boundaries between muscles and bones. The obtained results have broad applicability in any situation in which electric conductivity changes gradually across some real or imaginary interface. Such interfaces may support low-loss propagation of surface waves of charge density.

SEWs Along a Linear Channel Inside a Lossy Conductive Medium

One or more embodiments described herein include detecting and measuring electromagnetic waves propagating along a linear channel having different conductivity passing through the medium, and the propagation length of such waves may be considerably larger than the skin depth. The embodiments can be applied to enable radio communication and imaging in strongly lossy conductive media such as seawater, various soils, plasma and biological tissues. Other applications of these cylindrical surface electromagnetic waves include active communication through plasma, search for underground cables, propagation of electromagnetic signals along various bones and nerves, and/or the like.

Conductive cylindrical channels may support low-loss propagation of guided electromagnetic waves, such as guided waves in metal waveguides, and cylindrical surface plasmons, which can propagate along metal nanowires. Embodiments described herein include a more general situation in which the dielectric permittivity of a conductive lossy medium changes gradually along the radial distance from a linear one-dimensional channel. Embodiments described herein include transmitting low-loss propagating electromagnetic waves along such a linear channel inside a lossy conductive medium, when, in some implementations, the imaginary part of medium permittivity remains very high. In some implementations, a similar low loss guided wave can be detected when the real part of the medium permittivity is large and negative. The guided cylindrical surface electromagnetic waves (SEWs) discussed herein can be detected when the conductive channel boundary is no longer considered to be abrupt and the SEWs can be in any portion of the electromagnetic spectrum from the extremely low radio frequencies (ELF) up to the visible and UV ranges.

Figure 9:
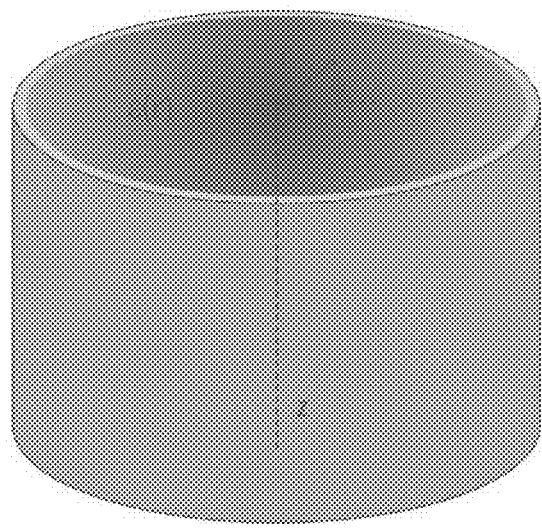
FIG. 9 shows a cylindrical channel in which the medium is non-magnetic (B=H), the dielectric permittivity $\varepsilon$ of a medium is continuous and depends on the radial r coordinate, in some embodiments.

FIG. 9 shows a cylindrical channel in which the medium is non-magnetic (B=H), the dielectric permittivity ε of a medium is continuous and depends on the radial r coordinate: ε=ε(r). Under such conditions spatial variables in the Maxwell equations can be written in the cylindrical coordinates separate, and without the loss of generality, the electromagnetic mode propagation can be in the z direction, leading to field dependencies proportional to $e^{i(m\phi+kz-\omega t)}$, where m is integer. The macroscopic Maxwell equations may be written using cylindrical coordinates $(x^1, x^2, x^3)=(r, \phi, z)$ as:

$$\frac{1}{r}\left(\frac{\partial E_3}{\partial \phi} - \frac{\partial E_2}{\partial z}\right) = -\frac{1}{c}\frac{\partial B^1}{\partial t}, \tag{22}$$

$$\frac{1}{r}\left(\frac{\partial E_1}{\partial z} - \frac{\partial E_3}{\partial r}\right) = -\frac{1}{c}\frac{\partial B^2}{\partial t}, \frac{1}{r}\left(\frac{\partial E_2}{\partial r} - \frac{\partial E_1}{\partial \phi}\right) = -\frac{1}{c}\frac{\partial B^3}{\partial t}$$

$$\frac{1}{r}\left(\frac{\partial H_3}{\partial \phi} - \frac{\partial H_2}{\partial z}\right) = -\frac{1}{c}\frac{\partial D^1}{\partial t}, \tag{23}$$

$$\frac{1}{r}\left(\frac{\partial H_1}{\partial z} - \frac{\partial H_3}{\partial r}\right) = -\frac{1}{c}\frac{\partial D^2}{\partial t}, \frac{1}{r}\left(\frac{\partial H_2}{\partial r} - \frac{\partial H_1}{\partial \phi}\right) = -\frac{1}{c}\frac{\partial D^3}{\partial t}$$

$$\frac{D^1}{r} + \frac{\partial D^1}{\partial r} + \frac{\partial D^2}{\partial \phi} + \frac{\partial D^3}{\partial z} = 0, \frac{B^1}{r} + \frac{\partial B^1}{\partial r} + \frac{\partial B^2}{\partial \phi} + \frac{\partial B^3}{\partial z} = 0, \tag{24}$$

where $D^i = \varepsilon(r) E^i$. Given the assumed $\sim e^{i(m\phi+kz-\omega t)}$ field dependencies, Equations (22-24) may be simplified as follows:

$$\frac{m}{r}E_3 - \frac{k}{r}E_2 = \frac{\omega}{c}B_1, \frac{ik}{r}E_1 - \frac{1}{r}\frac{\partial E_3}{\partial r} = i\frac{\omega}{cr^2}B_2, \frac{1}{r}\frac{\partial E_2}{\partial r} - \frac{im}{r}E_1 = i\frac{\omega}{c}B_3 \tag{25}$$

$$\frac{m}{r}B_3 - \frac{k}{r}B_2 = \frac{\omega}{c}\varepsilon E_1, \frac{ik}{r}B_1 - \frac{1}{r}\frac{\partial B_3}{\partial r} = i\frac{\omega\varepsilon}{cr^2}E_2, \tag{26}$$

$$\frac{1}{r}\frac{\partial B_2}{\partial r} - \frac{im}{r}B_1 = i\frac{\omega}{c}\varepsilon E_3$$

$$\frac{\varepsilon E_1}{r} + \frac{\partial(\varepsilon E_1)}{\partial r} + \frac{im\varepsilon}{r^2}E_2 + ik\varepsilon E_3 = 0, \frac{B_1}{r} + \frac{\partial B_1}{\partial r} + \frac{im}{r^2}B_2 + ikB_3 = 0 \tag{27}$$

When in the m=0 mode, and based on the TM case ($B_2 \neq 0$, $E_1 \neq 0$, and $E_3 \neq 0$) to produce unconventional guided wave solutions, Eqs. (25-27) result in the following wave equation for the m=0 TM modes:

$$-\frac{\partial^2 B_2}{\partial r^2} - \frac{\partial B_2}{\partial r}\varepsilon r\frac{\partial}{\partial r}\left(\frac{1}{\varepsilon r}\right) - \frac{\omega^2}{c^2}\varepsilon B_2 = -k^2 B_2 \tag{28}$$

In the latter equation the wave function may be introduced as $B_2 = (\varepsilon r)^{1/2}\psi$, leading to an effective one-dimensional Schrodinger equation:

$$-\frac{\partial^2 \psi}{\partial r^2} + \left(-\frac{\omega^2}{c^2}\varepsilon + \frac{1}{2\varepsilon r}\left(\frac{\partial \varepsilon}{\partial r}\right) - \frac{1}{2\varepsilon}\left(\frac{\partial^2 \varepsilon}{\partial r^2}\right) + \frac{3}{4\varepsilon^2}\left(\frac{\partial \varepsilon}{\partial r}\right)^2 + \frac{3}{4r^2}\right)\psi = -k^2 \psi \tag{29}$$

In this equation the $-k^2$ term plays the role of an effective total energy, while the effective potential V(r) can be written as $$V = -\frac{\omega^2}{c^2}\varepsilon + \frac{1}{2\varepsilon r}\left(\frac{\partial \varepsilon}{\partial r}\right) - \frac{1}{2\varepsilon}\left(\frac{\partial^2 \varepsilon}{\partial r^2}\right) + \frac{3}{4\varepsilon^2}\left(\frac{\partial \varepsilon}{\partial r}\right)^2 + \frac{3}{4r^2} \tag{30}$$

Solutions of Eq. (29) can have a propagating wave character (Im(k)<<Re(k)) and a gradient-index medium which supports such a propagating wave solution does not need to be a low loss medium. For example, such lossy media as seawater and ionospheric plasma, which have almost pure imaginary dielectric permittivity $\varepsilon(z) = i\varepsilon''(z) = i\sigma(z)/\varepsilon_0\omega$ (where $\varepsilon_0$ is the dielectric permittivity of vacuum, and the medium conductivity $\sigma(z)$ is expressed in practical SI units) may give rise to Im(V)<<Re(V):

$$V = -\frac{i\sigma\omega}{\varepsilon_0 c^2}\varepsilon + \frac{1}{2\sigma r}\left(\frac{\partial \sigma}{\partial r}\right) - \frac{1}{2\sigma}\left(\frac{\partial^2 \sigma}{\partial r^2}\right) + \frac{3}{4\sigma^2}\left(\frac{\partial \sigma}{\partial r}\right)^2 + \frac{3}{4r^2} \tag{31}$$

Since the derivative terms in Eq. (31) are real, and they may be much larger than the first term, the radial distribution of σ(r) may be chosen in such a way that the effective potential V will be negative (attractive) and almost real. In a similar fashion, such media as good metals and ionospheric plasma at higher frequencies, which have almost pure real negative dielectric permittivity in the MHz range may also give rise to real negative V(r) if the derivative terms dominate in Eq. (30). In both cases a low loss propagating mode may arise.

In some implementations, a gradient medium based on a highly lossy material (such as ground, sea water or ionospheric plasma at low frequencies), can have almost pure imaginary dielectric permittivity in the low frequency RF ranges. In a power law radial distribution of conductivity in such a medium, $$\sigma \approx iAr^n, \tag{32}$$

and ε'<<ε", where A is some real coefficient. Based on Eqs. (30-31), the effective potential V in such case equals $$V(r) = -\frac{\omega^2}{c^2}iAr^n + \frac{(n+2)^2 - 3}{4r^2} \tag{33}$$

The situations that V(r) can be attractive (Re(V)<0) results in $|n+2|<3^{1/2}$, while to obtain Im(V)<<Re(V) at small r implies that n>−2. As a result, the following necessary condition for the existence of guided waves:

$$-2 < n < -2 + \sqrt{3} \tag{34}$$

Assuming as an example that $n=-\frac{1}{2}$ (so that $\varepsilon = iA/r^{1/2}$), the effective potential is $$V(r) = -\frac{iA\omega^2}{c^2 r^{1/2}} - \frac{3}{16r^2} \tag{35}$$

Figure 10A:
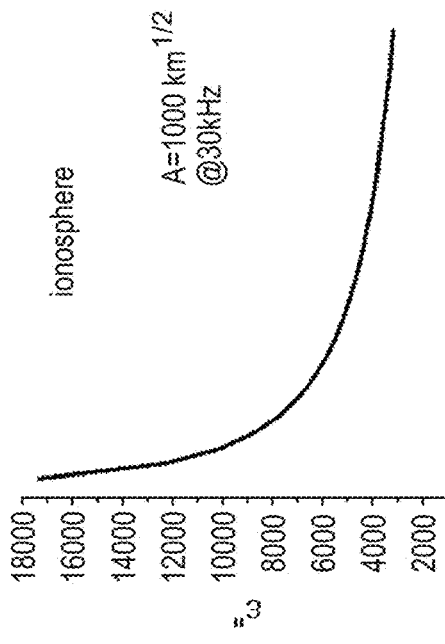
FIGS. 10A-10B show the effective potential of the effective potential of a cylindrical channel for $A=3000000 \text{ m}^{1/2}$ at n=30 kHz in a seawater-like medium, in some embodiments.
Figure 10C:
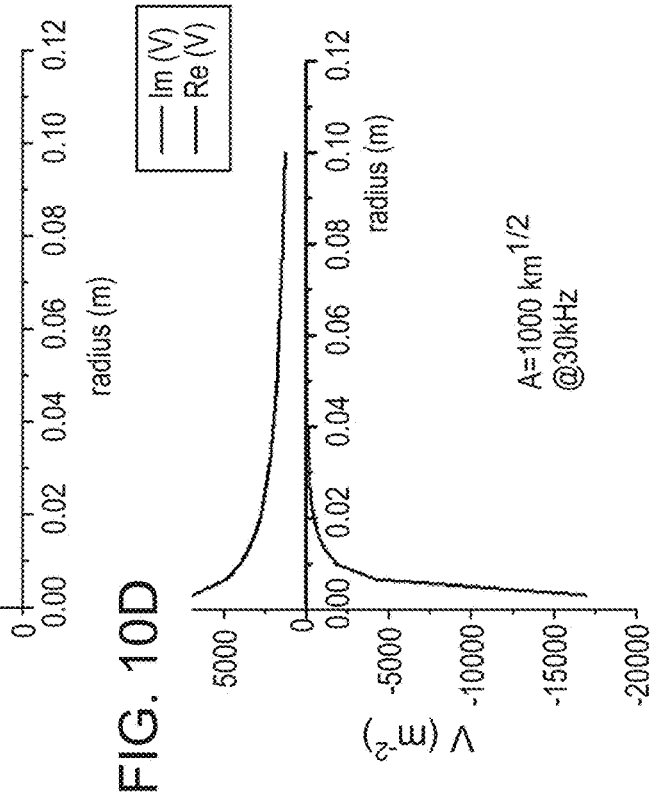
FIGS. 10C-10D show the computational results of the effective potential of a cylindrical ionospheric plasma channel in a seawater-like medium, in some embodiments.
Figure 10B:
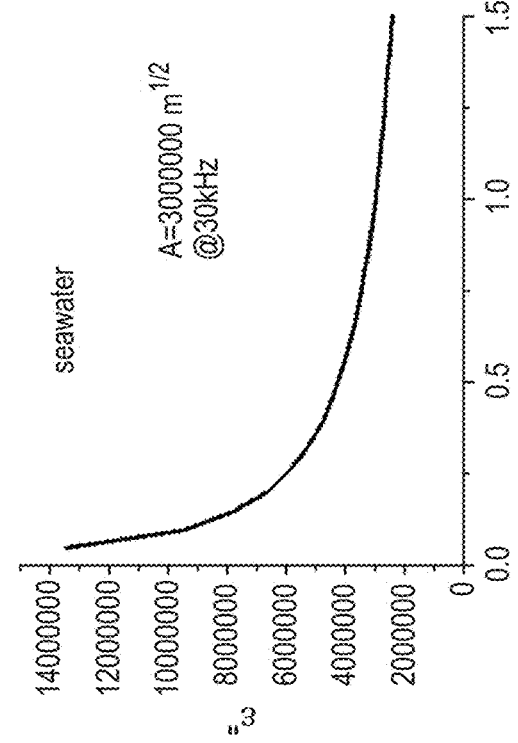
Figure 10D:
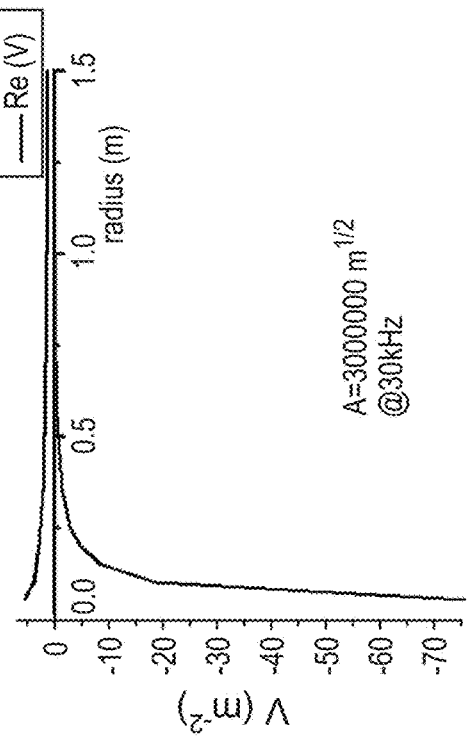
Figure 11A:
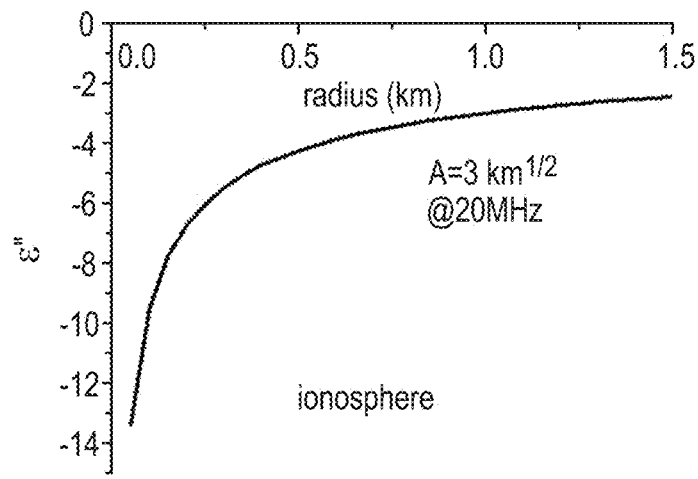
FIGS. 11A-11B show the computational results of the effective potential of an ionospheric plasma channel, in some embodiments.
Figure 11B:
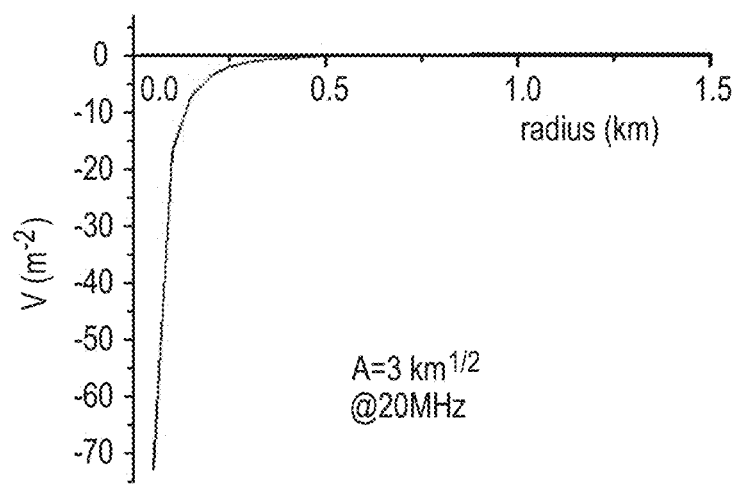

FIGS. 10A-10B show the computational results of the effective potential for $A=3000000$ m$^{1/2}$ at v=30 kHz for a cylindrical channel in a seawater-like medium, in some embodiments. In agreement with the qualitative arguments discussed above, the effective one-dimensional potential well near such a linear channel can be deep, and that Im(V)<<Re(V). Similar to any other 1D Schrodinger equation, such a potential well can have at least one bound state. Such a bound state can give rise to at least one solution having almost pure real wave vector k, which corresponds to a guided cylindrical mode with a long propagation length. A similar computation performed for a cylindrical ionospheric plasma channel for $A=1000$ km$^{1/2}$ at v=30 kHz is shown in FIGS. 10C-10D. FIGS. 11A-11B show the computational results of the effective potential of an ionospheric plasma channel, in some embodiments. Specifically, FIG. 10A shows the computational results of the imaginary part of the dielectric permittivity of a seawater channel $\varepsilon''(r)$ defined by Eq. (32) at $n=-\frac{1}{2}$ and $A=3000000$ m$^{1/2}$. FIG. 10B shows the computational results of the real and imaginary parts of the corresponding effective potential V(r) at 30 KHz. FIG. 10C shows the computational results of the imaginary part of the dielectric permittivity of an ionospheric plasma channel $\varepsilon''(r)$ defined by Eq. (32) at $n=-\frac{1}{2}$ and $A=1000$ km$^{1/2}$. FIG. 10D shows the computational results of the real and imaginary parts of the corresponding effective potential V(r) at 30 KHz.

In some implementations, a quantum particle placed inside an inverse square potential well can fall to the "bottom" of the well. Since V(r) cannot diverge at r=0 in some situations, and therefore the inverse square potential well can be cut off at some r=a, the ground state observed in such a cutoff potential well can be located close to the bottom of the well. Therefore, the wave vector of the ground state may be approximated as $$k \approx \frac{\sqrt{3}}{4a} \tag{36}$$

Alternatively, the effective Schrodinger equation (29) may be solved numerically using the Numerov method. The wavelength of the resulting guided wave solution is $\lambda=2\pi/k$, and $L=\text{Im}(k)^{-1}$ defines the propagation distance of the wave, which may be found based on the well-known shallow well approximation as $$\text{Im}(k) = \text{Im}\left(\frac{1}{2}\int dr V(r)\right) \tag{37}$$

Since the cutoff parameter a may be chosen to be much smaller than the free space wavelength $\lambda$, the newly found guided wave solution may also find applications in super-resolution microscopy and nanolithography techniques in the UV range, where materials are highly lossy.

Similar analysis can be applied to the case of an ionospheric plasma channel at higher frequencies in the 20-40 MHz range, which has almost pure real negative dielectric permittivity in this range. In some implementations, the following power law radial distribution of the dielectric permittivity inside the channel applies:

$$\varepsilon = -Ar^n, \tag{38}$$

where A is a real positive coefficient. Based on Eq. (30), the effective potential V in such a case equals $$V(r) = \frac{\omega^2}{c^2} Ar^n + \frac{(n+2)^2 - 3}{4r^2} \tag{39}$$

If once again $n=-\frac{1}{2}$ is assumed, the effective potential is $$V(r) = \frac{A\omega^2}{c^2 r^{1/2}} - \frac{3}{16r^2} \tag{40}$$

in the r→0 limit the second term dominates, and the effective potential is attractive. FIGS. 11A-11B show the computational results of the effective potential of an ionospheric plasma channel for $A=-3$ km$^{1/2}$ at n=20 MHz (based on the data for dielectric permittivity of the ionosphere plotted), in some embodiments. Similarly, the effective potential supports a ground state near $$k \approx \frac{\sqrt{3}}{4a}, \tag{41}$$

where a is the potential cutoff. FIG. 11A shows the computational results of the real part of the dielectric permittivity of an ionospheric channel $\varepsilon'(r)$ at 20 MHz defined by Eq. (38) at $n=-\frac{1}{2}$ and $A=-3$ km$^{1/2}$. FIG. 11B shows the computational results of the real and imaginary parts of the corresponding effective potential V(r) at 20 MHz.

In cases considered above (a strongly absorptive lossy conductive medium like seawater or ionospheric plasma at low frequencies, or the higher frequency ionospheric plasma case where the dielectric permittivity is almost real and negative), a linear channel inside a conductive medium may support long distance propagation of a guided cylindrical wave. The condition for such a guided wave to exist can include the properly engineered radial distribution of dielectric permittivity around the channel.

The obtained results have broad applicability in situations where it is desirable to establish electromagnetic communication or to perform electromagnetic imaging through a highly lossy conductive medium. For example, the developed computational model may be applicable to radio communication through the ionosphere from a low Earth satellite to a submerged submarine.

In some implementations, the ionosphere can be a shell of electrons and electrically charged ions that surrounds the Earth, stretching from a height of about 50 km to more than 1,000 km. In the examples shown in FIGS. 10C, 10D, 11A, and 11B, either ionosphere conductivity or its plasma frequency are changed by roughly a factor of 2 in an artificial 10-100 m diameter cylindrical channel. This additional ionization can be achieved using a satellite-mounted UV laser (e.g., resonant propagation of laser radiation in the ionosphere and artificial modification of the electromagnetic properties of the atmosphere to facilitate RF and microwave propagation). In some implementations, solar irradiance in the UV range averages at about 0.5 W/m2/nm in the UV range. In some implementations, the high power narrow linewidth UV lasers can exceed this number by at least nine orders of magnitude. Thus, a beam of such a high-power UV laser that expands from its initial ~1 mm size to 10-100 m diameter can produce the additional atmospheric ionization for the calculations summarized in FIGS. 10C, 10D, 11A, and 11B.

Embodiments described herein include calculating and demonstrating low-loss guided electromagnetic waves propagating along a linear channel inside a lossy medium when the medium permittivity changes continuously in the radial direction. Similar to surface plasmons, the wavelength of this wave may be considerably shorter than the light wavelength in free space, which may enable its applications in super-resolution microscopy and nanolithography techniques. The obtained results also have broad applicability in other portions of the electromagnetic spectrum down to very low frequencies. For example, similar long-range guided electromagnetic radio waves are capable of propagating through seawater and ionospheric plasma, which may enable direct communication from a low Earth satellite to a submerged submarine.

Surface Electromagnetic Wave (SEW)-Based Underwater and Underground Communication and Imaging Surface electromagnetic wave (SEW) is an electromagnetic excitation that propagates in a wave-like fashion along an interface between two mediums (e.g., a conductor medium and a dielectric medium.) Embodiments described herein include methods, apparatus, and/or systems using surface electromagnetic wave (SEW)-based underwater (and underground) communication and super-compact extremely low frequency (ELF) antennas to develop high resolution (e.g., of the order of 1 m or $\lambda/10^6$) three-dimensional imaging of underwater (or underground) objects (e.g., submarines, underwater cables, mines, unmanned underwater vehicles (UUVs), and/or the like).

Embodiments described herein include a compact tunable surface electromagnetic wave antenna operating in a frequency of, for example, 3-11 KHz range. In some implementations, the underwater SEW antenna, having the compact helical design, can generate high intensity electromagnetic fields at, for example, 3 KHz. In some implementations, enclosing the antenna in deionized (DI) water can reduce substantially the volume of the structure and the amount of metal wire necessary to operate at ELF. The underwater SEW antenna has magnetic and electric characteristics that make it suitable for underwater operation because, for example, both its currents and its charges can be shielded from direct contact with seawater which tends to attenuate them.

One or more embodiments described herein include an example analytical model for the SEW propagation along the rippled seawater surface as a function of the operating frequency from ELF to low MHz frequency range. One or more embodiments described here include the numerical analysis of the SEW-based underwater (and underground) imaging techniques in applications such as submarine and underwater cable imaging.

Compared to the known methods of analyzing 3-D ELF scattering maps, these embodiments described herein do not have the inverse scattering problem in a surface wave dominated scenario. In one embodiment, the method includes separating the depth (z) and lateral (x and y) variables in the SEW scattering data. In one embodiment, the method includes interpreting the lateral scattering data using the large effective refractive index of seawater in the ELF range. In addition to the high spatial resolution, benefits of the embodiments described herein, compared to known sonar techniques, include that the ELF scattering maps exhibit strong dielectric contrast. Moreover, compared to sonar techniques, the embodiments described herein produce minimum disturbance or adverse effects on marine life.

In some embodiments, a SEW-based underwater communication and imaging system (as described with respect to FIG. 6 and FIG. 48) includes a set of underwater SEW antennas, which can be configured to generate surface electromagnetic (SEW) signals and communicate with (or image) an object (not shown) located underwater. The set of underwater SEW antennas may receive electromagnetic signals back from the object and send them to a control unit for processing. During operation, the processor of the control unit may generate an input signal and send the input signal to at least one antenna from the set of underwater SEW antennas to generate the electromagnetic signals. The processor can be configured to individually adjust one or more parameters (e.g., phase, power level, wavelength, direction of the electromagnetic signal, relative position and distance from another antenna, depth in the medium, and/or the like) of each antenna from the set of underwater SEW antennas. Upon receiving the signals back from the antenna, the processor can be configured to process the signals and in some implementations, produce an image of the object. In some implementations, the processor can determine, depending on the locations of the object and each antenna, one or more antennas from the set of underwater SEW antennas to use for optimal performance.

In some embodiments, the underwater SEW antenna can include a main helical antenna having an antenna tip. The main helical antenna may be placed in an enclosure (or container) filled with, for example, DI water (or other impedance matching fluid). The underwater SEW antenna can include a number of ferrite-loaded coils with a number of layers. The underwater SEW antenna can include a ferrite slab reflector, which can be used as magnetic mirrors. The underwater SEW antenna can be submerged in seawater.

In this disclosure, $\omega$ represents the temporal angular frequency of photon. k represents the wave number (or wave vector). $\lambda$ represents the wavelength. $\varepsilon$ represents the dielectric permittivity of the medium. c represents the speed of the photon. $\psi$ is the disturbance describing the wave (for example, for an ocean wave, $\psi$ can be the excess height of the water, or for a sound wave, $\psi$ would be the excess air pressure). $\sigma$ represents the conductivity of the medium. E represents the electric field. B represents the magnetic field. D represents the electric displacement.

The antenna or the set of antennas (e.g., 601 in FIGS. 6 and/or 4801 in FIG. 48) is also referred to herein as the underwater SEW antenna, the SEW antenna, the underwater antenna, SEW-based antenna, or the antenna. The antenna or the set of antennas can include a single antenna having a single antenna element, a single antenna having a set of antenna elements (e.g., a phased array of antenna elements that is controlled by the processor and that can create a beam of SEWs that can be electronically steered to point in different directions without moving the set of antenna elements) and/or multiple antennas. The underwater SEW antenna described herein can also be used to detect objects underground, such as hardened and deeply buried targets (HDBTs) underground. The surface electromagnetic waves are also referred to as surface electromagnetic signals, surface signals, surface waves.

Figures 12A, 12B:
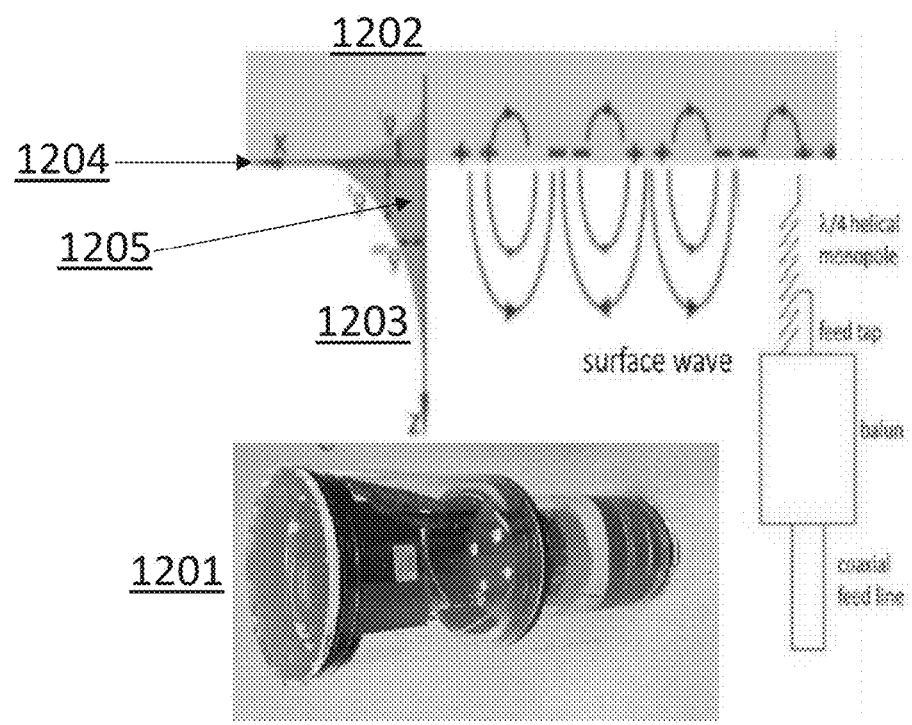
FIGS. 12A-12B show an underwater surface electromagnetic wave (SEW) antenna operating near a conductor-dielectric interface, in some embodiments.
Figures 13A, 13B:
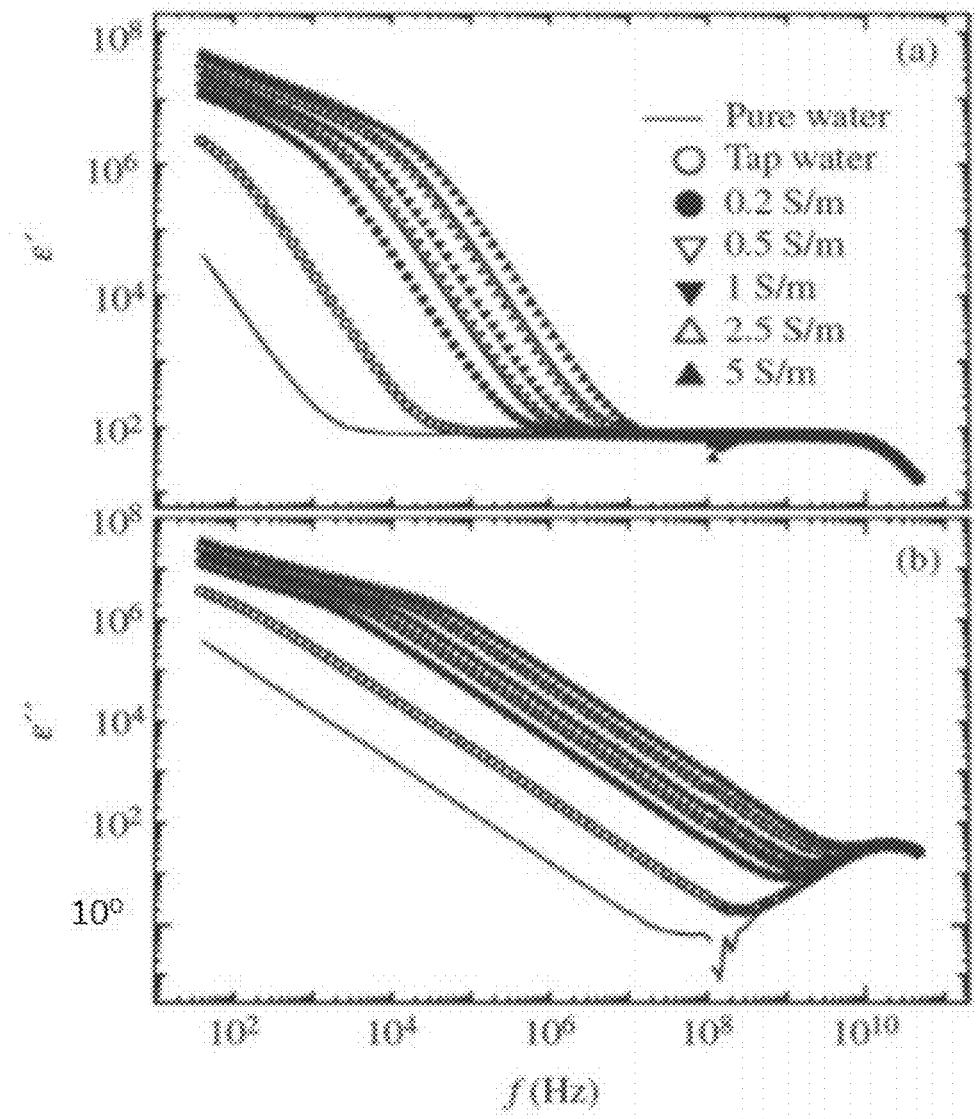
FIGS. 13A-13B show frequency dependences of the real and imaginary parts of the complex dielectric constants of different medium, in some embodiments.

FIGS. 12A-12B show an underwater SEW antenna operating near a conductor-dielectric interface, in some embodiments. The underwater SEW antenna 1201, as shown in FIG. 12B, can operate in a frequency of 2 MHz underwater. FIG. 12A shows a graph of the amplitude of the SEW field 1205 as a function of a distance from an interface 1204 between a first medium 1202 and a second medium 1203. The amplitude of the SEW field 1205 can decay exponentially with increasing distance into each medium 1202, 1203, from the interface 1204. Thus, the SEW field (the shaped area 1205) can be confined to the near vicinity of the dielectric-conductor interface 1204. This confinement can lead to an enhancement of the electromagnetic field at the interface 1204, resulting in an increase in sensitivity of SEWs to near-surface conditions. Embodiments described herein include using this extreme sensitivity to achieve high resolution underwater imaging. The two-dimensional (2D) nature of SEWs provides significant flexibility in engineering SEW-based imaging techniques. Embodiments described herein use long range SEW propagation along the seawater/air interface for detecting and imaging underwater targets, including the shape and electromagnetic properties. The imaging techniques can use a radar arrangement, and/or a scanning modality of the SEW-based imaging technique. Embodiments described herein provide the spatial resolution in the free space wavelength, of up to $\lambda/10^6$ range. Embodiments described herein include using the natural environmental ELF/VLF background for detecting and imaging underwater targets. FIGS. 13A-13B show frequency dependences of the real (FIG. 13A) and imaginary (FIG. 13B) parts of the complex dielectric constants of pure water, tap water, and sodium chloride aqueous solutions with various Direct Current (DC) conductivities.

Procedures

The dielectric permittivity of seawater in the frequency range of ELF to low MHz frequency may be described as $$\varepsilon^*(f) = \varepsilon'(f) - j\varepsilon''(f) = \varepsilon_\infty + \frac{\Delta\varepsilon}{1 + 2jf\tau} - j\frac{\sigma_{dc}}{2f\varepsilon_0} \quad (42)$$

where f is the operating frequency, $\tau$ is the relaxation time, and $\sigma_{DC}$ is the low frequency conductivity of seawater. It is often assumed that the low frequency seawater conductivity equals $\sigma_{DC}=5$ S/m, and it is a purely real number, resulting in a dielectric permittivity of $\varepsilon'\sim81$, which does not depend on the frequency in the ELF range. However, recent experimental measurements (as shown in FIGS. 13A-13B) indicate that in the ELF range, the space charge effects can result in a non-zero imaginary part of seawater conductivity. Embodiments described herein describe a first situation in which the conductivity of seawater is $\sigma_{DC}=5$ S/m and the dielectric permittivity is $\varepsilon'\sim81$, and a second situation in which the seawater conductivity includes a non-zero imaginary component.

Figure 14:
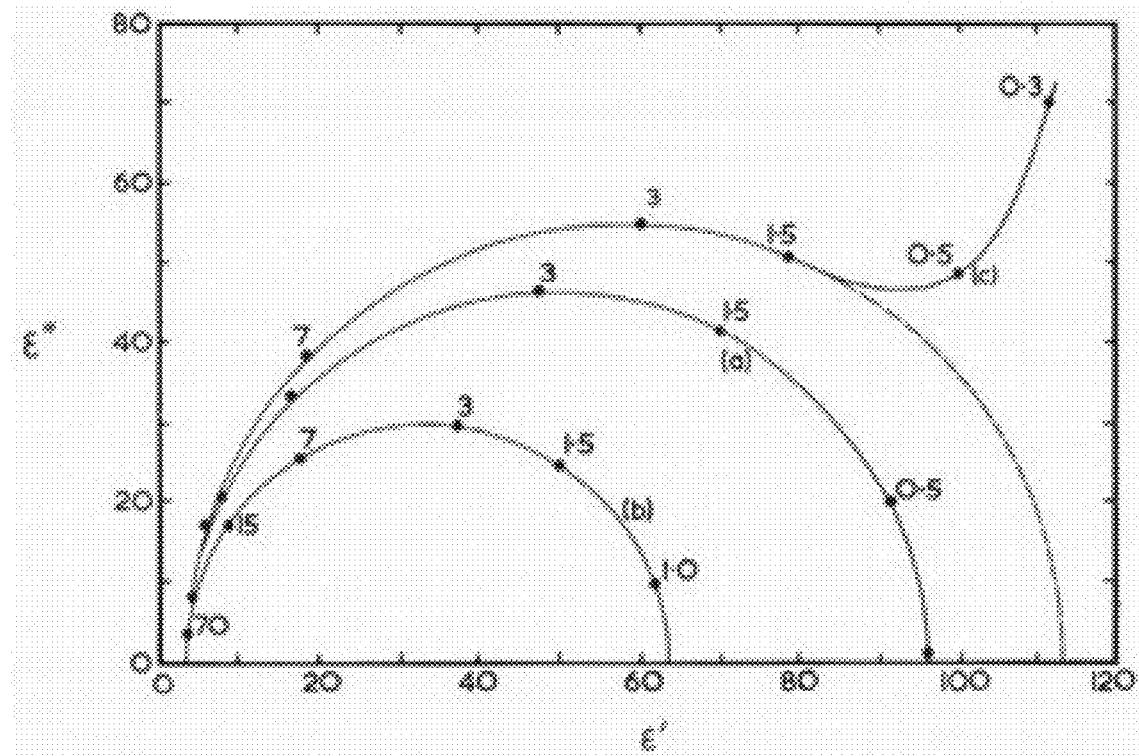
FIG. 14 shows the relative permittivity and loss factor of ice samples at $-10.8°$ C., in some embodiments.

In some situations, the seafloor conductivity may vary depending on particular location. The average value of the seafloor conductivity $\sigma=0.01$ S/m may be used in numerical simulations. FIG. 14 shows the relative permittivity (abscissae, or the horizontal axis 1401) and loss factor (ordinates, or the vertical axis 1402) of ice samples at $-10.8°$ C. Frequencies in kHz are marked against measured points for (a) pure ice, free from cracks, bubbles, impurities, or stress; (b) with a crack perpendicular to the electric field reducing e, and (c) with impurities, increasing the DC conductivity and increasing e.

Figures 15A, 15B:
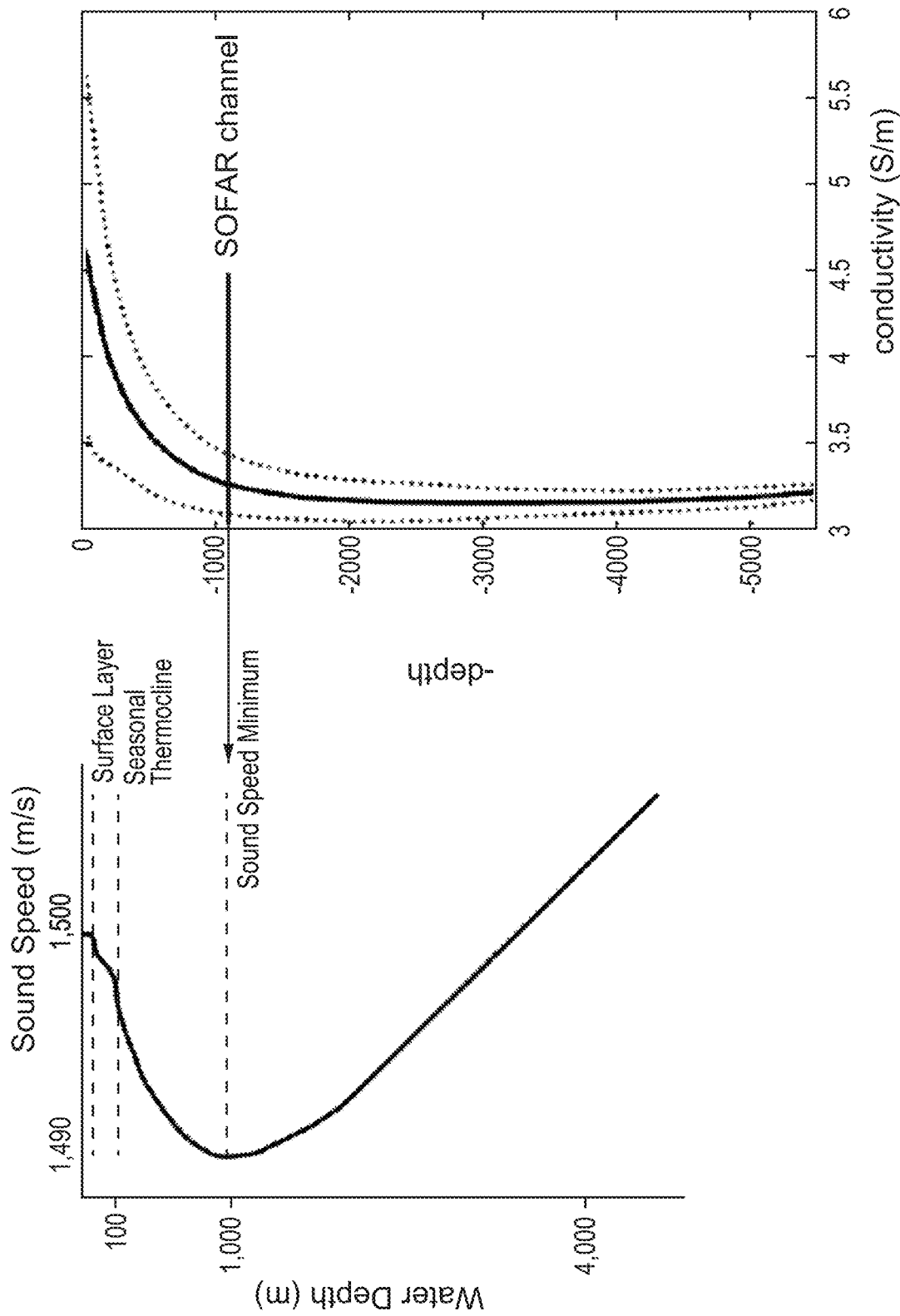
FIGS. 15A-15B show a comparison of the depth variation of sound speed and the electrical conductivity in seawater, in some embodiments.
Figure 16A:
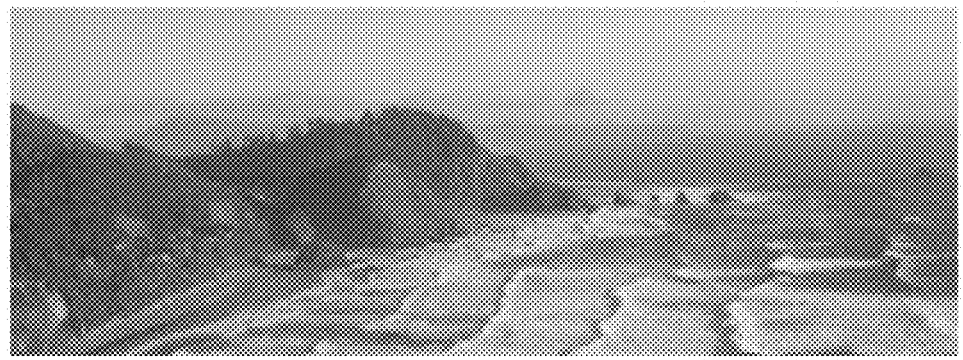
FIGS. 16A-16B show seawater surface and a graph of wave height and wave period as a function of wind speed blowing along the sea surface, in some embodiments.
Figure 16B:
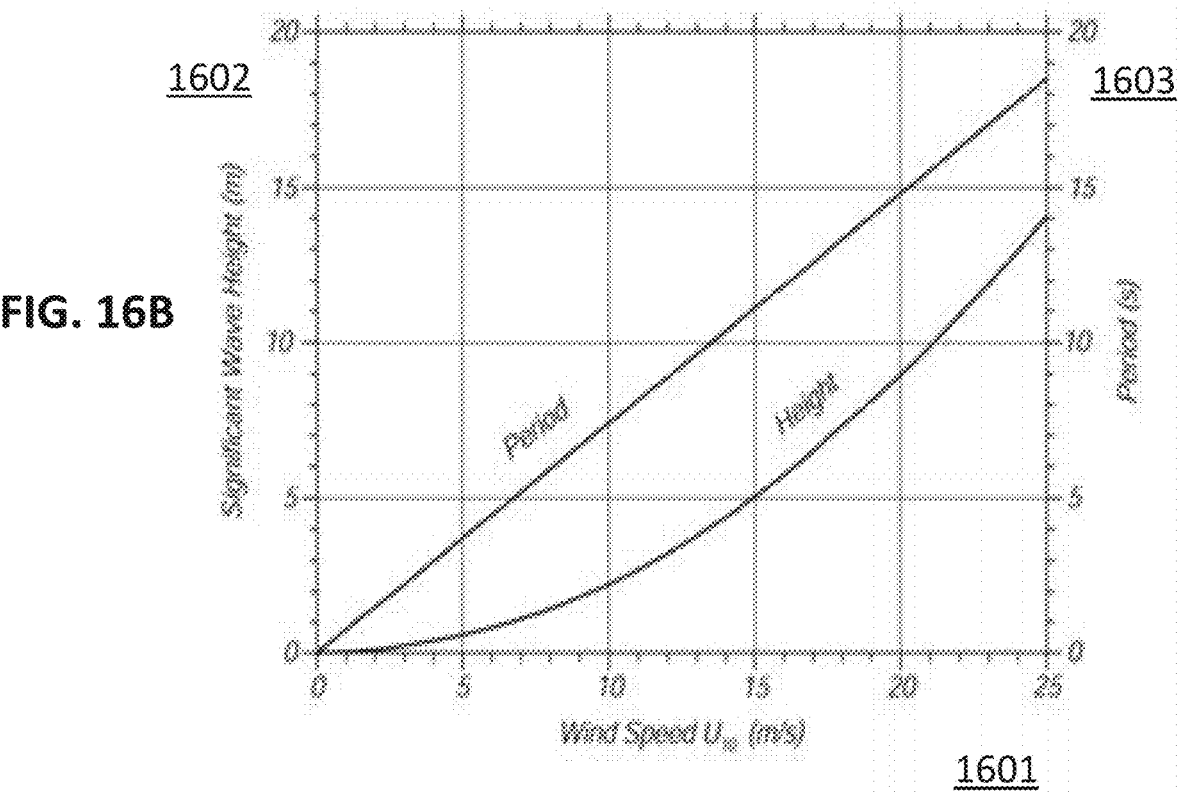
Figure 17:
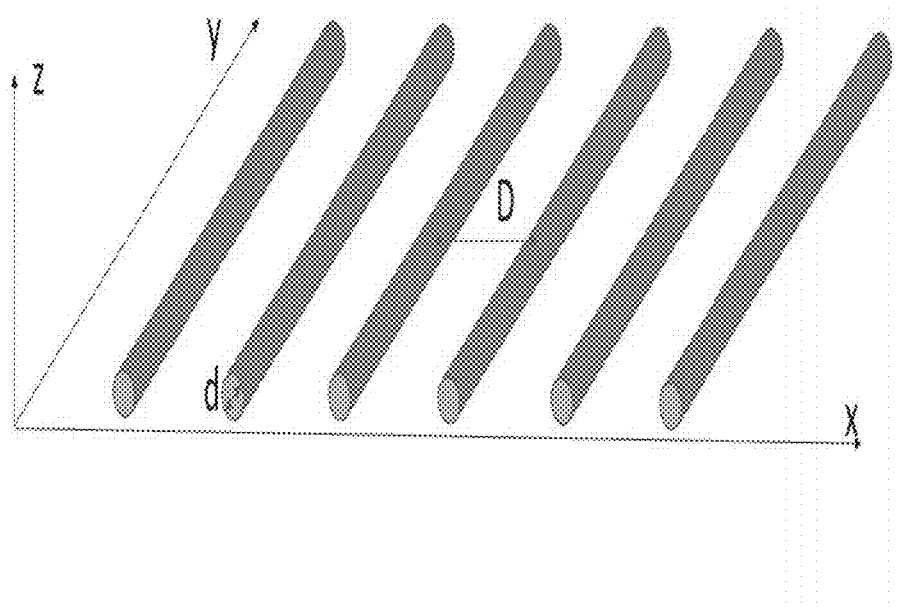
FIG. 17 shows a simulation of the transition layer of the seawater surface, in some embodiments.

In some situations, seawater can exhibit strong variations in electrical conductivity as a function of depth and location. A comparison of the depth variation of sound speed and the electrical conductivity in seawater is shown in FIG. 15A and FIG. 15B, respectively. In these situations, the acoustic sound fixing and ranging (SOFAR) communication channel coincides with a drastic change in seawater conductivity, which means that it may affect SEW-based communication and imaging. Embodiments described herein include exciting a SEW propagating along the SOFAR channel and simulating the effect of the variations on SEW scattering by underwater objects using simulation models (e.g., COMSOL Multiphysics.) SIMULATION The seawater surface can be perturbed by waves, which are driven by winds blowing along the sea surface, as shown in FIG. 16A. FIG. 16B shows a graph of wave height 1602 and wave period 1603 as a function of wind speed 1601 blowing along the sea surface. In some situations, the transition layer can be simulated (or modelled) as an array of parallel cylinders having the dielectric properties of seawater (as shown in FIG. 17). The dielectric permittivity of the transition layer can be associated with the permittivity of seawater. The distance D between these cylinders and the cylinder diameters d can be associated with the period and height of the waves at a given wind speed (as shown in FIGS. 16A-16B). Depending on the ratio of the wave period D to the free space wavelength of the electromagnetic waves $\lambda_0$, in some embodiments, the processor included in the apparatus can simulate the transition layer properties using, for example, photonic crystal models or metamaterial models. In some situations, the metamaterial properties can be simulated in the ELF range, while the photonic crystal model can be used in the low MHz range.

Figure 18:
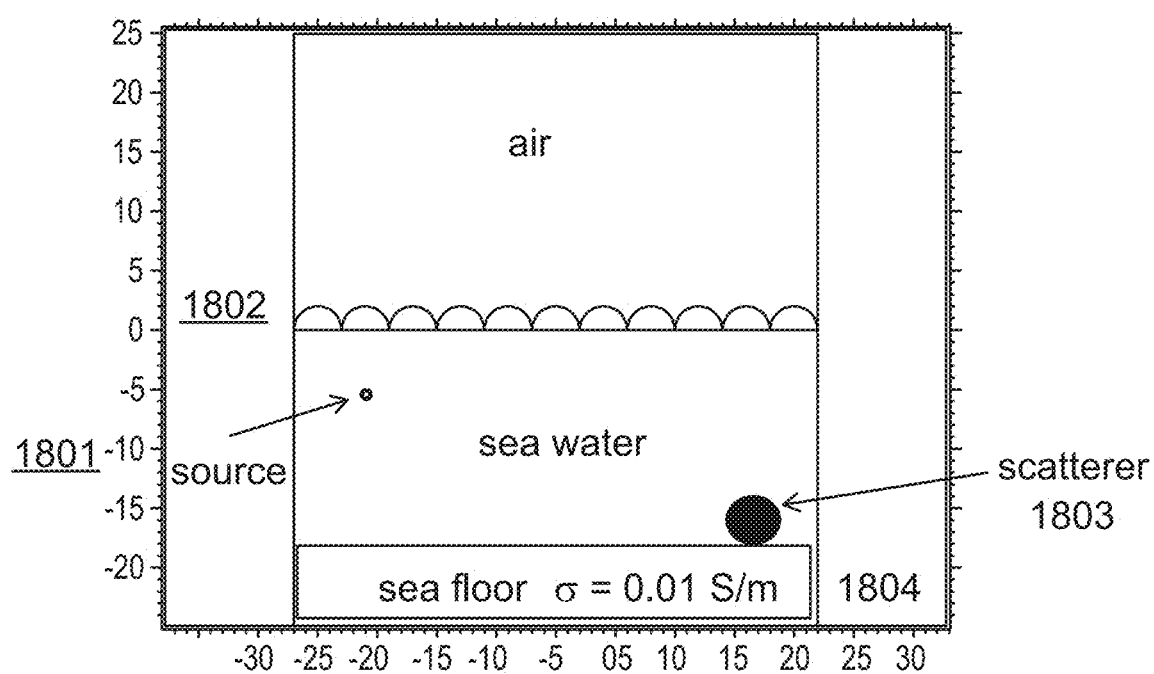
FIG. 18 shows an example geometry of models used to simulate SEW excitation and scattering by an underwater object, in some embodiments.

FIG. 18 shows an example geometry of models used to simulate SEW excitation and scattering by an underwater object. Some embodiments described herein include simulations of the electromagnetic properties of the transitional sea surface layer and the modeling of SEW excitation and scattering using models described herein and shown in FIG. 18. In some implementations, the models described herein can be based on the COMSOL Multiphysics EM model. In some embodiments, an underwater point source 1801 can be used to excite SEW, which propagates along a rippled sea surface and is scattered by a long cylindrical metallic object (such as a metallic cable) placed underwater. The rippled seawater surface can be represented by semi-cylinders 1802. The SEW source 1801 and the scatterer 1803 may be placed at different depths at different distances from each other and from the seafloor. The other model parameters that may be configured and varied during simulations include the source frequency and the semi-cylinder radii (which represent different height of ocean waves). Alternatively, the wavy sea surface may be replaced with a flat layer of ice, which dielectric properties are described with respect to FIG. 14. In addition, the seafloor 1804 in the geometry shown in FIG. 18 may be replaced by the SOFAR layer (the dielectric properties are described with respect to FIGS. 15A-15B.)

Figure 19:
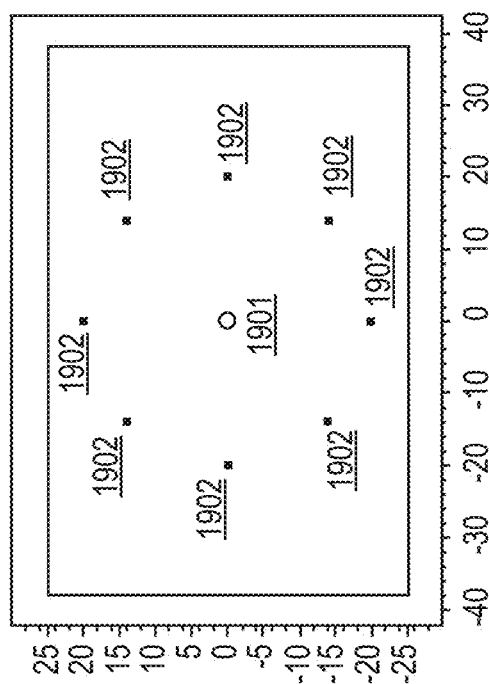
FIG. 19 shows a geometry of the modeling of background SEW scattering by an underwater object, in some embodiments.

In some implementations, the modeling of SEW excitation and scattering can be used to simulate scattering of natural background SEW fields by underwater objects. FIG. 19 shows a geometry of the modeling of background SEW scattering by an underwater object. The natural omnidirectional SEW background can be emulated by point SEW sources 1902 arranged in a circular pattern around an underwater object 1901. A differential image obtained in this source configuration with and without a scatterer placed in the middle produces the expected SEW field distribution to be used in experimental testing.

Antenna Design

In some implementations, the underwater SEW antenna (e.g., 1201 shown in FIG. 12B) can be designed and configured to (1) match the field configuration of the SEW antenna and the SEW mode propagating along the seawater surface, (2) be implemented in a deionized (DI) water antenna enclosure to reduce antenna dimensions, (3) be tuned for SEW excitation, and/or (4) be implemented with magnetic mirrors to increase magnetic dipole moment of the SEW antenna.

In these implementations, the SEW antenna can generate magnetic (B) and electrical (E) fields in a configuration to match field configuration of the surface electromagnetic wave, as described with respect to FIG. 12A. An example of the underwater SEW antenna for operation in the 2 MHz band is shown in FIG. 12B. The SEW antenna operation can be based on the field enhancement at the underwater SEW antenna tip and on an impedance-matching antenna enclosure, which can be filled with DI water. This enclosure allows us to reduce antenna dimensions and to improve the coupling of electromagnetic energy to the surrounding seawater medium. In addition, the enclosure prevents the surrounding seawater medium from "shorting" the SEW antenna. Since surface wave propagation length far exceeds the skin depth of conventional radio waves at the same frequency, this technique can be used in broadband underwater wireless communication and underwater imaging over distances that exceed the conventional skin depth in seawater.

Figure 20:
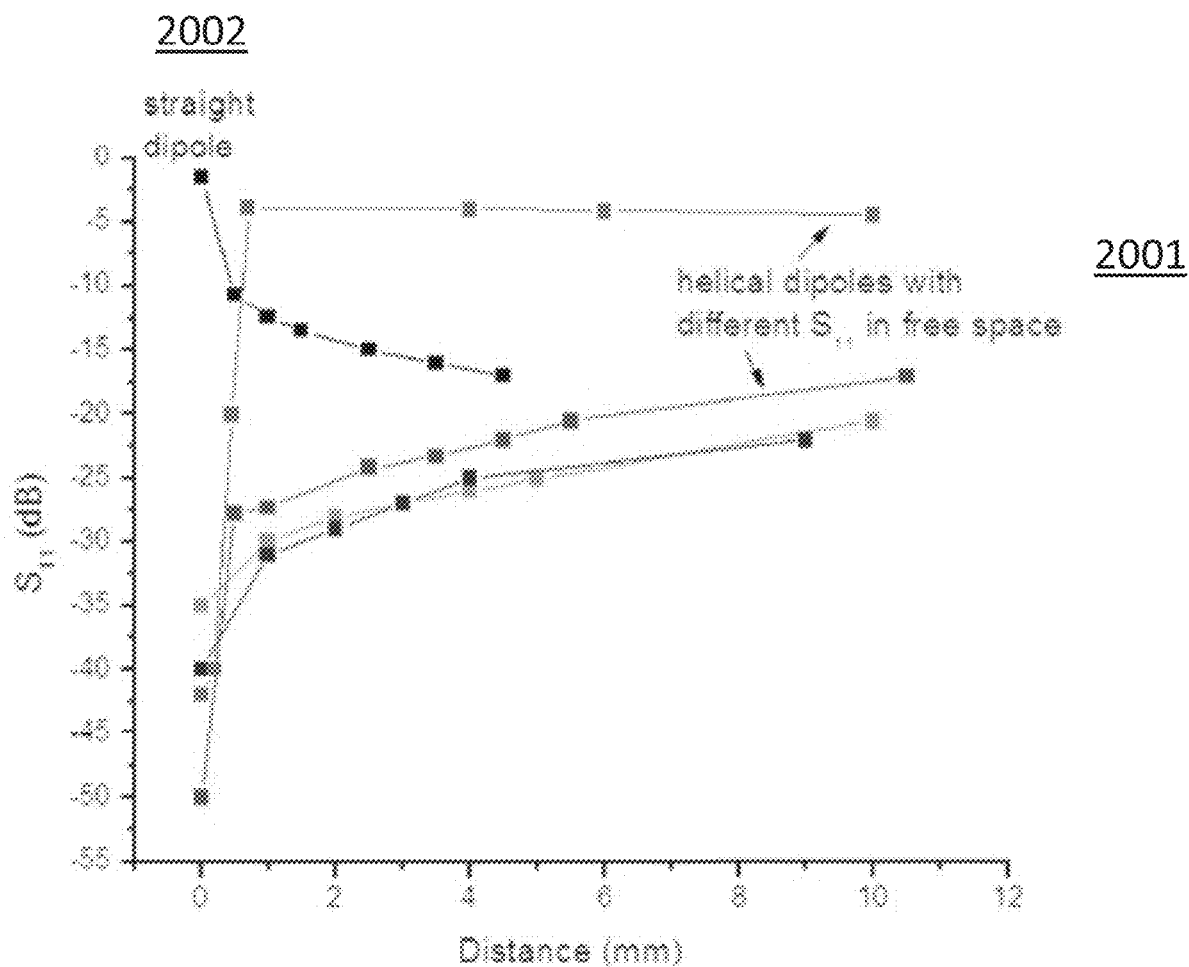
FIG. 20 shows a process of tuning the SEW antenna as a function of distance from a large copper plane, in some embodiments.

In some implementations, the underwater SEW antenna can be tuned for 2D emission into SEW modes. FIG. 20 shows a process of tuning the SEW antenna as a function of distance from a large copper plane, in some embodiments. The tuning of the SEW antenna (e.g., a SEW helical antenna) can be conducted via measurements of $S_{11}$ as a function of distance from a large copper plane. In some implementations, $S_{11}$ is the standard coefficient used in characterizing a frequency response of a generic four-port system. $S_{11}$ can indicate coupling to SEW. The tuning parameter can be the tapping point to a feeding coaxial line. In some implementations, the tuning of the parameter can be performed by moving the tapping point. Behavior of regular (straight) dipole antenna optimized for radiation into free space is presented for a comparison.

Figure 21:
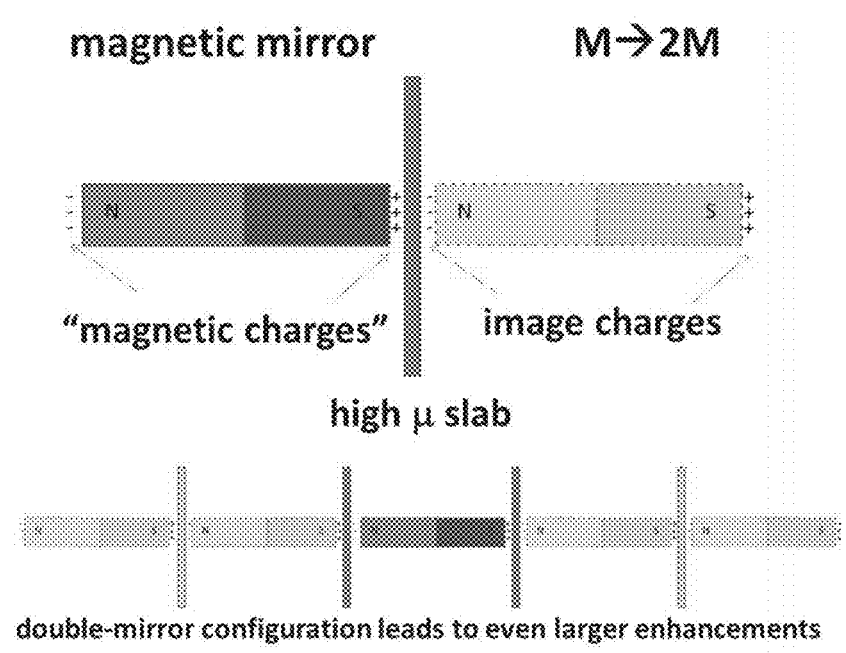
FIG. 21 shows implementation of magnetic mirrors in the SEW antenna design, in some embodiments.

FIG. 21 shows implementation of magnetic mirrors in the SEW antenna design, in some embodiments. The magnetic mirrors can reduce antenna size, which can keep low SWAP-C of the SEW antenna in the ELF range. The magnetic mirrors used at both ends of the SEW antenna (or the magnetic double-mirror configuration) can lead to considerable enhancement of the magnetic dipole moment of the SEW antenna without increasing its geometrical sizes and operating power. The magnetic mirrors can be used in any medium (e.g., the air, underwater, underground, and/or the like).

Results and Discussion

A. Electromagnetic Properties of the Seawater Surface Layer

Figure 22:
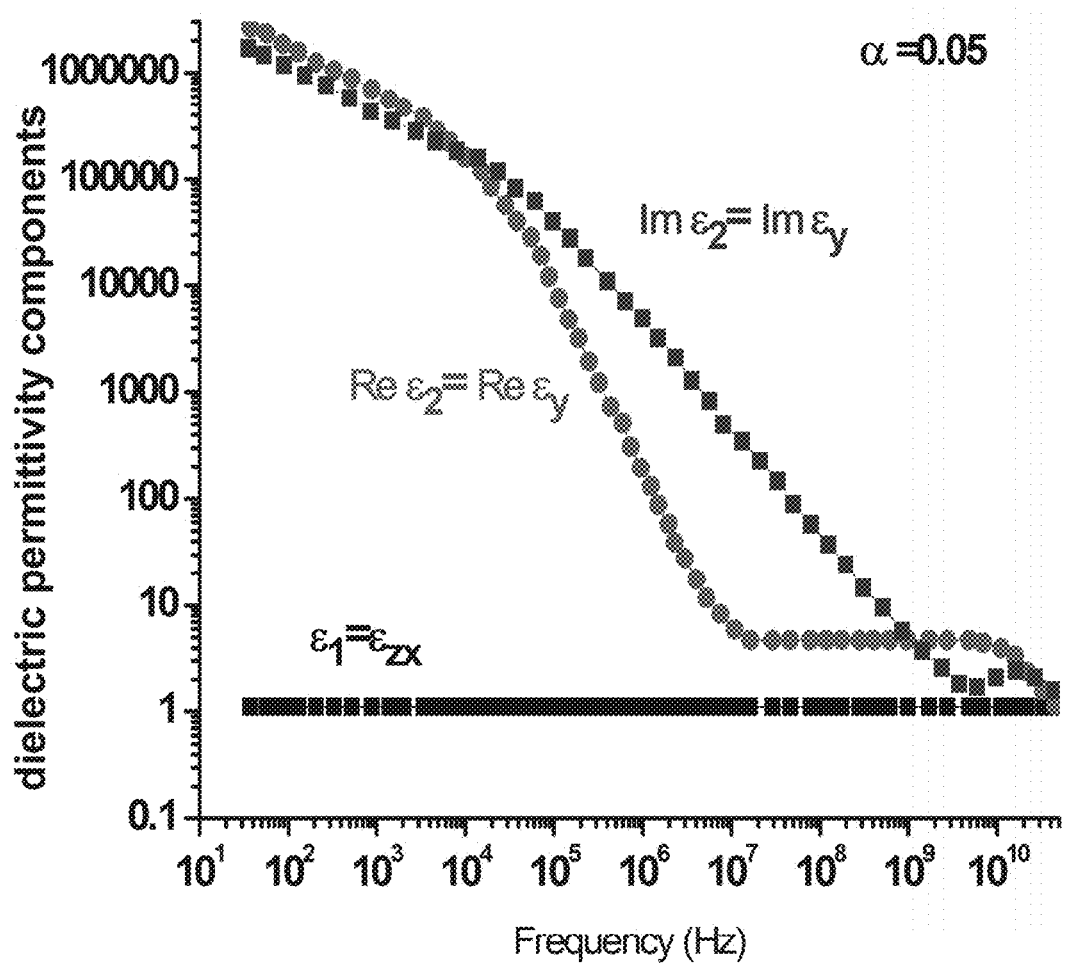
FIG. 22 shows an example graph of calculations of the anisotropic dielectric permittivity tensor for a wavy seawater surface, in some embodiments.

In some situations, in the limit $\lambda_{air} \gg D$, the interfacial seawater surface layer of thickness d shown in FIG. 17 may be described using the metamaterial approximation for a uniaxial medium. In this limit the diagonal components of the dielectric permittivity tensor of the surface layer are given as $$\varepsilon_1 = \varepsilon_{zx} = \frac{2\alpha\varepsilon_m\varepsilon_d + (1-\alpha)\varepsilon_d(\varepsilon_d + \varepsilon_m)}{(1-\alpha)(\varepsilon_d + \varepsilon_m) + 2\alpha\varepsilon_d} \approx \frac{1+\alpha}{1-\alpha}, \text{ and} \quad (43)$$

$$\varepsilon_2 = \varepsilon_y = \alpha\varepsilon_m + (1-\alpha)\varepsilon_d \approx \alpha\varepsilon_m \quad (44)$$

where $\varepsilon_1$ is the tensor component in the z and x directions, $\varepsilon_2$ is the tensor component in the y direction (parallel to the wave fronts), $\varepsilon_m$ is the dielectric permittivity of the conductive seawater, $\varepsilon_d=1$ is the dielectric permittivity of air, and $\alpha=d/D$ is the volume fraction of seawater in the surface layer. FIG. 22 shows an example graph of the calculations of these components of the anisotropic dielectric permittivity tensor for a wavy seawater surface in the case of $\alpha=0.05$, assuming frequency-dependent seawater permittivity as shown in FIGS. 13A-13B. These calculations demonstrate that the electromagnetic properties of seawater surface can be strongly anisotropic in these examples, which may lead to considerable modifications of the SEW properties. For example, Eq. (43) indicates that $\varepsilon_{zx} > 1$ and almost purely real, which means that the wavy seawater surface can support an additional surface mode propagating in the y direction, which is guided by the near-surface region having an elevated effective refractive index.

In some situations, the waves tend to exhibit directional propagation far from shore defined by wind direction. Near shore, the wave patterns tend to be more chaotic and isotropic. In such situations, in the limit $\lambda \gg D$ the isotropic electromagnetic properties of the interfacial seawater layer may be described by the Maxwell-Garnett approximation:

$$\left(\frac{\varepsilon_{eff} - \varepsilon_m}{\varepsilon_{eff} + 2\varepsilon_m}\right) = (1-a)\left(\frac{\varepsilon_d - \varepsilon_m}{\varepsilon_d + 2\varepsilon_m}\right), \quad (45)$$

where $\varepsilon_{eff}$ is the effective dielectric permittivity of the transition layer. In the limit of small a and $\varepsilon_m \gg \varepsilon_d$, the effective permittivity is $\varepsilon_{eff}=1+3\alpha$. This isotropic metamaterial approximation may also be used in numerical simulations of SEW scattering.

With respect to the photonic crystal description of the transition layer, the dielectric permittivity of the transition layer may be expressed as $$\varepsilon(\vec{r}) = \varepsilon(\vec{r} + lD\vec{x}) = \Sigma_l \varepsilon_l e^{ilgx} \quad (46)$$

where l is an integer, $\vec{x}$ is the unit vector in the x direction (for example, as shown in FIG. 17), and $g=2\pi/D$ is the inverse lattice vector. Generally, the light wave propagating in such a periodic medium follows the Bloch's law, and it can be expanded as $$\vec{E}(\vec{r}) = \sum_{\vec{G}} \vec{C}_{\vec{k}-\vec{G}} e^{-i(\vec{k}-\vec{G})\vec{r}}. \quad (47)$$

where $\vec{k}$ is the wave vector, and $C_{\vec{k}-\vec{G}}$ is the Fourier component of the field (where G=lg). IN some situations, the solution of Maxwell equations in a general periodic medium cannot be found in a closed analytical form. However, if the distribution of the dielectric constant magnitude in a sinusoidal seawater wave may also be assumed to be sinusoidal, there is only first order term in its Fourier expansion (see Eq. (46)), so that $\varepsilon=\varepsilon_0+\varepsilon_g \sin(gx)$. The $C_{\vec{k}}$ and $C_{\vec{k}-l\vec{g}}$ can be coupled to each other via a simplified equation pair:

$$(\vec{k}^2-\omega^2\mu\varepsilon_0)C_{\vec{k}}-\omega^2\mu\varepsilon_{-l\vec{g}}C_{\vec{k}-l\vec{g}}=0,$$

$$-\omega^2\mu\varepsilon_{l\vec{g}}C_{\vec{k}}+[(\vec{k}-l\vec{g})^2-\omega^2\mu\varepsilon_0]C_{\vec{k}-l\vec{g}}=0. \quad (48)$$

where $\mu=1$ may be assumed since seawater is non-magnetic. A non-zero solution of these equations can be obtained when the following equation is satisfied:

$$\begin{vmatrix} \vec{k}^2-\omega^2\mu\varepsilon_0 & -\omega^2\mu\varepsilon_{-lg} \\ -\omega^2\mu\varepsilon_{lg} & (\vec{k}-l\vec{g})^2-\omega^2\mu\varepsilon_0 \end{vmatrix} = 0. \quad (49)$$

which results in the expression for the top and bottom edges of the lth forbidden band:

$$\varpi_{l\pm}^2 = \frac{k^2}{\mu(\varepsilon_0 \pm |\varepsilon_{lg}|)} \quad (50)$$

Based on Eqs. (9-11), in the photonic crystal approximation when $\lambda_{air} \sim D$ (or $\lambda_{water} \sim D$), a photonic bandgap can open up at $\lambda \sim 2D$. In some situations, the bandgap width can depend on the electromagnetic wave propagation direction (e.g., as shown in FIG. 17). Since the bandgap occurs at $k\cos\theta = lg/2$, the top and bottom edges of the lth forbidden band are located at (see Eq. (11)):

$$\omega_{l\pm} = \left| \frac{lg}{2\cos\theta(\varepsilon_0 \pm \varepsilon_g)} \right|, \quad (51)$$

where $e_0=(e_{water}+e_{air})/2$, and $e_g=(e_{water}-e_{air})/2$ for a sinusoidal ocean wave. In some situations, due to a huge contrast between $e_{air}$ and $e_{water}$, the bandgaps can be very large. As a result, in the photonic crystal approximation the transition layer behaves as a strongly anisotropic material supporting propagation only around the y direction. This conclusion is consistent with the results of metamaterial approximation considered above.

The dispersion for the transition layer in the photonic crystal approximation in the direction perpendicular to the ocean wave fronts may be calculated numerically using the analytical solution for a multilayer dielectric stack made of two dielectric components with dielectric permittivities $e_2=e_{water}>>e_1=e_{air}=1$ of equal thickness:

$$\cos\left(\frac{kD}{2}\right) = \left[\cos\frac{\omega D}{2c}\cos\frac{\omega D\sqrt{\varepsilon_2}}{2c} - \frac{1}{2}\sqrt{\varepsilon_2}\sin\frac{\omega D}{2c}\sin\frac{\omega D\sqrt{\varepsilon_2}}{2c}\right] \quad (52)$$

Figure 23:
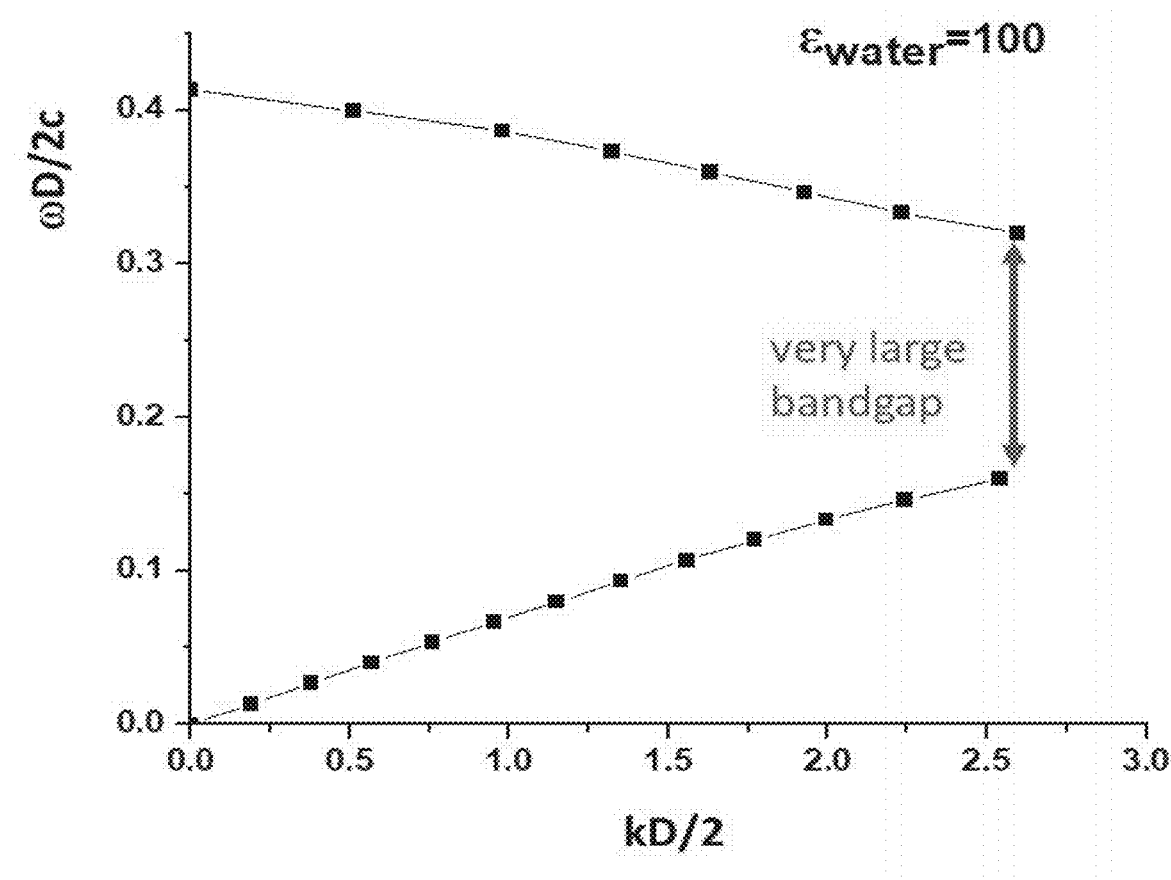
FIG. 23 shows an example graph of the dispersion for the transition layer in the photonic crystal approximation in the direction perpendicular to the ocean wave fronts for a frequency range around 2 MHz, in some embodiments.

FIG. 23 shows an example of the dispersion for the transition layer in the photonic crystal approximation in the direction perpendicular to the ocean wave fronts for a frequency range around 2 MHz where $\varepsilon_{water} \sim 100$ may be assumed. The bandgap indeed appears to be very large (consistent with the calculations based on Eq. (52).) In some situations, the bandgap can grow even larger with an increase in $\varepsilon_{water}$ at lower frequencies.

B. 2D SEW Modes Supported by Sea Surface

The SEW exist in the case of TM polarization at an interface between a conductive and a non-conductive medium. If the non-conductive medium is air, the wave vector of a SEW solution may be obtained as $$k_p = k_l \sqrt{\frac{\varepsilon_l}{\varepsilon_r + 1}}, \quad (53)$$

where $\varepsilon_r$ is the dielectric permittivity of the conductive medium, and $k_1$ is the wave vector in free space. In the case of seawater (and lossy ground) when $\varepsilon''>>\varepsilon'$, the SEW solution (53) may be simplified as $$\frac{k_p}{k_1} \approx 1 - \frac{\varepsilon'+3/4}{2\varepsilon''^2} - j\frac{1}{2\varepsilon''}, \quad (54)$$

which can be used to obtain approximate expressions for the SEW propagation length along the interface $$L_r \approx \frac{\lambda_0 \varepsilon''}{\pi}, \quad (55)$$

and the SEW penetration depth into seawater:

$$L_z \approx \frac{\lambda_0}{4\pi\sqrt{\varepsilon''}} \quad (56)$$

The SEW penetration depth has the same order of magnitude as the conventionally defined skin depth in seawater $$\delta = \sqrt{\frac{1}{\pi\mu_0\sigma\nu}} \approx \frac{270 \text{ Hz}^{1/2} m}{\sqrt{\nu}}, \quad (57)$$

since $\varepsilon(\omega)=\varepsilon'(\omega)+j\varepsilon''(\omega)=\varepsilon_r(\omega)\varepsilon_0+j\sigma(\omega)/\omega$. Assuming operation down to $\sim-100$ dB, the SEW-based imaging system may be functional down to about $\sim 20L_z$. The assumed operational distance and depth estimated based on these assumptions are summarized in Table 1 below:

TABLE 1

Operational distance and depth of SEW-based RF imaging in seawater.
Surface wave-based RF imaging scheme in seawater

| Frequency | Wavelength (m) | Skin Depth | Projected Distance | Projected Depth |
|---|---|---|---|---|
| 2.45 GHz | 0.12 | 0.3 cm | 3.8 m | 0.054 m |
| 50 MHz | 6 | 3.8 cm | 190 m | 0.7 m |
| 2 MHz | 150 | 19 cm | 900 km | 3.5 m |
| 100 KHz | 3,000 | 85 cm | ∞ | 15 m |
| 20 KHz | 15,000 | 2 m | ∞ | 36 m |
| 1 KHz | 300,000 | 8.5 m | ∞ | 150 m |

The operational distance is assumed to be "not limited" if the theoretical expression produces an answer larger than Earth radius. In some examples, the projected operational distance evaluated based on Eq. (55) does not take into account SEW scattering by ocean waves and the Earth curvature. On the other hand, the projected operational depth listed in the table is consistent with the numerical simulations.

Figure 24:
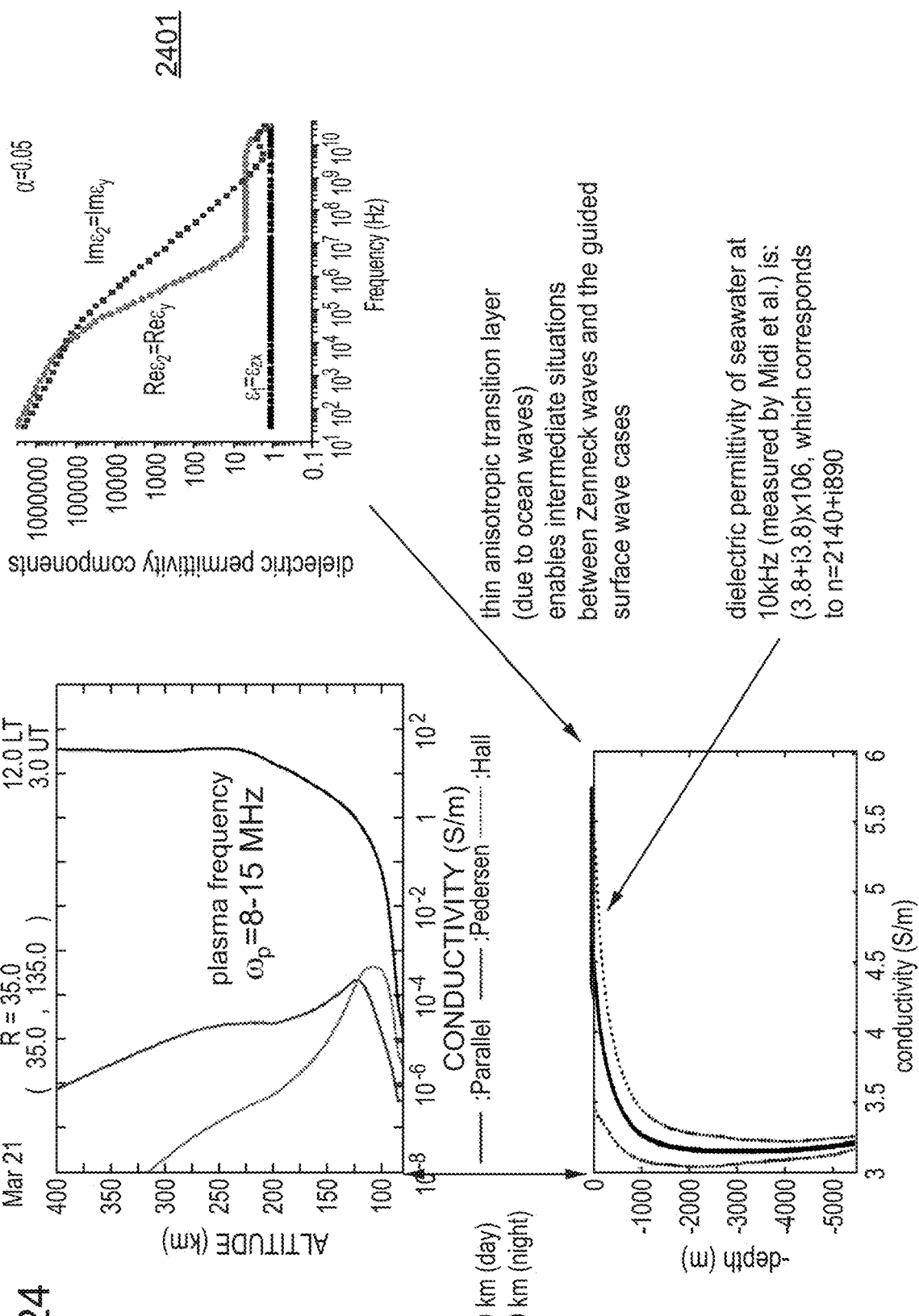
FIG. 24 shows an example graph of the distribution of conductivity (which defines the dielectric permittivity profile) throughout the top layer of the ocean and into the Earth atmosphere, in some embodiments.
Figure 25:
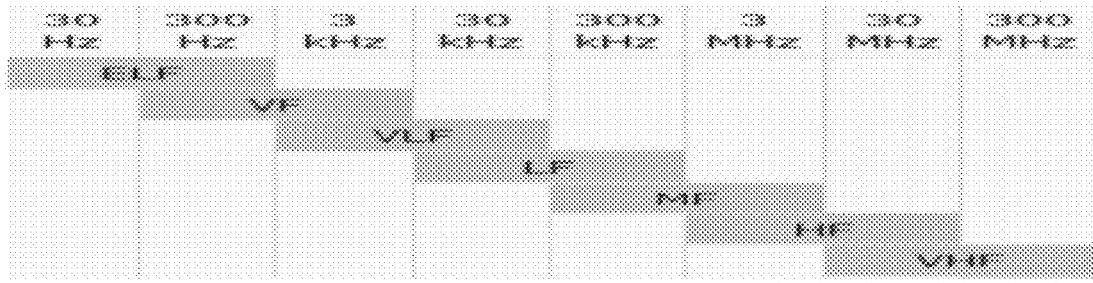
FIG. 25 shows an example summary of the spectral range and properties of various 2D modes which may propagate over the sea surface, in some embodiments.
Figure 25:
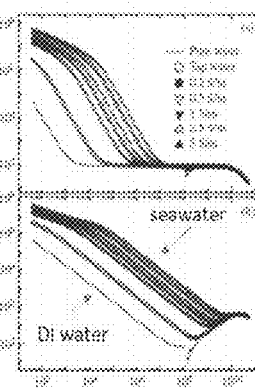

Various SEW modes supported by the sea surface-air interface may be summarized in FIGS. 24-25. FIG. 24 shows an example graph of the distribution of conductivity (which defines the dielectric permittivity profile) throughout the top layer of the ocean and into the Earth atmosphere. The graph 2401 shows the dielectric properties of the anisotropic transition layer due to ocean waves. This complicated profile defines the complex pattern of various overlapping 2D modes, which are supported by the sea surface together with the Earth's "ionospheric waveguide". FIG. 25 shows an example summary of the spectral range and properties of various 2D modes which may propagate over the sea surface. In the ELF/VLF range these modes can be the 2D "ionospheric waveguide" modes supported by the 70-90 km air gap between the sea surface and the ionosphere. The surface waves guided by the effective waveguide created by the near-surface jump in seawater conductivity (and hence its refractive index) is shown in FIG. 24. In the LF through VHF range the surface electromagnetic modes can be mainly represented by the Zenneck surface waves, which properties are described above. In addition, the photonic crystal and metamaterial effects described above can lead to additional surface modes in the VLF through MF ranges, which propagating and seawater penetrating properties correspond to an intermediate case between the Zenneck waves and the guided surface waves. This property may be used to further increase the reliability of numerical simulations of SEW scattering by underwater objects.

C. Results of Numerical Modeling of SEW Propagation and Scattering

Depth Contrast Via Frequency Tuning

Figure 26A:
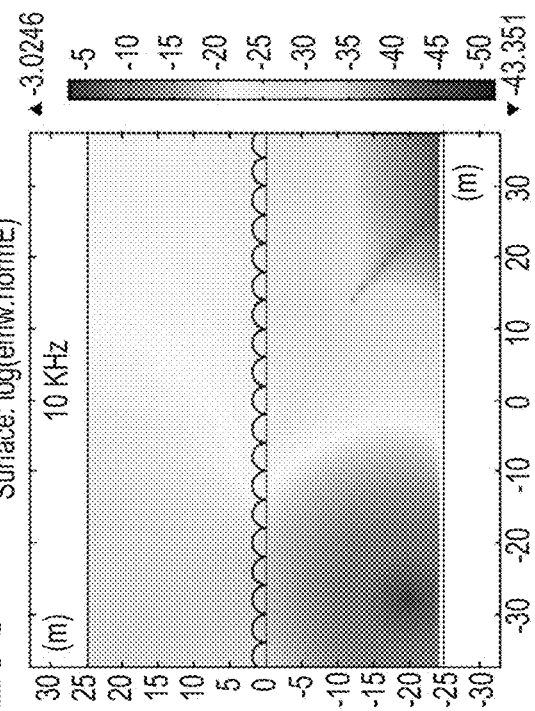
FIGS. 26A-26F show example results of the numerical modeling of SEW excitation and scattering by an underwater object at 10 KHz and 25 KHz, in some embodiments.
Figure 26C:
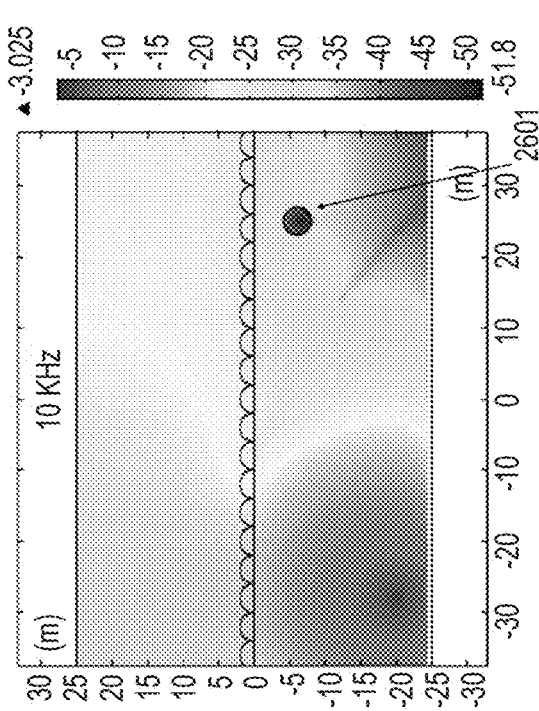
Figure 26B:
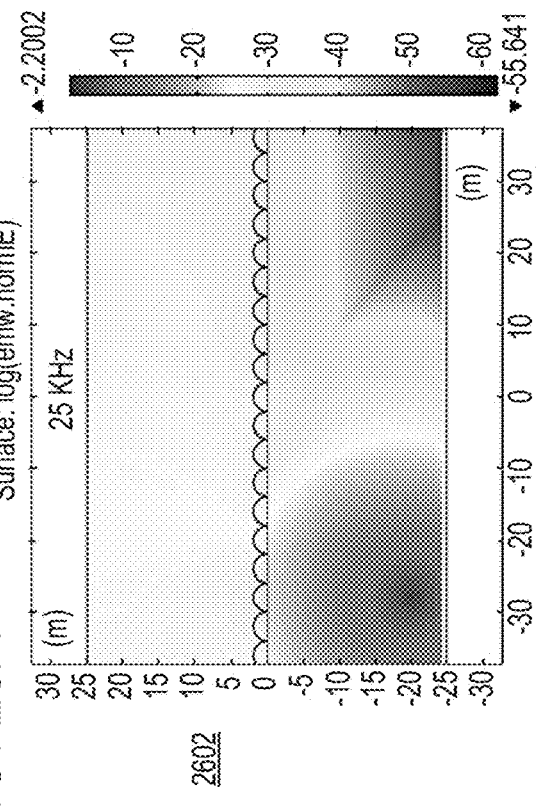
Figure 26D:
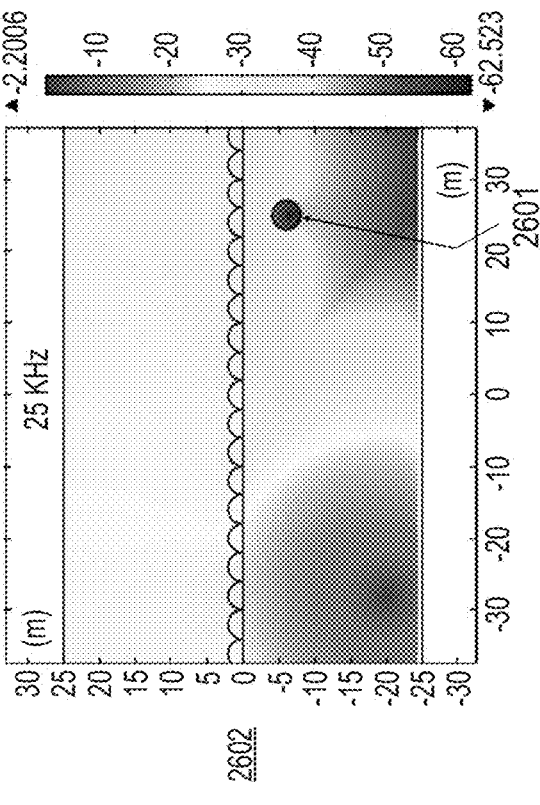
Figures 26E, 26F:
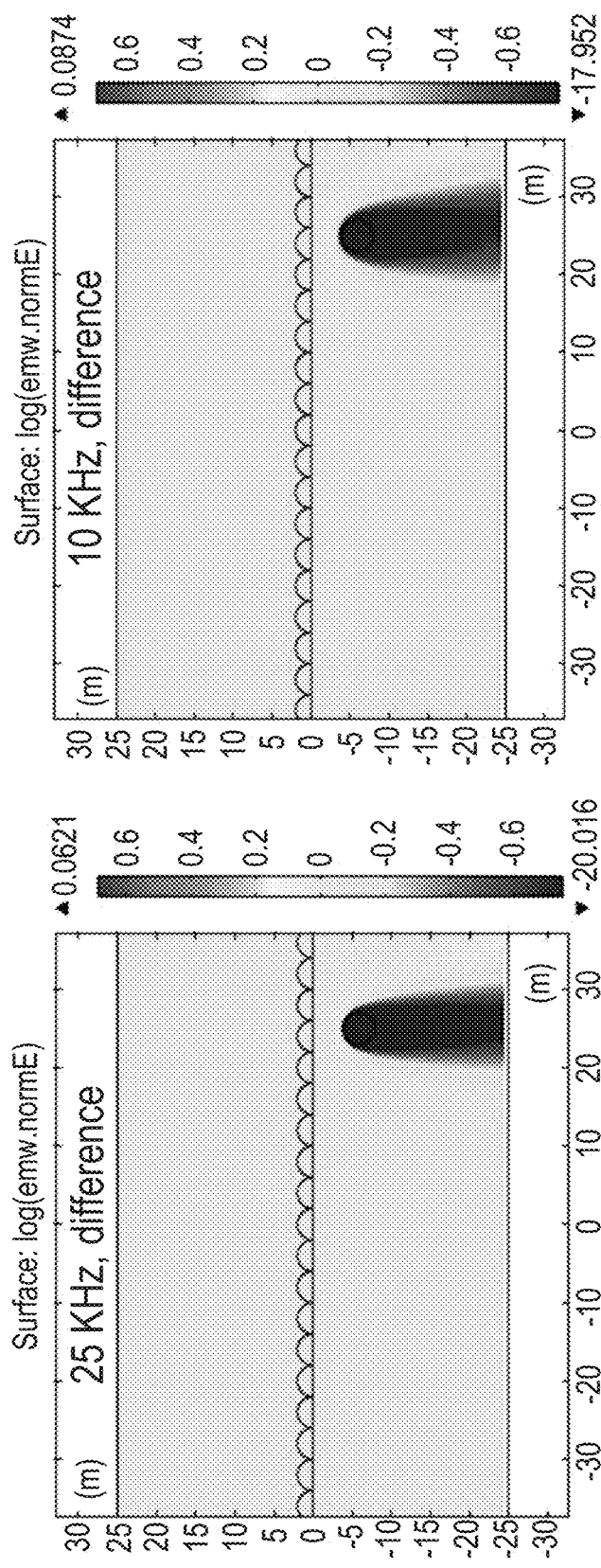

FIGS. 26A-26F show example simulations of the SEW scattering by a long underwater metal cylinder (e.g., an underwater cable) calculated at 10 KHz and 25 KHz. An underwater point source 2601 is used to excite SEW, which propagates along a rippled sea surface 2602 and is scattered by a long cylindrical metallic object (not shown) placed at 6 m depth underwater. FIGS. 26A and 26C show the spatial distributions of SEW field without the scatterer calculated at 25 KHz and 10 KHz, respectively. FIGS. 26B and 26D show the spatial distributions of SEW field with the scatterer 2601 calculated at 25 KHz and 10 KHz, respectively. FIGS. 26E and 26F show differential images of pure scattering field. Frequency-dependent SEW penetration depth can lead to strong frequency and depth dependencies of the scattered field.

Figure 27A:
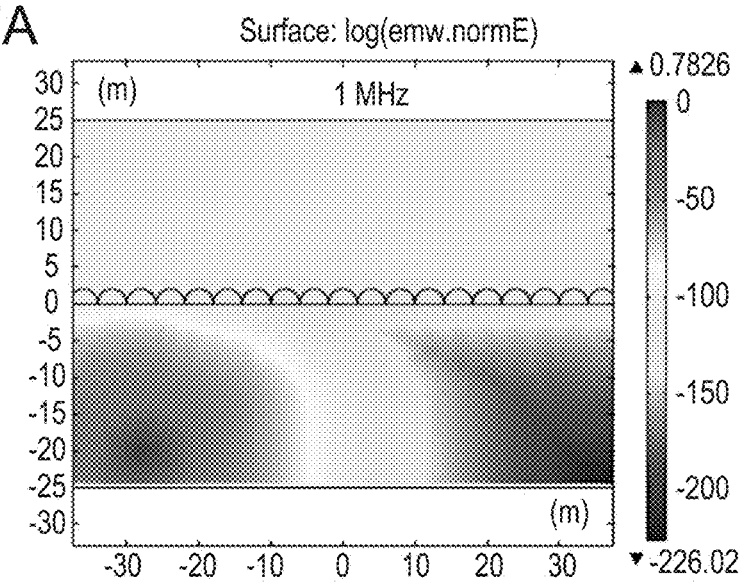
FIGS. 27A-27C show example results of the numerical modeling of SEW excitation and scattering by an underwater object at 1 MHz, in some embodiments.
Figure 27B:
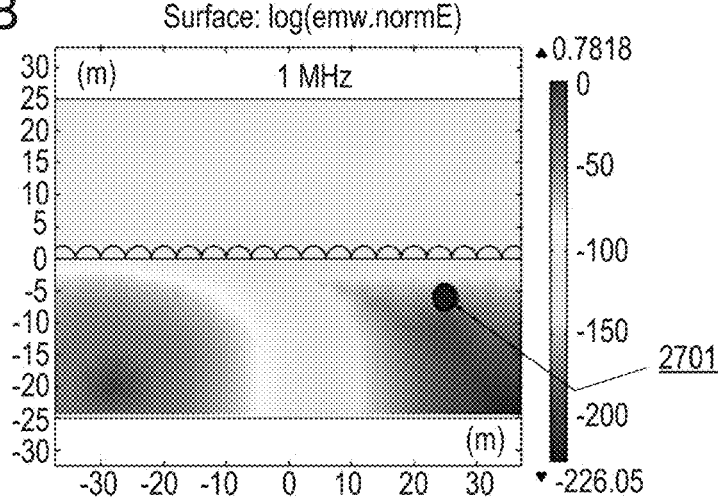
Figure 27C:
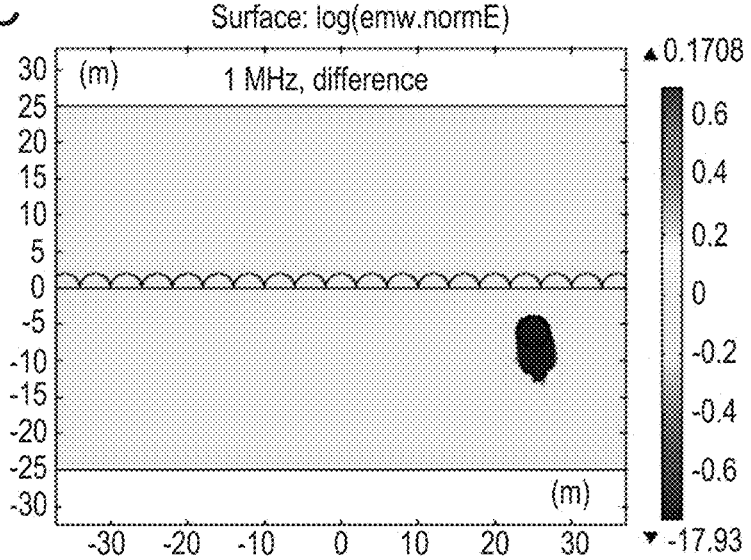

FIGS. 27A-27C show simulations of the SEW scattering by a long underwater metal cylinder (e.g., an underwater cable) calculated at 1 MHz. At 1 MHz relatively small SEW penetration depth leads to SEW field not being perturbed by the underwater cable (placed at 6 m depth underwater). On the other hand, a considerably increased and frequency-dependent SEW penetration depth at 10 KHz and 25 KHz leads to strong SEW field scattering by the cable as shown in FIGS. 26A-26F. In FIGS. 26A-27C, it can be assumed that the cylindrical source is assumed and the figures show the cross-section of the object(s) and/or the source(s).

Figure 28A:
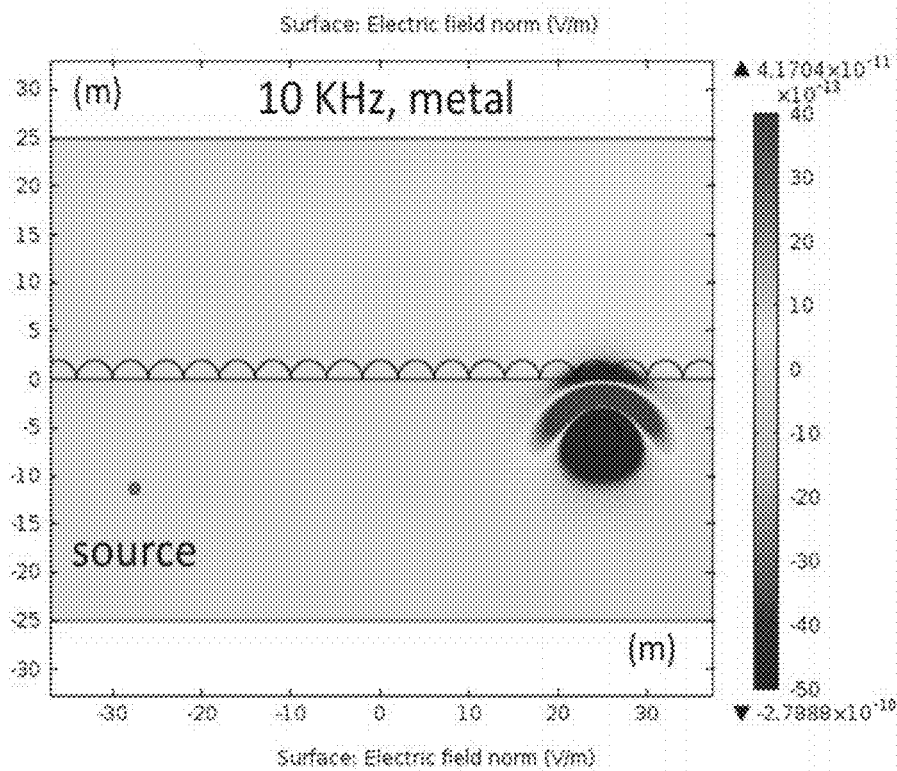
FIGS. 28A-28B show example results of the numerical modeling of SEW excitation and scattering by underwater objects with different dielectric properties, in some embodiments.
Figure 28B:
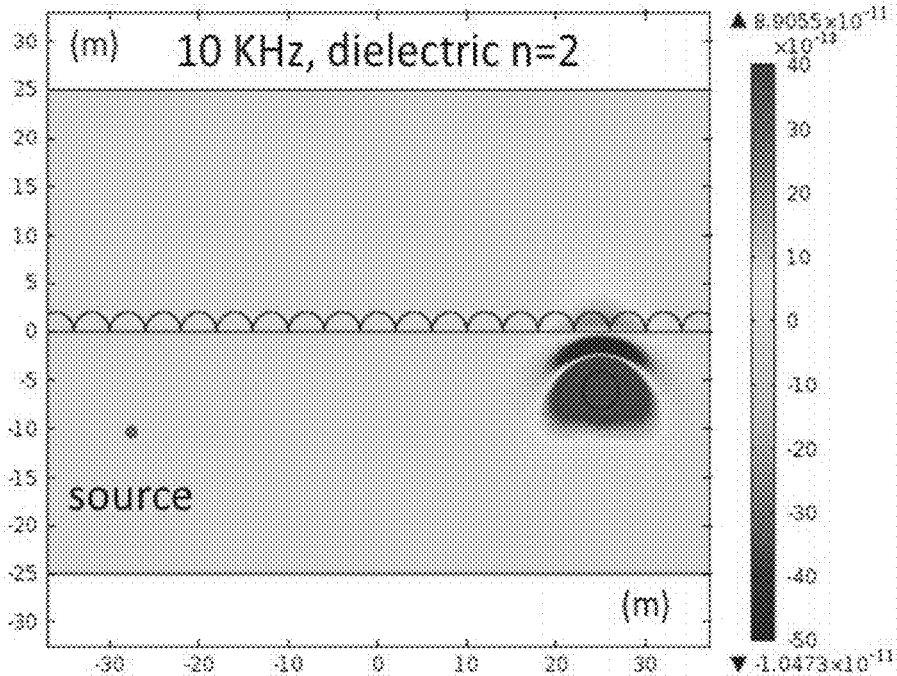

Dielectric Contrast:

The numerical simulations show that SEW scattering may be used to determine dielectric properties of an underwater object. This can be used in underwater imaging applications and sonar mapping is not sensitive to dielectric contrast. A metal object and a dielectric object having similar acoustic properties and similar shape cannot be distinguished in a sonar map. FIGS. 28A-28B show an example of the numerical modeling of the SEW scattering contrast resulting from different dielectric properties of an underwater cylindrical object (e.g., a metal cable or a plastic rope), in the same measurement configuration as FIGS. 26A-26F. These maps shown in FIGS. 28A-28B plot differential images of SEW propagation from the point source calculated with (FIG. 28A) and without (FIG. 28B) a cylindrical scatterer located 6 m underwater. The SEW scattering maps produced by a metal and a dielectric cylinder can be different, and the refractive index contrast can be strong even quite far from the underwater object. This strong contrast results from the evanescent nature of SEW in z (depth) direction, and the depth and the refractive index can be exponential. In other words, the SEW scattering map shown in FIGS. 28A-28B exhibit strong (exponential) sensitivity to dielectric properties of an underwater object. This analysis can be used for remote detection and identification of underwater objects using, for example, UUV/UUV (using a unmanned underwater vehicle(s) (UUVs) to detect a unmanned underwater vehicle(s)) and UUV/UAV configurations (using a unmanned underwater vehicle(s) (UUV) to detect a unmanned aerial vehicles (UAVs) or vice versa).

Spatial Resolution: Influence of Scatterer Depth, Shape and Dimensions.

Figure 29A:
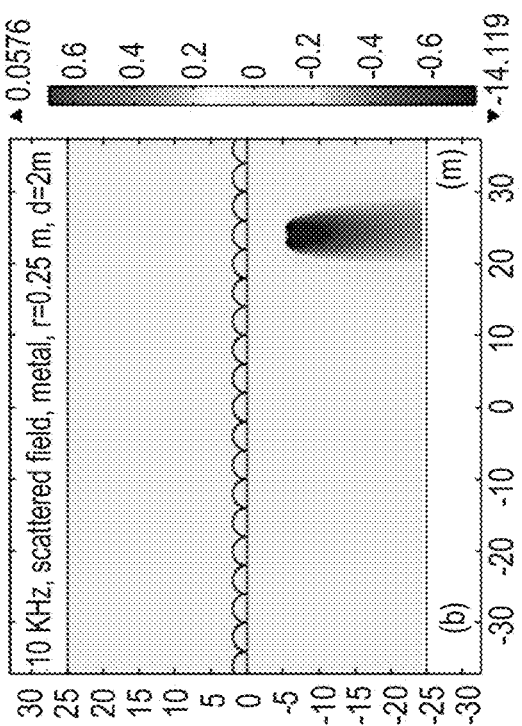
FIGS. 29A-29D show example modeling results of spatial resolution of SEW scattering maps in the lateral direction, in some embodiments.
Figure 29B:
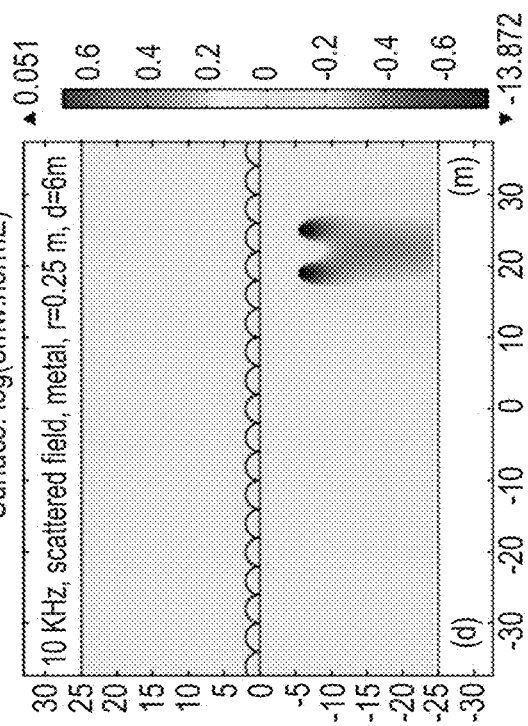
Figure 29C:
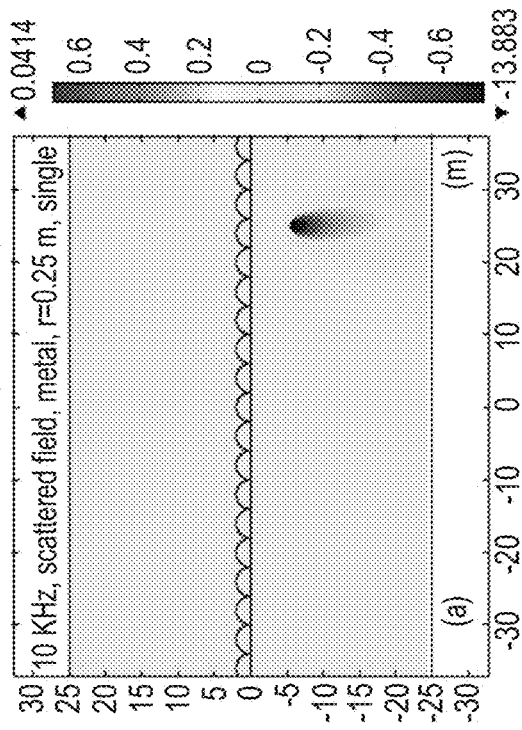
Figure 29D:
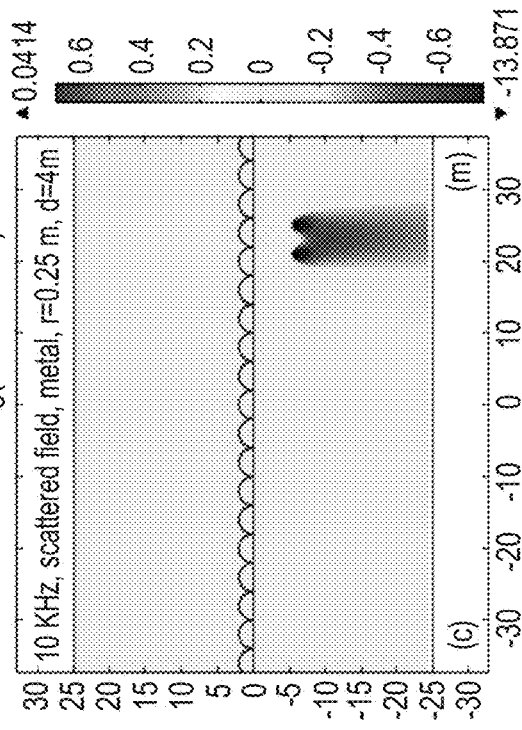
Figure 30A:
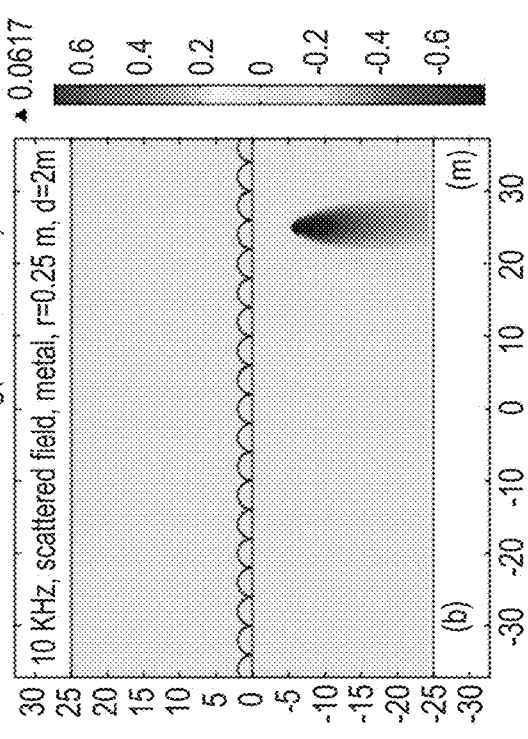
FIGS. 30A-30D show example modeling results of spatial resolution of SEW scattering maps in the depth direction, in some embodiments.
Figure 30B:
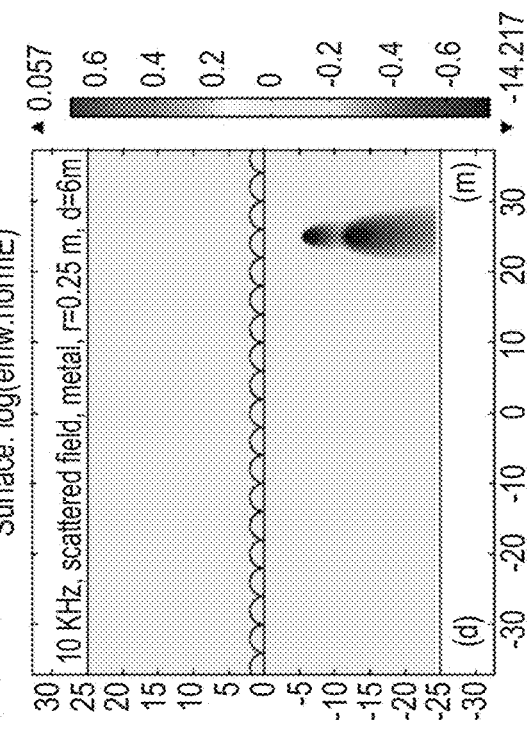
Figure 30C:
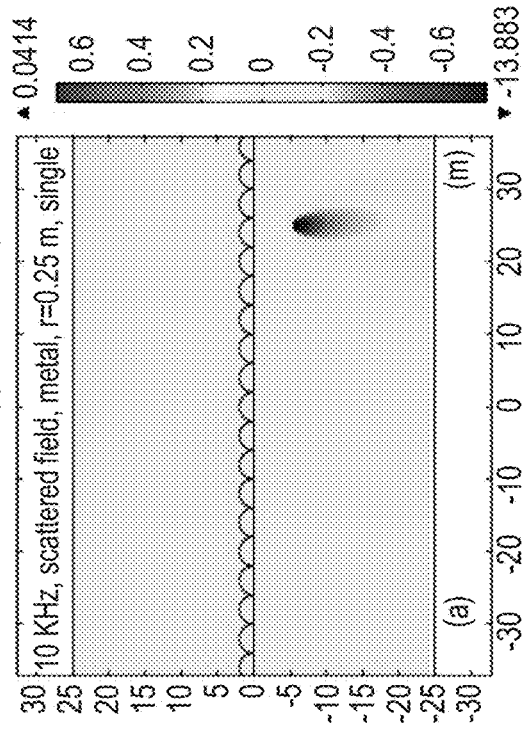
Figure 30D:
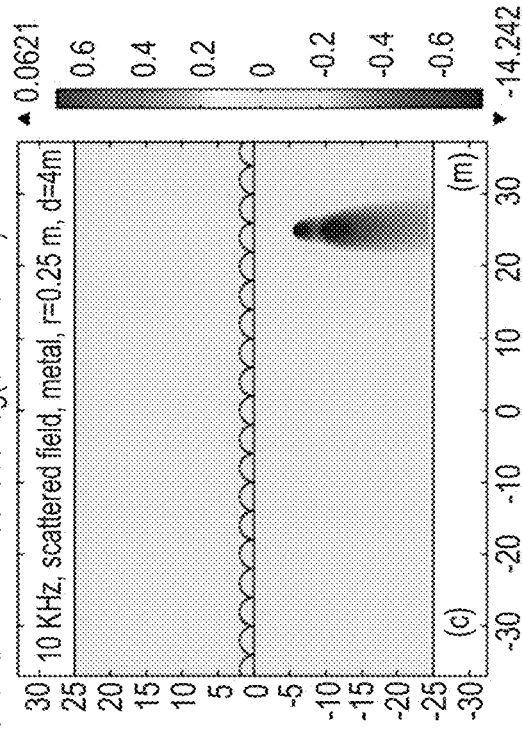

FIGS. 29A-29D show example modeling results of spatial resolution of SEW scattering maps in the lateral direction, using COMSOL Multiphysics in some embodiments. FIG. 29A shows the scattering map of a single metal cylinder having a radius of 0.25 m. The single metal cylinder may be treated as producing an effective "Green function" for the SEW scattering. FIGS. 29B-29D show scattering maps obtained for two cylinders laterally separated by 2 m, 4 m, and 6 m, respectively. FIGS. 30A-30D show example modeling results of spatial resolution of SEW scattering maps in the depth direction, using COMSOL Multiphysics in some embodiments. FIG. 30A shows a scattering map of a single metal cylinder having a radius of 0.25 m. FIGS. 30B-30D show scattering maps obtained for two cylinders separated in depth by 2 m, 4 m, and 6 m, respectively. As shown in FIGS. 30A-30D, spatial resolution of the order of 1 m in both lateral and depth directions are obtained.

Figure 31A:
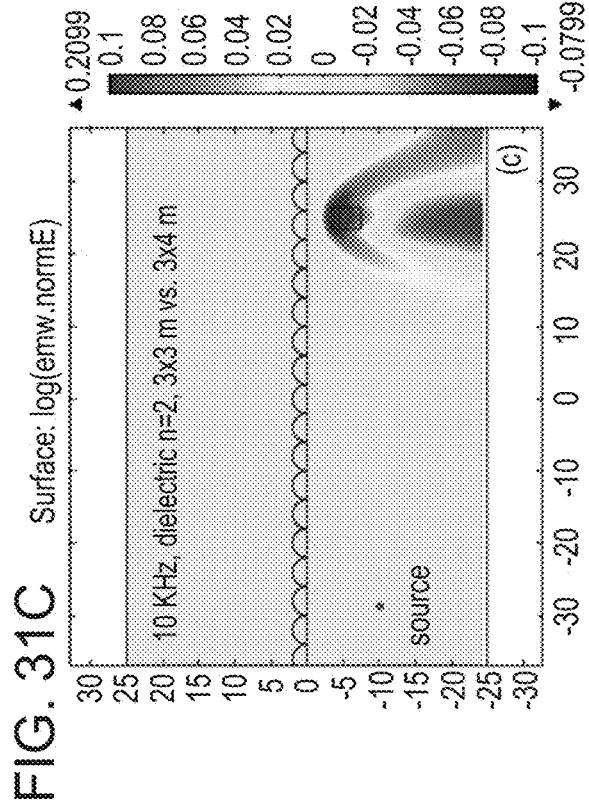
FIGS. 31A-31D show example differential images of changes produced in the scattered field by variations in scatterer depth, shape and dimensions, in some embodiments.
Figure 31C:
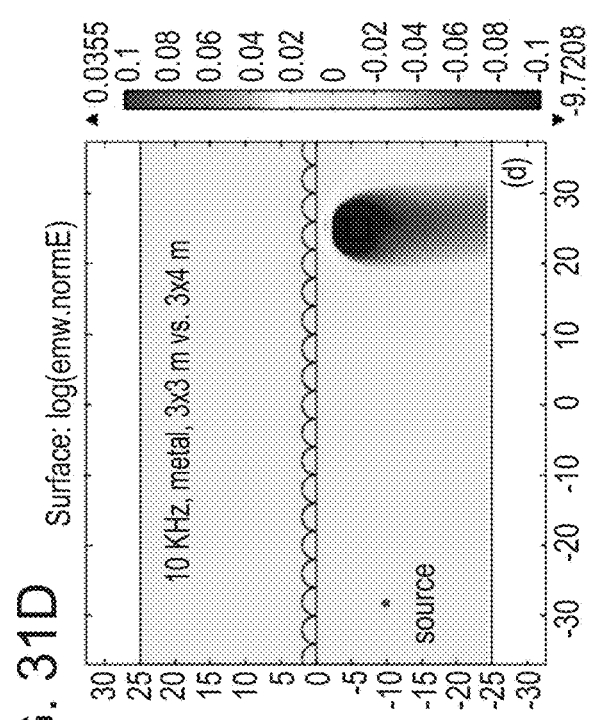
Figure 31B:
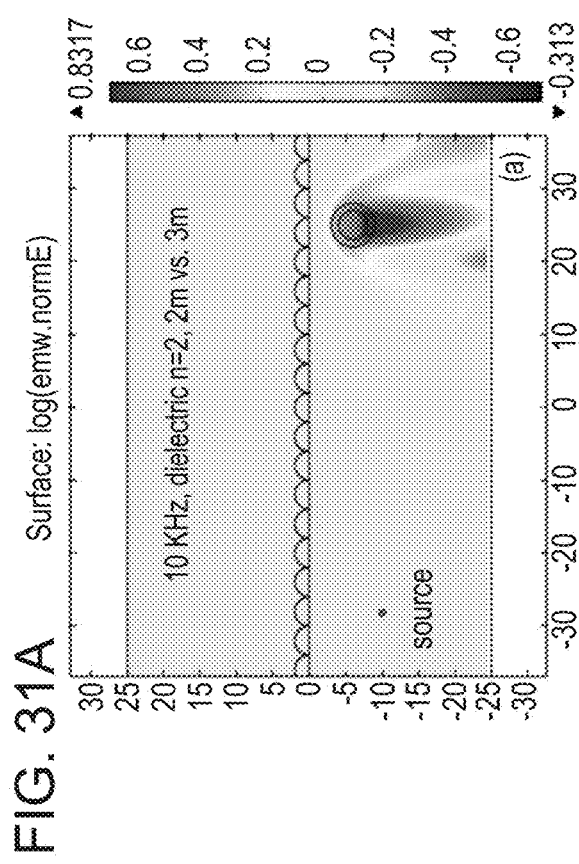
Figure 31D:
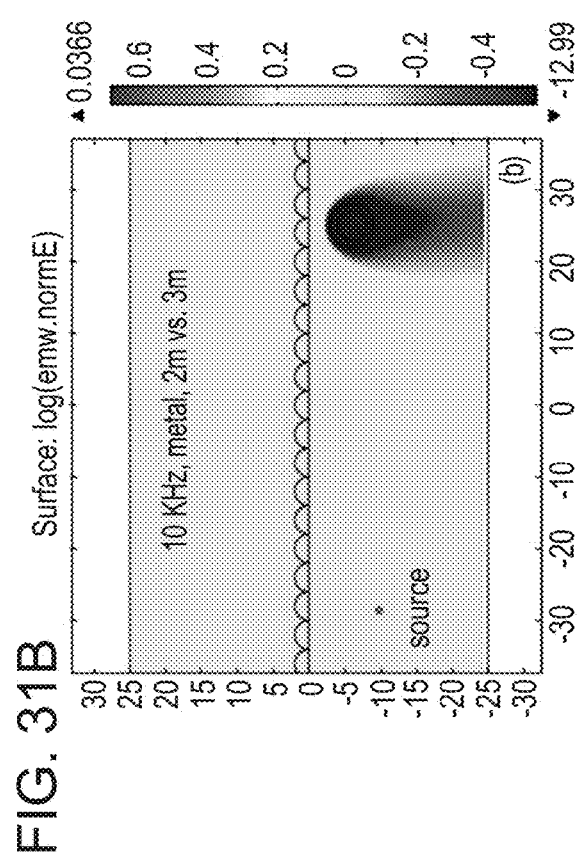

FIGS. 31A-31D show example differential images of changes produced in the scattered field by variations in scatterer depth, shape and dimensions. FIG. 31A shows differential images of changes produced in the scattered field by a scatterer of a dielectric object (having a radius changing from 2 m to 3 m). FIG. 31B shows differential images of changes produced in the scattered field by a scatterer of a metal cylinder (having a radius changing from 2 m to 3 m). FIG. 31C shows differential images of changes produced in the scattered field by a scatterer of a dielectric object (having a cross section changing from 3×3 m to 3×4 m). FIG. 31D shows differential images of changes produced in the scattered field by a scatterer of a metal rectangular prism (having a cross section changing from 3×3 m to 3×4 m). As shown, spatial resolution of the order of 1 m can be achieved while using SEW source operated at 10 kHz (associated with free space wavelength of 30 km).

Figure 32A:
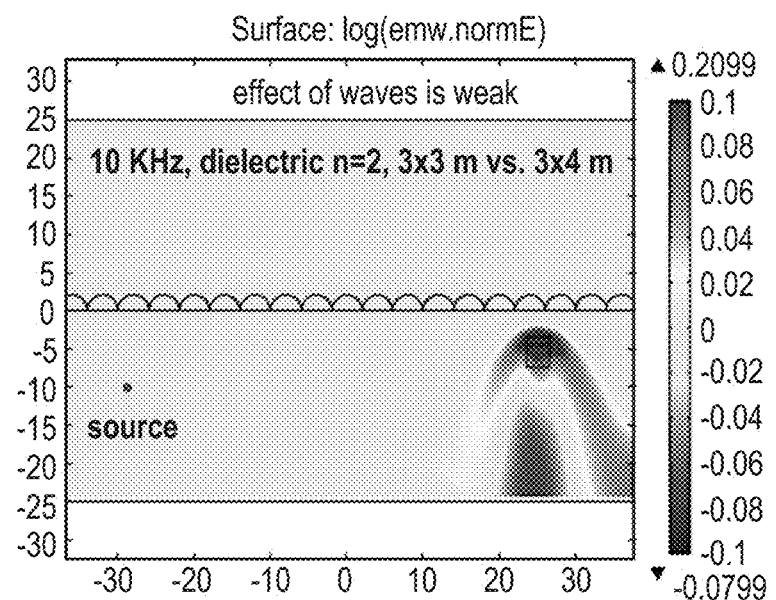
FIGS. 32A-32B show example influence of waves on the scattering field map, in some embodiments.
Figure 32B:
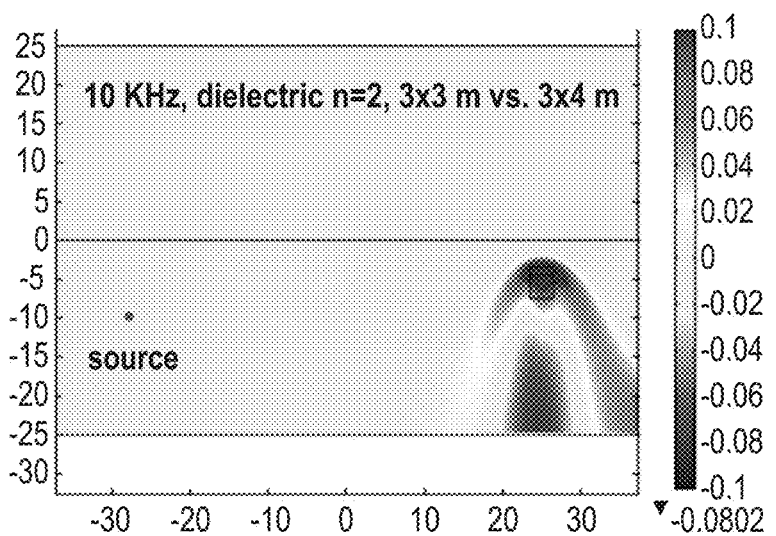
Figure 33A:
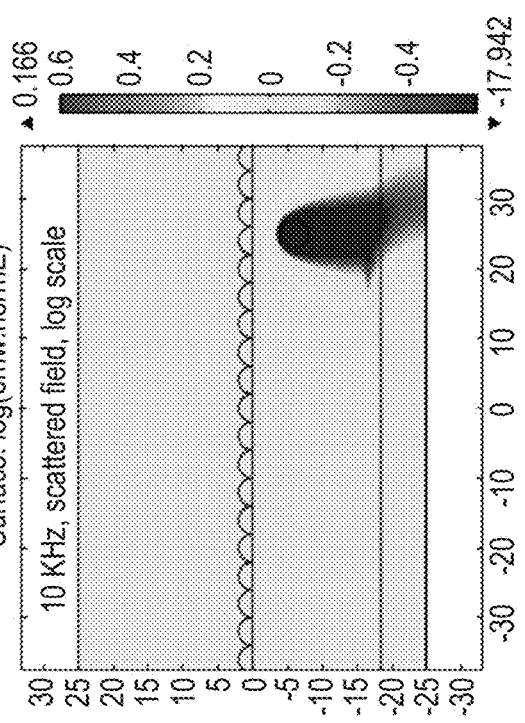
FIGS. 33A-33D show example numerical modeling of SEW scattering by a metal cylinder located at different depth underwater in the presence of seafloor, in some embodiments.
Figure 33B:
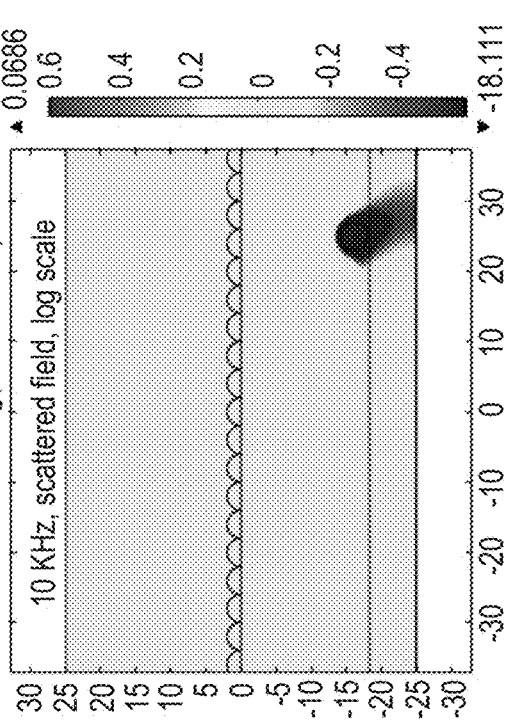
Figure 33C:
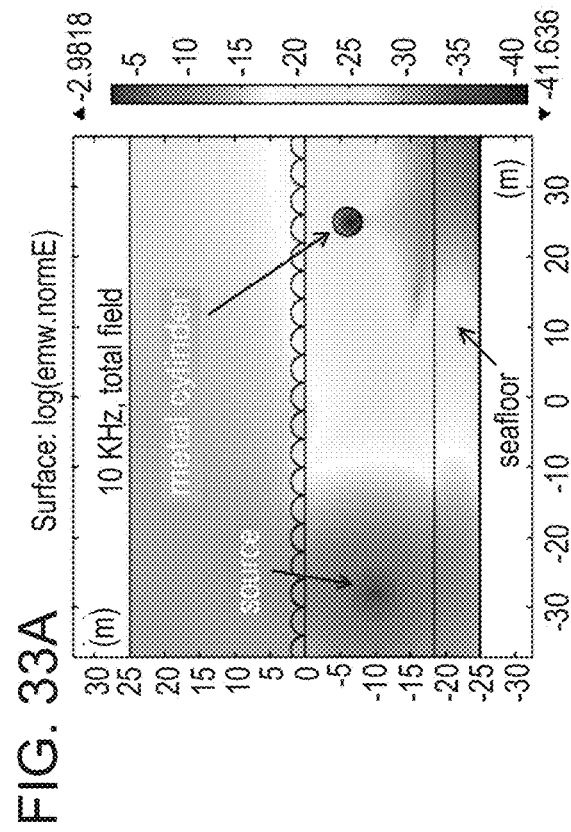
Figure 33D:
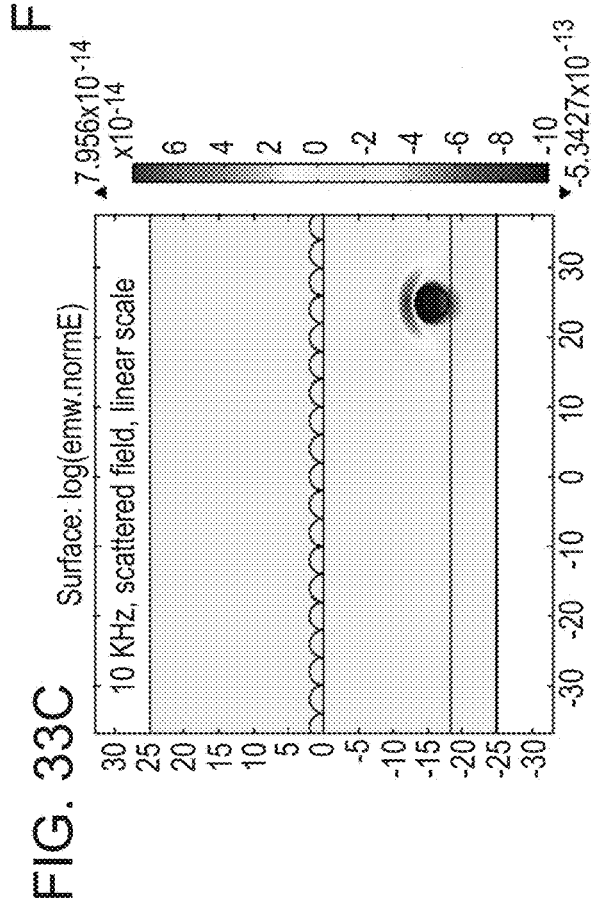

Influence of Waves, Seafloor, and Imaging Through Ice Sheet:

FIGS. 32A-32B show example influence of waves on the scattering field map from FIG. 31C. In FIG. 32B, the sea surface is assumed to be flat, while keeping all the other parameters the same as in FIG. 32A. The influence of waves on the simulated scattered field distribution can be small.

In some situations, the SEW scattering maps can be perturbed by the seafloor if the SEW penetration depth is of the same order of magnitude as the ocean depth in some particular location. The numerical simulations indicate that these perturbed SEW scattering maps remain highly sensitive to the dimensions and dielectric properties of an underwater scatterer. For example, FIGS. 33A-33D show example numerical modeling of SEW scattering by a metal cylinder located at different depth underwater in the presence of seafloor, using, for example, COMSOL Multiphysics in some embodiments. These simulations indicate that the SEW scattering maps remain highly sensitive to a scatterer position underwater.

Figure 34B:
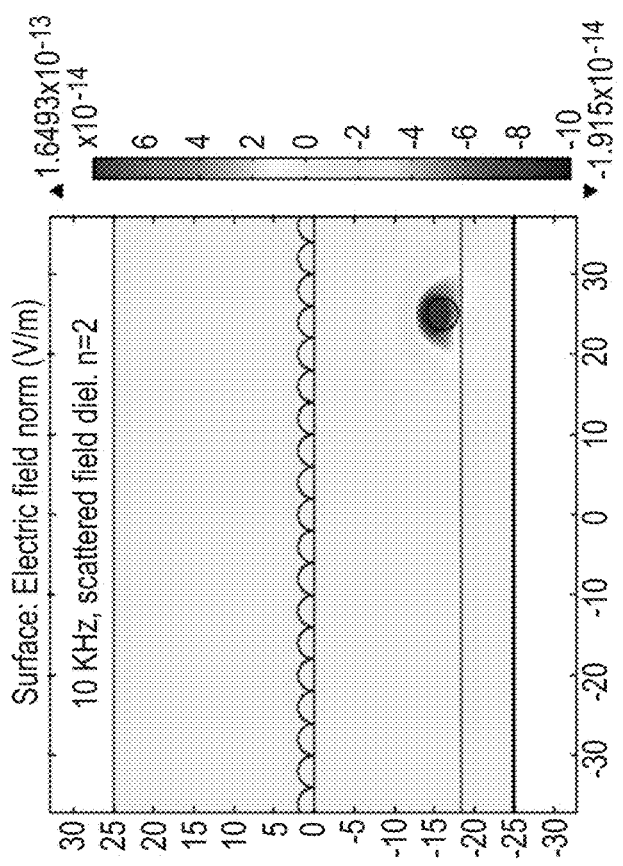
FIGS. 34A-34B show example numerical modeling of SEW scattering by objects with difference dielectric properties, in some embodiments.
Figure 34A:
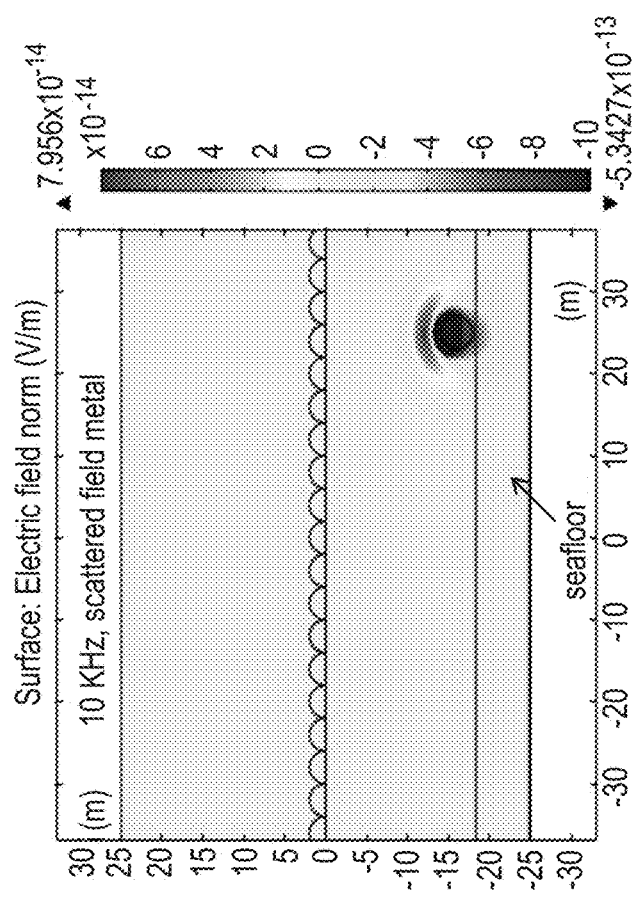

The SEW scattering maps for objects located on the seafloor can also exhibit considerable dielectric contrast, which is shown in FIGS. 34A-34B. FIG. 34A shows linear SEW scattering maps for metal, in comparison with linear SEW scattering maps for dielectric (n=2) cylinders placed directly on the seafloor as shown in FIG. 34B. Similar to the SEW scattering maps calculated in the bulk seawater (see FIGS. 28A-28B), these scattering maps exhibit very strong (exponential) dielectric contrast. This strong dielectric contrast shows practical usefulness of the SEW scattering technique compared to the conventional ultrasound underwater imaging, which does not exhibit dielectric contrast.

Figure 35A:
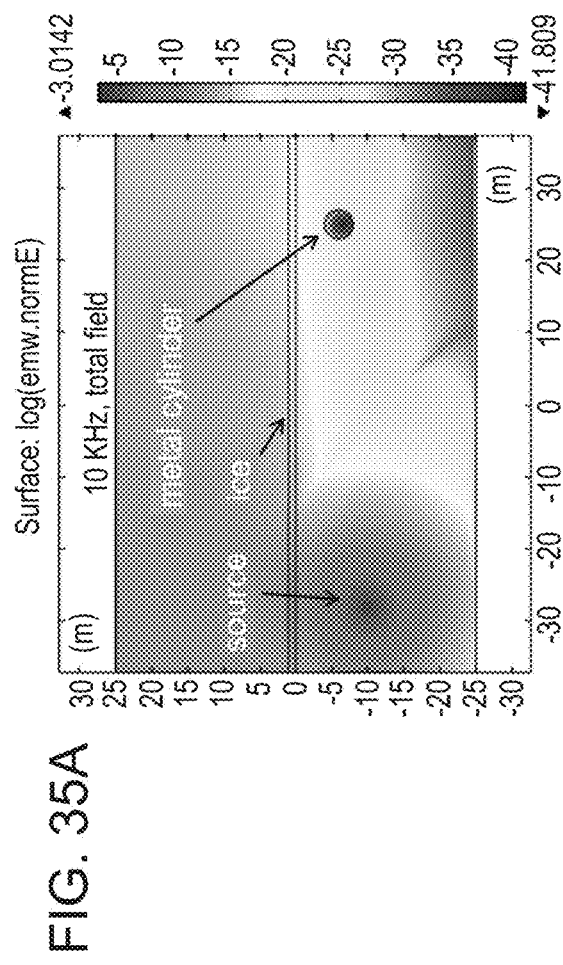
FIGS. 35A-35C show example modeling results of SEW scattering by an underwater object located at the seafloor, in some embodiments.
Figure 35C:
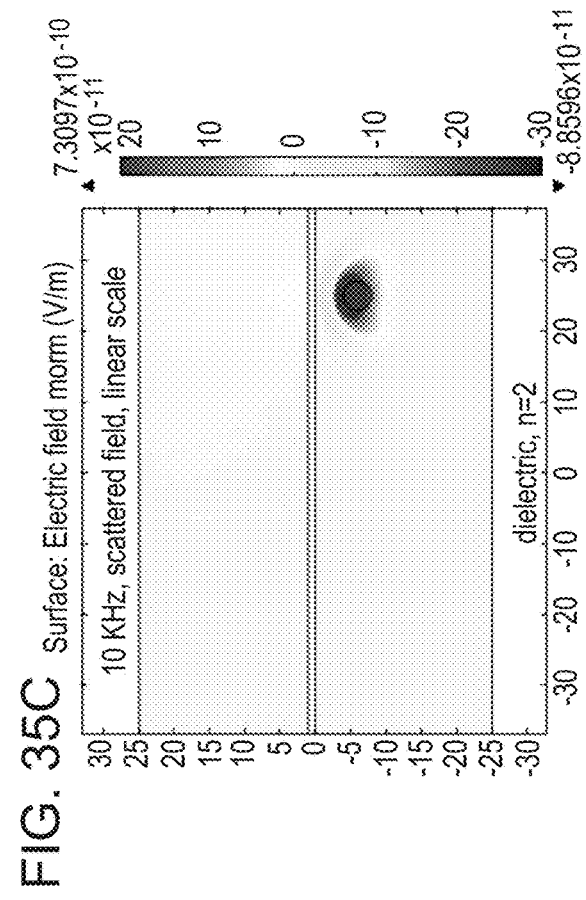
Figure 35B:
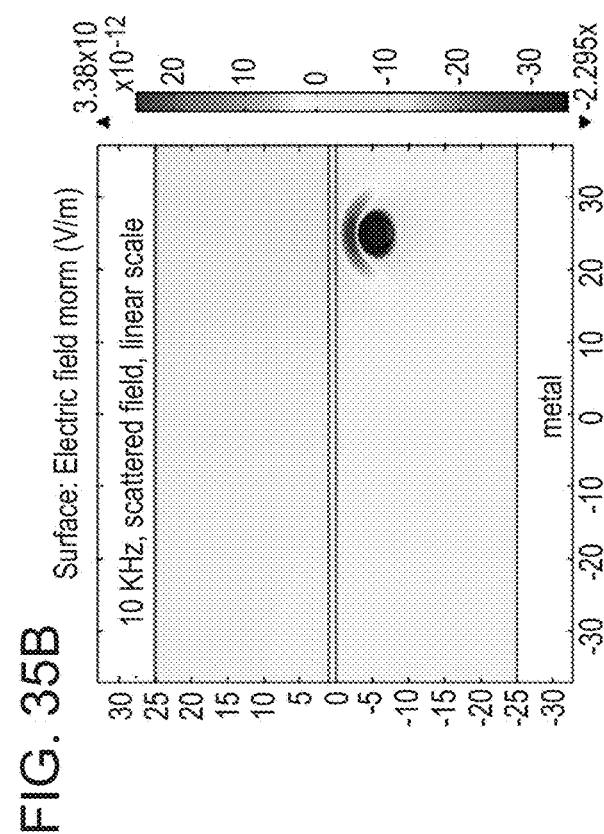

The SEW scattering technique can also be used in imaging and identification of underwater objects located under an ice sheet. FIGS. 35A-35C show example modeling results of SEW scattering by an underwater object located at the seafloor, using, for example, COMSOL Multiphysics, in some embodiments. FIGS. 35B and 35C show modeling of SEW scattering by metal and dielectric (n=2) cylinders, respectively, placed underwater below a 1 m thick ice sheet. The dielectric properties of ice at 10 kHz can be extracted from FIG. 14. Such scattering maps may be used to detect and identify objects located under an ice sheet using a low flying UAV. These scattering field maps exhibit clear dielectric contrast.

Figure 36:
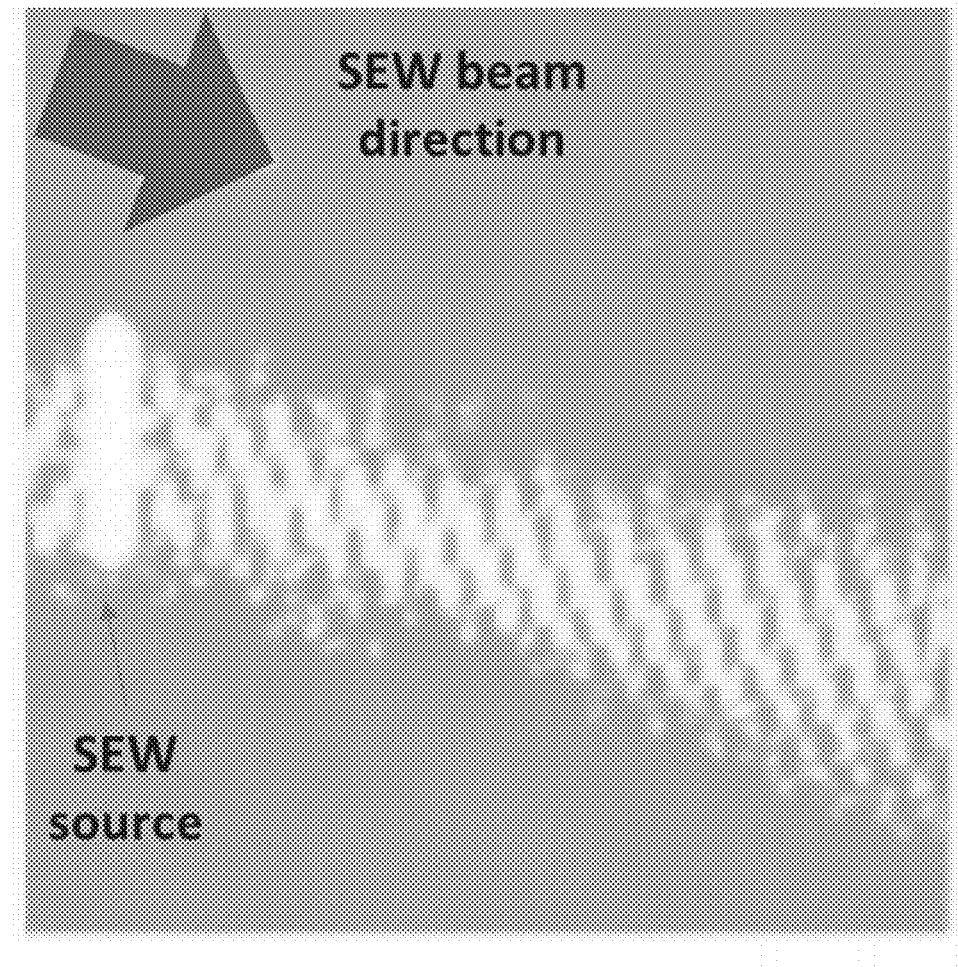
FIG. 36 shows formation of directional SEW beam, in some embodiments.
Figure 37A:
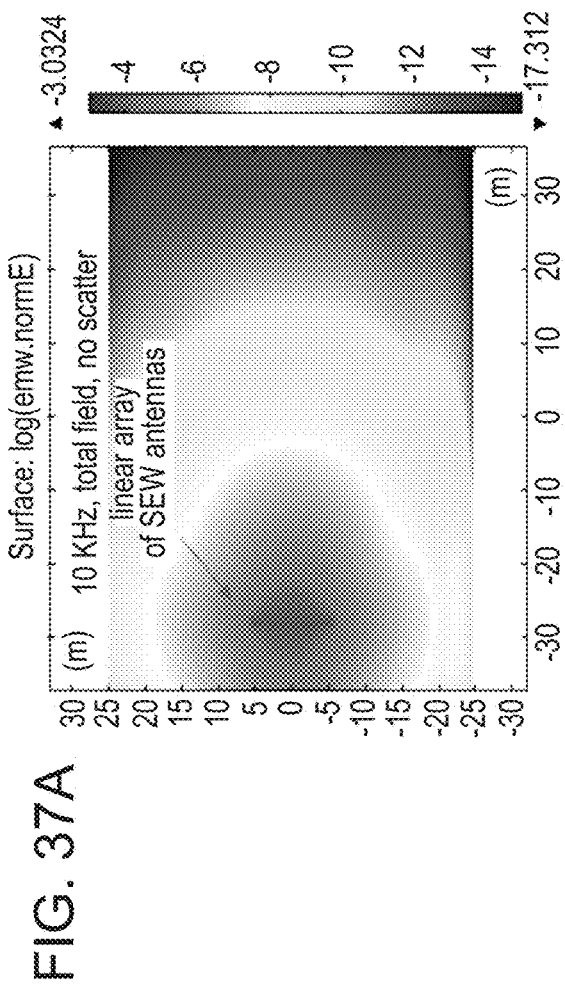
FIGS. 37A-37C show example modeling results of SEW beam formation and scattering by a metal and dielectric cylinder in the lossy situations, in some embodiments.
Figure 37C:
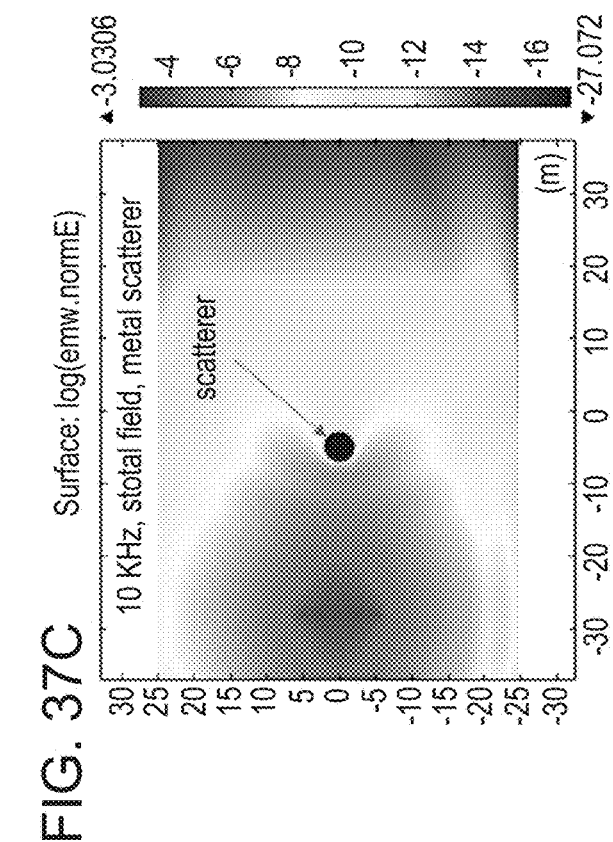
Figure 37B:
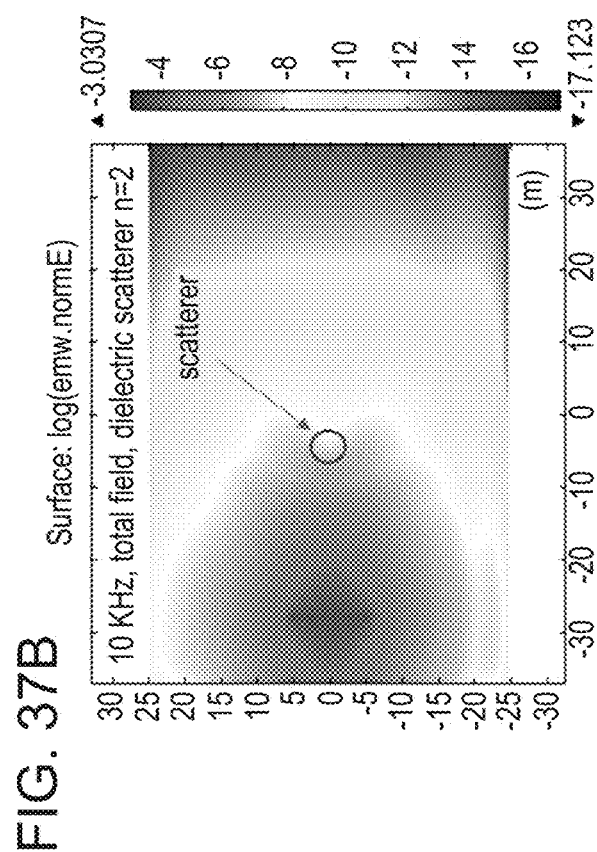
Figure 38B:
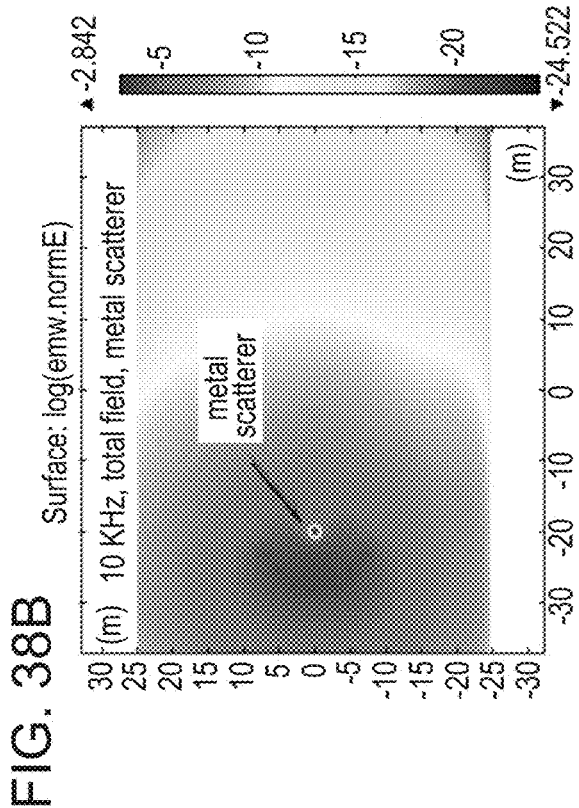
FIGS. 38A-38D show example modeling results of SEW focusing onto a metal scatterer, in some embodiments.
Figure 38D:
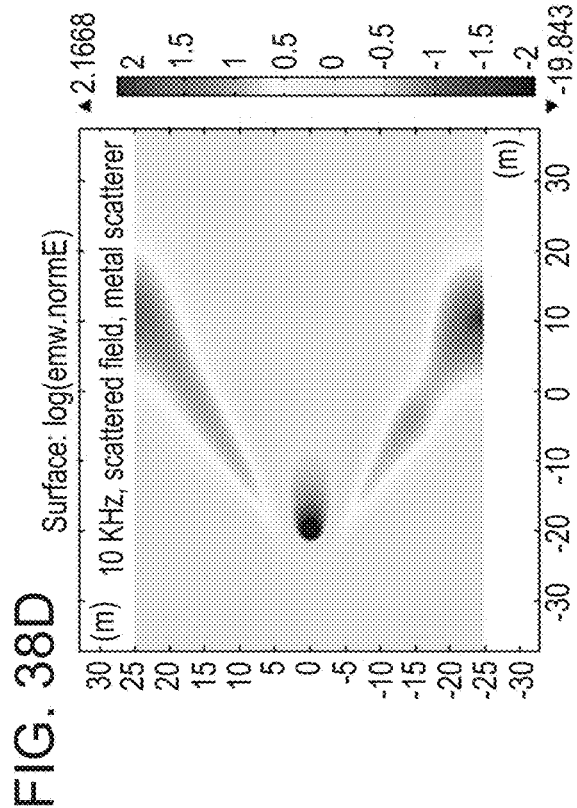
Figure 38A:
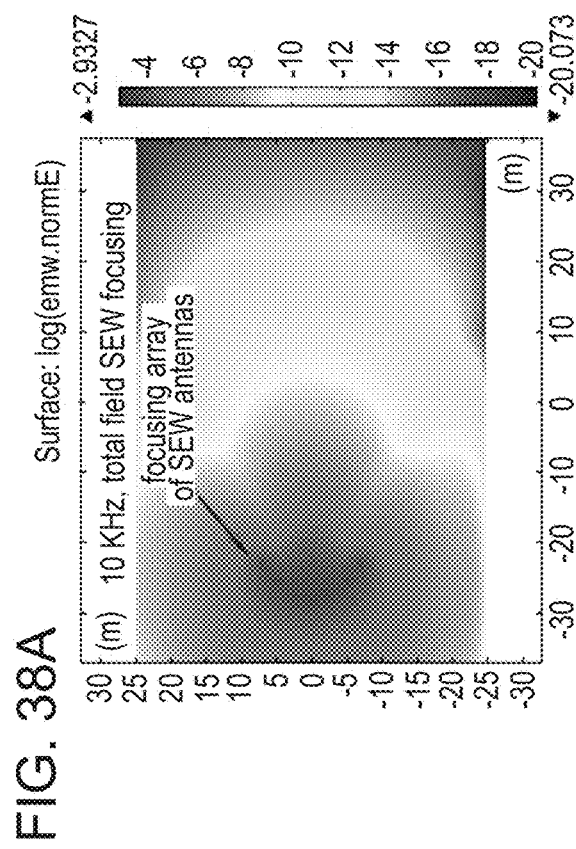
Figure 38C:
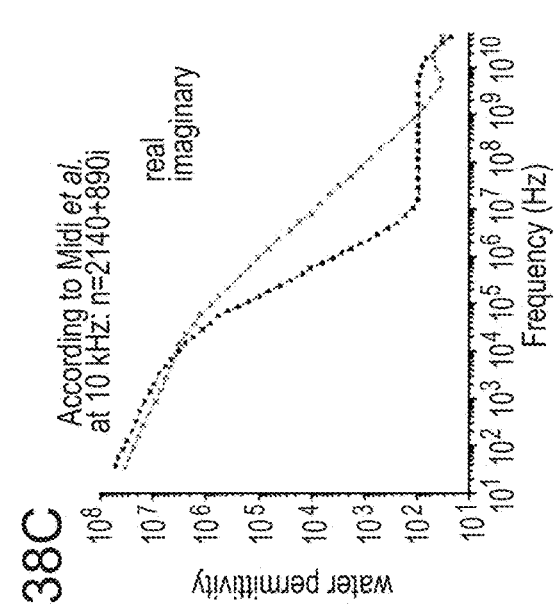

Sew Beamforming:

FIGS. 36, 37A-37C, 38A-38D show example beam forming using SEW, in some embodiments. Beam forming can be used in imaging applications of SEW, since directional propagation of the probe signal reduces the effects of high losses in SEW propagation along the seawater-air interface. Directional SEW propagation can be associated with the Huygens-Fresnel principle in a two-dimensional geometry, by considering the next iteration wave front as a set of secondary SEW sources. The resulting SEW intensity distribution over a surface can be found by a coherent superposition of the scattered SEWs from individual sources:

$$I \sim \left(\sum_n \frac{e^{j(kr_n + \phi_n)}}{r_n^{1/2}}\right)^2, \quad (63)$$

where $r_n$ is the distance between the point of observation and the $n^{th}$ secondary source, and zero losses have been assumed. FIG. 36 shows formation of directional SEW beam based on the Huygens-Fresnel principle (assuming zero losses). The corresponding SEW intensity distribution in the sea surface plane is shown in FIG. 36. The SEW distribution is shown as seen from the top (on the seawater surface). In some situations, the phases of the secondary SEW sources can vary linearly with the source position n. By choosing $d\phi/dn$, the desired propagation direction of a SEW beam can be chosen. The primary reason for the appearance of a well-defined SEW beam is the weak $\sim r^{-1/2}$ distance dependence of the electromagnetic field of cylindrical SEW waves propagating from the point sources. FIGS. 37A-37C show example modeling results of SEW beam formation and scattering by a metal and dielectric cylinder in the lossy situations (assuming n=2140+i890 for seawater at 10 kHz), using, for example, COMSOL Multiphysics, in some embodiments. In these simulations, 10 m long linear array of five SEW antennas emit SEW beam towards a distant scatterer. Similar to FIG. 36, the SEW distribution is shown as seen from the top (on the seawater surface). As shown in the simulation described with respect to FIGS. 37A-37C, 2D beam formation remains pronounced in the case of very high losses. In these simulations the dielectric permittivity of seawater at 10 kHz was assumed to be $(3.8+i3.8)\times10^6$ (which corresponds to n=2140+i890). Formation of such directional SEW beams can be used to detect an underwater scatterer. Similarly, the scattered field also exhibits considerable dielectric contrast.

FIGS. 38A-38D show example modeling results of SEW focusing onto a metal scatterer (assuming n=2140+i890 for seawater at 10 kHz), using, for example, COMSOL Multiphysics, in some embodiments. The SEW distribution is shown as seen from the top (on the seawater surface). An array of SEW antennas may also be used in a curvilinear arrangement, in order to achieve SEW focusing onto a desired underwater location. Such an antenna geometry may improve SEW beam directionality, and therefore improve signal to noise level in underwater imaging of a particular area of interest.

SEW Imaging Using Natural ELF Background.

Figure 39B:
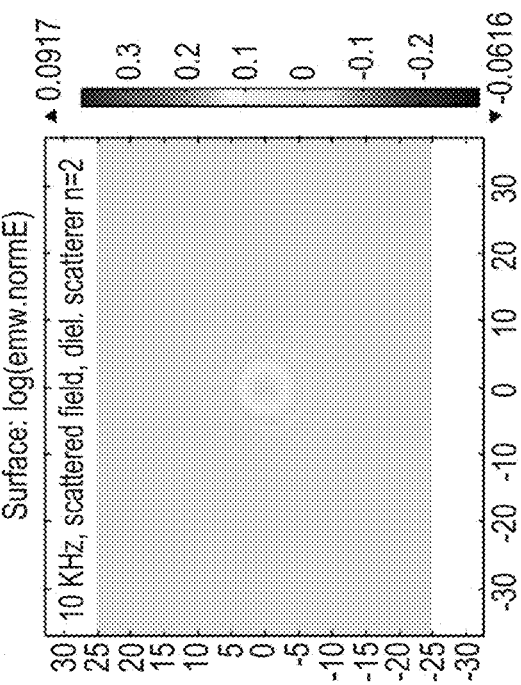
FIGS. 39A-39C show example modeling results of background SEW scattering by an underwater object, in some embodiments.
Figure 39A:
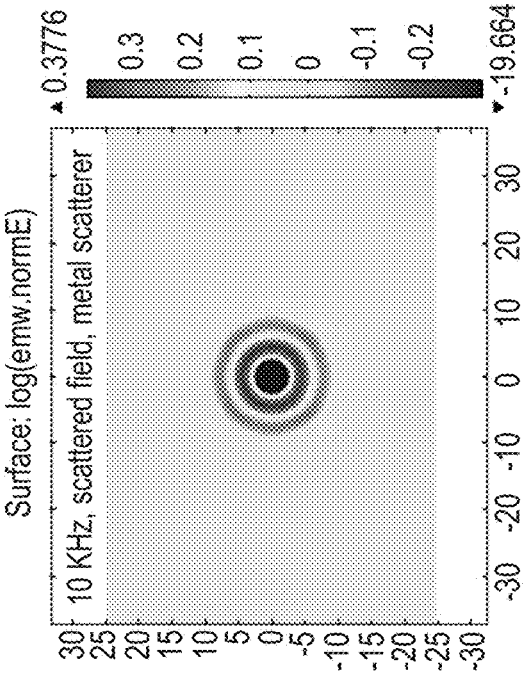
Figure 39C:
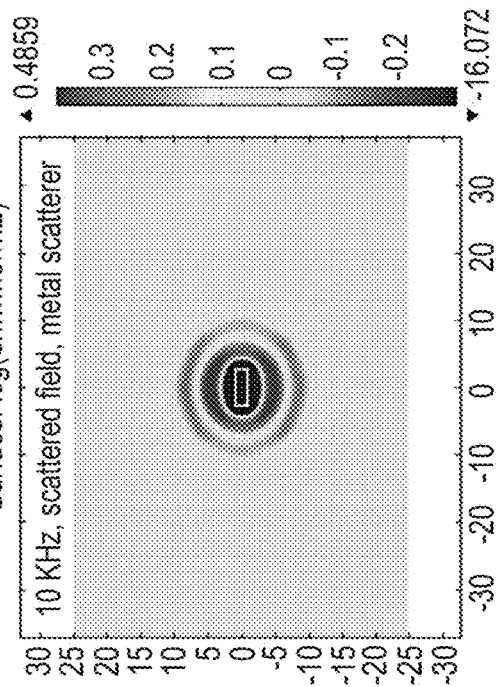

FIGS. 39A-39C show example modeling results of background SEW scattering by an underwater object, using, for example, COMSOL Multiphysics, in some embodiments. FIGS. 39A-39B show high dielectric contrast of the SEW scattering maps for a circular scatterer. FIG. 39C shows the effect of scatterer shape (shown by a white rectangle). In some situations, the natural omnidirectional SEW background can be emulated by point SEW sources arranged in a circular pattern around an underwater object (see FIG. 19). Differential images obtained in this source configuration with and without a scatterer placed in the middle can produce the expected SEW field distribution to be used in experimental testing. As shown, the asymmetric scatterer shape leads to an asymmetric scattering map. Similarly, these simulations indicate high spatial resolution (of the order of 1 m) of the SEW scattering maps.

Power Budget of SEW-Based Underwater Imaging:

FIGS. 40A-40D show example total field distribution and an example differential image of changes produced in the scattered field by variations in scatterer dimensions for the case of a dielectric cylinder (radius changes from 2 m to 3 m). FIG. 40D shows horizontal cross section of the total field image along the direction shown by the white line. The simulations show high sensitivity of the scattering maps to variations of scatterer dimensions of the order of 1 m. This scattering map was obtained while using a SEW source operated at 10 kHz (corresponding to free space wavelength of 30 km). The horizontal cross section of the total field image (along the direction shown by the white line) shows that the total field from a SEW antenna located 55 m away from the scatterer falls by 16 dB, while ~1 m change in scatterer radius leads to ~0.5 dB differential signal contrast at 55 m distance from the source.

Design of Tunable Sew Antenna

In some implementations, the Extreme Low Frequency (e.g., 3 KHz) of operation of the device can include a large dimension of the antenna for the efficient emission and reception of the electromagnetic fields (EM) of the signals in the band of interest. An efficient antenna can have dimensions comparable to the wavelength of the frequency of operation or its radiation resistance is very small, which causes ohmic losses and can be difficult to design the antenna feed.

In some implementations, the SEW-based underwater device includes a straight wire antenna, a monopole-type or a dipole-type. Two factors can be considered: the physical length (Km) and the environmental conditions. Sea water is conductive because of its ionic content. The conductivity not only attenuates propagating signals, but the ions can also hinder the radiation mechanism of linear dipoles, which need a high charge density at their tips to launch a wave in the environment. The large charge density near the tips of a dipole attracts the ions of sea water forming a counter-ion layer, that curtails the very radiation mechanism, i.e. the launching of radiated waves.

In some implementations, the underwater SEW device includes loop antennas. A circular loop antenna with electrically small circumference can have a very small radiation resistance. However, the radiation resistance can be increased by increasing the number of turns. In some implementations, the underwater SEW device includes an antenna shaped like a drum, with meter-size dimensions rather than the km-length of a dipole. The loop-shaped antennas can store magnetic energy in the radiation process, and thus, the launching of the magnetic fields is not hindered by the low dielectric loss of de-ionized (DI) water or simple filtered water. Immersing the antenna in water offers the advantage of shortening its size without substantial ohmic losses, because of its relatively small linear dimensions compared to a resonant dipole.

In some implementations, when enough loops are added to the antenna, it can resonate like a compact helical antenna. In these implementations, the loops at the end of the antenna can carry a substantial electric charge, which can be shielded from sea water to avoid the energy losses. The charges on the end loops can generate electric fields to be used to excite a surface wave at the seawater/air interface. There is a substantial advantage in resonating the antenna: it can be used with a 50Ω generator without the need of an impedance transformer, and thus, reduce the ohmic losses.

Embodiments described herein include the design and the performance of a helical antenna operating at, for example, 3 KHz, for SEW-based underwater communication and imaging. The advantages of such a design include minimizing the antenna size and complexity while maximizing the emitted ELF EM fields.

In some embodiments, the underwater SEW antenna can generate B and E fields with an orientation that matches the field configuration of the surface electromagnetic wave (as shown in FIGS. 12A-12B). The antenna operation can be based on the field enhancement at the antenna tip and on an impedance-matching antenna enclosure, which can be filled with DI water. The impedance-matching antenna enclosure can reduce antenna dimensions and improve the coupling of electromagnetic energy to the surrounding seawater medium. In addition, the impedance-matching antenna enclosure can prevent the surrounding seawater medium from "shorting" the underwater SEW antenna. Since surface wave propagation length far exceeds the skin depth of conventional radio waves at the same frequency, the embodiments described herein can be used in broadband underwater wireless communication and underwater imaging over distances that exceed the conventional skin depth in seawater.

In some implementations, the underwater SEW antenna can be tuned for exciting SEW modes based on FIG. 20. The underwater SEW antennas are resonant helical dipoles which can be fed (tapped) at various points over their length 2001. One of the tuning parameters is the tapping point to a feeding coaxial line. The behavior of regular (straight) dipole antenna optimized for radiation into free space (2002) is shown in FIG. 20. The use of magnetic mirrors in the ELF SEW antenna (as illustrated in FIG. 21) can enable considerable antenna size reduction for keeping low SWAP-C of antennas in the ELF range. Magnetic mirrors at both ends of a magnetic antenna lead to enhancement of its magnetic dipole moment without, in some situations, increasing its geometrical sizes and operating power. In some implementations, the underwater SEW antenna includes a plurality of magnetic mirrors. In other implementations, the underwater SEW antenna includes a single magnetic mirror at the base (ground) of the antenna.

Figure 41:
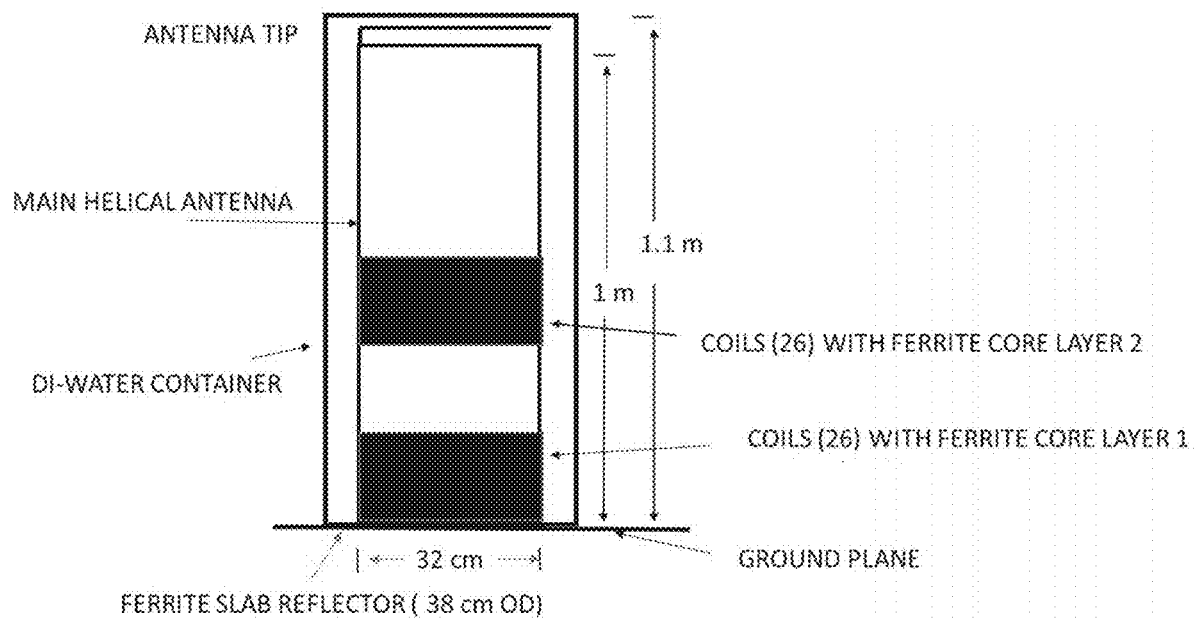
FIG. 41 shows an example design of the underwater SEW antenna (operating, for example, at 3 KHz), in some embodiments.

FIG. 41 shows an example design of the underwater SEW antenna (operating, for example, at 3 KHz), in some embodiments. In some implementations, the underwater SEW antenna 4100 can include a main helical antenna having an antenna tip. The main helical antenna may be placed in an enclosure (or container) filled with, for example, DI water (or other impedance matching fluid). The underwater SEW antenna 4100 can include a number of ferrite-loaded coils with a number of layers (layer 1, layer 2). The underwater SEW antenna 4100 can include a ferrite slab reflector 4101 which can be used as magnetic mirrors. The underwater SEW antenna 4100 can be submerged in seawater. At 3 kHz, the free space wavelength is $\lambda_0=10^5$ m, which corresponds to $\lambda_0/4=2.5\times10^4$ m. At this frequency, a resonant helical underwater SEW antenna in air can include the winding of 25 km of copper wire. Immersion of the antenna in deionized water (e.g., dielectric constant $\varepsilon_r \approx 100$) reduces the wavelength by a factor of 10, yielding a quarter wavelength of $\lambda/4=2500$ m. A coil of 16 cm radius (about 1 ft diameter) has a circumference of approximately 1.005 m. Using 1 mm diameter wire (e.g., AWG 19), the coil length can be approximately 2.5 m with 2,500 turns in the coil. The inductance is given by as:

$$L = K\mu_o N^2 A/L_c, \tag{64}$$

where $\lambda$=area of coil, N=number of turns, $L_c$=length of the inductor, and K=Nagaoka's factor=0.95, resulting in $L_c$=240 mH.

In some implementations, to reduce the overall length of the coil, the underwater SEW antenna can include a number of ferrite-loaded small coils in series with the winding of the main coil. To achieve the shortening of the main coil to 1 m, the ferrite loaded coils can provide a total inductance of 144 mH in series with the main coil. A 20 cm long coil with 1 cm radius can be wrapped with 200 windings of AWG 19 wire. A 20 cm long ferrite bar with $\mu_r$=100, would have an apparent effective permeability $\mu_{rod}$=50 and an inductance of $L=\mu_o \mu_{rod} \times 0.7 \times (200)^2 \times \pi \times (0.01)^2/0.2=2.76$ mH with $F_L$=0.7. A total of 52 such coils can be used to achieve the main coil length reduction. The resistance of a 2.5 km long AWG 19 wire is about R=2.5×22 Ω=55Ω. The wire length of a coil of 1 cm radius and 200 windings is 12.57 m and the total wire length of 52 such coils is 0.654 km with a resistance of 14.4Ω. The total resistance of the 1 m long coil and the ferrite windings is R=(22+14.4) Ω=36.4Ω. The ohmic loss in the ferrite bars can be added to the 36.4Ω. The total might be higher than 55Ω.

In some implementations, the electric field of the antenna tip 4102 enables matching of the antenna E and B field orientation to the configuration of the electromagnetic fields of the SEW mode propagating along the seawater surface.

Figure 42:
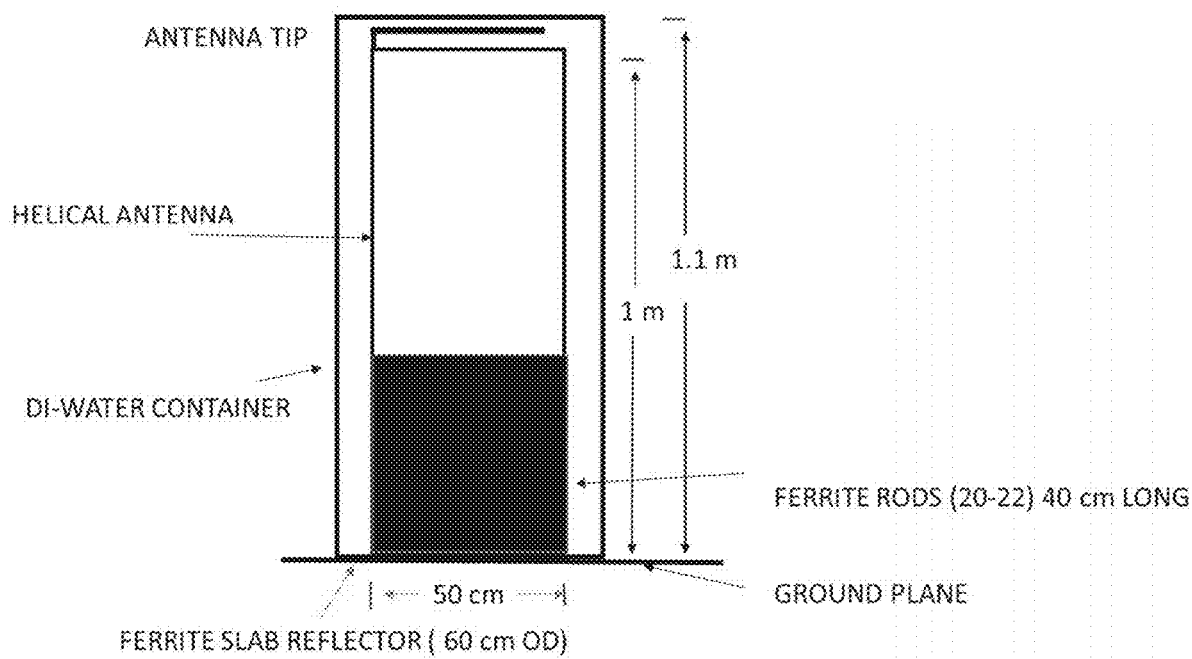
FIG. 42 shows an example schematic design of the underwater SEW antenna, operating in a band of, for example, 3-11 KHz, in some embodiments.

FIG. 42 shows an example schematic design of the underwater SEW antenna, operating in a band of, for example, 3-11 KHz, in some embodiments. In some implementations, the underwater SEW antenna 4200 can have an increased antenna diameter and a reduced number of auxiliary coils, compared with the underwater SEW antenna 4100. The diameter of the underwater SEW antenna 4200 can be approximately 0.5 m and the length of the antenna can be 1 m. The wire AWG 11 can have a 2.3 mm diameter and carry a 12 A maximum current.

In some implementations, the inductance of a coil with diameter comparable to its length is (a=coil radius):

$$L = K\mu_0 \frac{N^2}{L_c} A \frac{2}{\pi}\left(1 - \frac{2}{3}\frac{2a}{L_c} + \ldots\right) \quad (65)$$

In view of the high operational power of the antenna, the underwater SEW antenna can include a wire with skin depth equal to it radius (100% skin depth) at the lowest frequency (3 KHz). The copper wire of choice has a diameter of 2.3 mm (AWG 11) and carries a max current of 12 A.

In some implementations, approximately 2,500 meters of such wire can be wound on a coil to make it resonate at 3 KHz in DI water. A diameter of 0.5 meter can be used for a UUV application as the antenna can be much smaller than the diameter of the vehicle. A coil of 0.5 m diameter has a circumferential length of ≈1.57 m. Using 2.3 mm diameter wire (AWG 11), the coil length would be 3.7 m with 1,592 turns in the coil. The inductance given by Eq. (65) is L=K 2/πμ$_o$N2A×0.9/L$_c$. With K (Nagaoka's factor)=0.94, $$L=0.94\times 2/\pi\times 4\pi\times 10^{-7}\times 1{,}592^2\times \pi\times 0.0625\times 0.9/3.7$$
$$H=91 \text{ mH}. \quad (66)$$

To reduce the overall length of the coil, the underwater SEW antenna 4200 can include a number of ferrite-loaded small coils in series with the winding of the main coil. To achieve the shortening of the coil to 1.0 m, the ferrite loaded coils must provide a total inductance of 66 mH in series with the main coil. The number of coils remaining in the antenna body can be 435.

A 40 cm long coil with 1.27 cm radius can be wrapped with 174 windings of AWG 11 wire. A 40 cm long ferrite bar with μ$_r$=100, would have a permeability μ$_{rod}$=50 and an inductance of $$L=\mu_o\, \mu_{rod}\times 0.7\times (174)^2\times \pi\times (0.0127)^2/0.4 = 1.7 \text{ mH}$$

with F$_L$=0.7. A total of 39 such coils can be included in the underwater SEW antenna 4200 to achieve the main coil length reduction.

Figure 43:
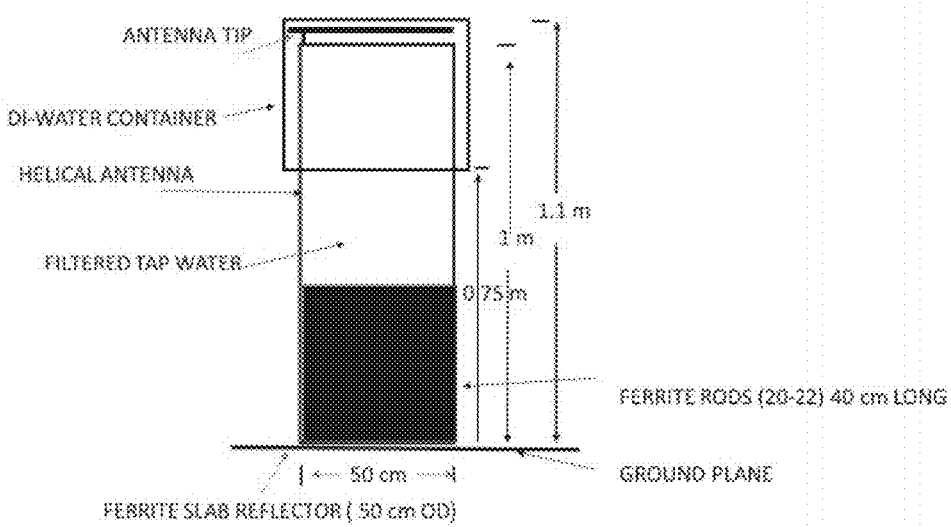
FIG. 43 shows an example schematic design of the underwater SEW antenna, in some embodiments.

FIG. 43 shows an example schematic design of the underwater SEW antenna, in some embodiments. In some implementations, a magnetic (ferrite) slab can be included in the underwater SEW antenna 4300 to enhance the magnetization of the ferrite rods by a factor as high as 2 (two). In some implementations, 20-22 auxiliary ferrite rods can be used to tune the shortened coil antenna. They can be housed around the bottom of the antenna. It offers, in some implementations, maximum amplitudes of the field and voltage at the top of the antenna:

$$B_{max}=L\times I_{max}/S=91\times 10^{-3}\times 12/(\pi\times 0.0625)\approx 5.6 \text{ Weber/m}^2$$

$$V_{max}=\omega L\times I_{max}=2\times\pi\times 3\times 91\times 12, \approx 20{,}584 \text{ V}$$

This high voltage can be used to establish a strong electric field parallel to the top winding of the antenna. The frequency of operation of the antenna can be increased up to 3.7×3 KHz=11 KHz by switching off all the auxiliary ferrite rods. The antenna core does not need to be immersed in DI water, in some implementations. Only the part with high voltage conductors, that is its top part 4301, needs to be in an electrically lossless environment in order to avoid dielectric ohmic losses, in these implementations. The bottom part of the coil contains ordinary clean tap water which has high relative dielectric constant and no magnetic losses. The underwater SEW antenna 4300 can be supported by a thin (<0.5 cm) drum of plastic material. The lower part can be covered by a thin (<0.5 cm) plastic shield. The underwater SEW antenna 4300 can reduce the weight of the antenna by about 65 kg and the amount of needed DI water to less than 100 kg vs. 300 kg.

The example underwater SEW antennas described with respect to FIGS. 41-43 can include a similar enclosure (or container) filled with, for example, DI water (or other impedance matching fluid). These example underwater SEW antennas can include a number of ferrite-loaded coils with a number of layers. These example underwater SEW antennas can include a ferrite slab reflector which can be used as magnetic mirrors. These example underwater SEW antennas can be submerged in seawater.

Figure 44:
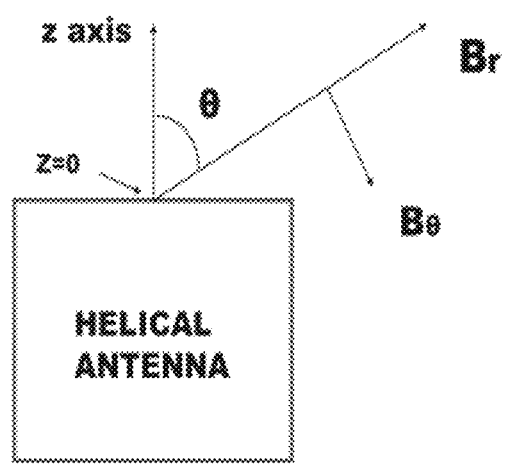
FIG. 44 shows an example geometry of an underwater SEW antenna and the electromagnetic field, in some embodiments.

FIG. 44 shows an example geometry of an underwater SEW antenna and the electromagnetic field, in some embodiments. The axial B-field at and near the antenna aperture can be computed using the inductance of the coils. The equation for B$_z$ is $$B_z = L\times I/(N\times A)$$

where L is the inductance, I the antenna current, N the number of coils and A the area of the antenna cross section ($=\pi\times .25^2$ m$^2$). In some implementations, the values of for a current can be normalized as I=1 A. At 3 KHz the value of the magnetic flux density is $$B_z = 91 \text{ mH}/(200\times\pi\times 0.25^2) = 2.32\times 10^{-3} \text{ Wb/m}^2.$$

In some implementations, N=200 is the number of coils with ≈1 A current, a fraction of the total 435 coils of the antenna. In some implementations, with λd=wavelength in DI water at 3 KHz, the current goes to zero at z=L=2,500 m=λd/4 and its functional form is $$I(s) = I\sin\frac{2\pi}{\lambda_d}(L - s) \quad (67)$$

The propagation of this field in the sea water can be computed using the equations of the fields from small loops with k$_w$=2π/λ$_w$, the propagation constant in the sea water:

$$B_\theta = -\mu_0 \frac{k_w^2 m\sin\theta}{4\pi r}\left[1 - \frac{1}{jk_w r} - \frac{1}{(k_w r)^2}\right]e^{-jk_w r} \quad (68)$$

$$B_r = \mu_0 \frac{k_w^2 m\cos\theta}{2\pi r}\left[\frac{j}{k_w r} + \frac{1}{(k_w r)^2}\right]e^{-jk_w r}$$

where m=NAI. With I=1 A and θ=0 B$_r$=B$_z$ for r sufficiently small. In our case k$_d^2$ m=8.0×10$^{-12}$ Wb/m$^2$. In some implementations, the computations of the fields can be performed after the determination of the propagation constant kw.

Figure 45:
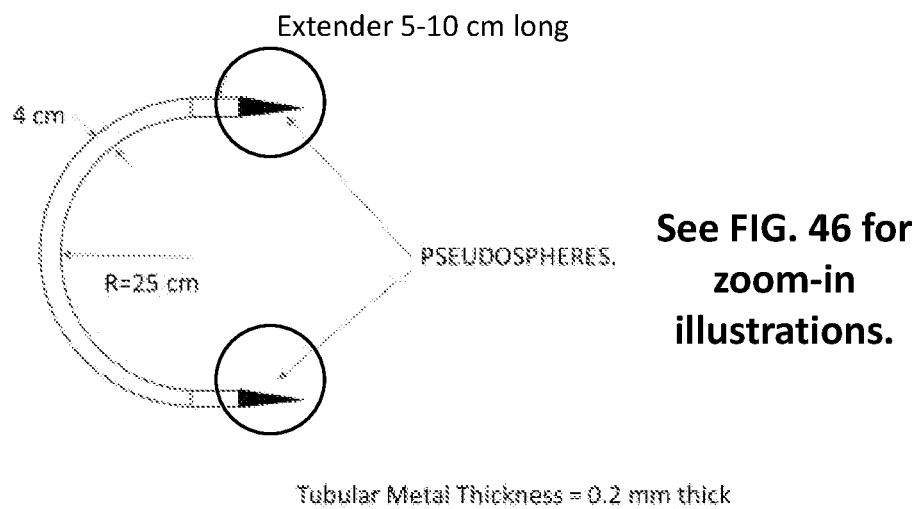
FIG. 45 shows an example geometry of a polariton exciter, in some embodiments.

FIG. 45 shows an example geometry of a polariton exciter, in some embodiments. To maximize the injection of plasmonic charges to the sea surface with some angular directivity, in some implementations, the end of the underwater SEW antenna can include a metal surface with a smooth taper into one or more tips. The sharpness of the tips can be balanced against the creation of excessive electric fields that can cause a dielectric breakdown in the DI water medium surrounding the metal polariton launcher. The tubular launcher structure can include a simple tubular structure terminating in two half pseudospheres parallel to each other and to the sea surface. In some implementations, the helical underwater SEW antenna has a diameter of 0.5 m and its wire is a quarter of a wavelength long in DI water at 3 KHz, $\lambda_d = 3 \times 10^7$ ms$^{-1}$/3000 s$^{-1}$=10,000 m. The antenna current goes to zero at L=2,500 m=$\lambda_d$/4 and its functional form is $$I(s) = I\sin\frac{2\pi}{\lambda_d}(L-s)$$

At s=0, the wire is grounded and the current has its maximum value. The charge density at the end of the wire (s=L) is $\sigma_o \times 2\pi/\lambda_d$ where $\sigma_o$ is the surface charge density on the surface of the wire of the antenna coil.

The surface current density on a cylindrical wire of radius a is given by the equation:

$$\sigma_o = \frac{I}{\pi a^2}\frac{ka}{2}\frac{M_0(ka)}{M_1(ka)}e^{j(\theta_0(ka)-\theta_1(ka)+3\pi/4)} \quad (69)$$

where $k^2 = \omega\mu_o/\rho$, with $\mu_o$=free space magnetic permeability, $\rho$=resistivity of metal wire and I is the total wire current. In some implementations, the exponential factor can be neglected. $M_0(ka)$ and $M_1(ka)$ are J Bessel functions of complex argument.

In some implementations, (Cu) $1\rho=5.81\times10^7$ S/m, a=1.15 mm and k=$2\pi$sqrt($3000\times2\times5.81$)m$^{-1}$=$2\pi\times186.7$ m$^{-1}$, ka=1.349, $M_0(ka)$=1.051, $M_1(ka)$=0.6808. $M_0(ka)/M_1(ka)$=1.54. FIG. 45 shows the geometry of the polariton exciter connected at the end of the underwater SEW antenna wire at the bottom center of the tubular structure, in some embodiments.

Figure 46:
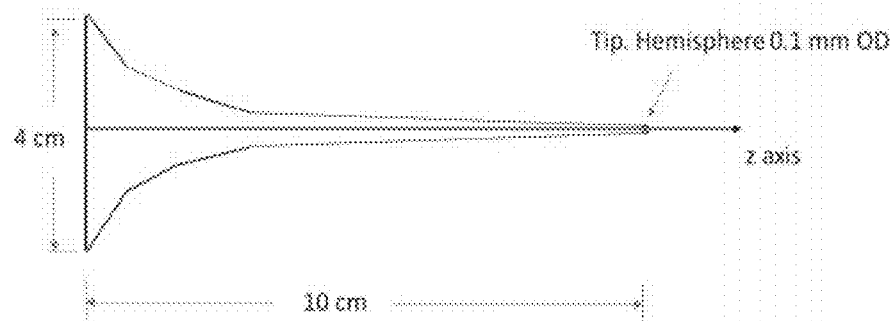
FIG. 46 shows a cross-section of the example pseudo-spherical plasmon launcher, in some embodiments.

FIG. 46 shows a cross-section of the example pseudospherical plasmon launcher, in some embodiments. By attaching the tip of the wire to the tubular structure the following current density can be transferred to the plasmonic exciter:

$C_o = \sigma_o \times k_d 2\pi a$

From Eq. (69), 1 A current gives $\sigma_o$=k×1.54/2πa=0.25 A/mm$^2$=25 A/cm$^2$. With $k_d=2\pi\times10^{-4}$ m$^{-1}$=$2\pi\times10^{-6}$ cm$^{-1}$, the total current density injected in the tubular electrode is $\sigma_o \times 2\pi a \times kd = 113\times10^{-6}$ A/cm$^2$ and a charge density of $$C_d = \sigma_o \times k_d x \frac{2\pi a}{\omega} = 113 \times 10^{-6}/(2\pi \times 10^3) = 1.8 \times 10^{-8} \text{ C/cm}^2.$$

The above relation is established by using the equation $$\nabla \cdot \nabla \times H = 0 = \nabla \cdot J + \frac{\partial \rho}{\partial t}$$

The radius at the equator of the pseudosphere is R=2 cm and the area of the equatorial surface of the half pseudospheres is 12.5 cm$^2$. The area of the metal polariton launcher is $A = 4\times\pi\times\pi\times\pi$ cm$^2$ + $2\times4\times\pi\times5$ cm$^2$ + $2\times6.28$ cm$^2$=2400 cm$^2$.

The charges injected by the wire will tend to distribute uniformly over the tubular electrode. The total charge density at a pseudosphere base is $C_T = 1.8\times10^{-8}$ C/cm$^2 \times 12.5/2400 = 0.94\times10^{-10}$ C/cm$^2$ In some implementations, there can be minimal charge loss over the pseudospherical electrode, so the charges at the equator of the pseudosphere can travel with no loss along the metal surface to the hemispherical tip of radius r=0.1 mm. The electric charge density at the tip can be $Q = 0.94\times10^{-10} \times R/r = 3.8\times10^{-8}$ C/cm$^2$ The metal half sphere at the end of the electrode slightly decreases the charge density given above, by a factor equal to the ratio of the circular surface of radius r and that of the hemisphere=$\pi r^2/2\pi r^2$. The electric field E at the tip of the pseudosphere with 1 A current is equal to the charge density divided by the dielectric constant of the DI medium:

$E = Q/\varepsilon_r\varepsilon_o = 0.5\times3.8\times10^{-8}/100\times10^{-11}/36\pi \approx 2.1$ KV/cm The field can decay as $1/r^2$ with distance from the tip.

Figure 47:
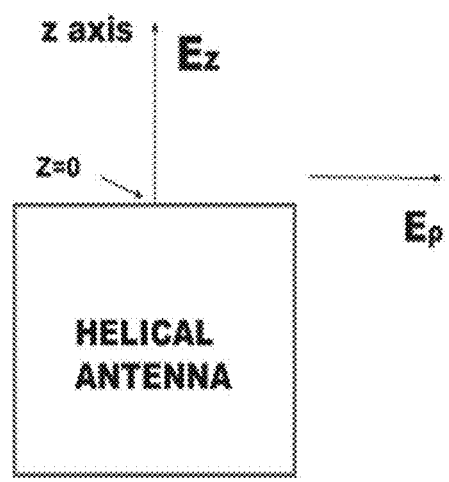
FIG. 47 shows the example electrical field from the helical underwater SEW antenna, in some embodiments.

FIG. 47 shows the example electrical field from the helical underwater SEW antenna, in some embodiments. In addition to the E-fields from the polariton exciter, the charges on the antenna wire support an electric field with rotational symmetry. This E-field can also excite plasmon polaritons at the seawater/air interface. The electric field components from the charges on the antenna wire can be computed using the divergence of the relation $\nabla\times H = J_i + j\omega\varepsilon E$, which yields $$\nabla \cdot E = j\frac{\nabla \cdot (J)_i}{\omega\varepsilon} = j\frac{-j\omega\rho_i}{\omega\varepsilon} = \frac{\rho_i}{\varepsilon}$$

The impressed surface charges p, of the antenna are evaluated using the derivative of the current function of Eq. (67)

$$\rho_i = j\frac{1}{\omega}I\frac{2\pi}{\lambda_d}\cos\frac{2\pi}{\lambda_d}(L-s) = jI\frac{k_d}{\omega}\cos k_d(L-s) \quad (70)$$

In eq. (70) $\omega=2\pi f$, f is the frequency of operation of the antenna (f=3000 Hz). The charges accumulate close the top of the antenna, where current is decaying.

The electric field vector components are computed using the electrostatic relation:

$$\vec{E}(r) = \frac{1}{4\pi\varepsilon}\nabla\int_{L_i}\rho_i\frac{1}{|r-r'|}dL_i = \frac{1}{4\pi\varepsilon}\int_{L_i}\rho_i\nabla\left(\frac{1}{|r-r'|}\right)dL_i$$

where $L_i$ is the portion of the wire L where there are significant static charges. The electric field has two components $E_\rho$ and $E_z$. Using the J-Bessel functions, $$\frac{1}{|r-r'|} = \frac{1}{\sqrt{|\rho-\rho'|^2+(z-z')^2}} = \quad (71)$$

$$\int_0^\infty J_0(k|\rho-\rho'|)e^{-k|z-z'|}dk = \sum_{n=-\infty}^{n=\infty} e^{jn(\phi-\phi')}\int_0^\infty J_n(k\rho')e^{-k|z-z'|}dk$$

the equation for the electric field from the top turn of the helix ($z'=0$) is $$\vec{E}(r) = \frac{1}{4\pi\varepsilon}\nabla\int_{L_1}\rho_i\frac{1}{|r-r'|}dL_i =$$

$$-\frac{\rho_i}{4\pi\varepsilon}\int_0^{2\pi}\sum_{n=-\infty}^{n=\infty}e^{jn(\phi-\phi')}\nabla\left[\int_0^\infty J_n(k\rho)J_n(k\rho')e^{-k|z-z'|}dkad\phi'\right] =$$

$$-\frac{2\pi a\rho_i}{4\pi\varepsilon}\nabla\left[\int_0^\infty J_0(k\rho)J_0(ka)e^{-k|z-z'|}dk\right] = -\frac{2\pi a\rho_i}{4\pi\varepsilon}\nabla\left[\int_0^\infty J_0(k\rho)J_0(ka)e^{-kz}dk\right]$$

for $z>0$. From the above relations, the components of the electric field are:

$$E_\rho = \quad (72)$$

$$-\frac{2\pi a\rho_i}{4\pi\varepsilon}\frac{\partial}{\partial\rho}\left[\int_0^\infty J_0(k\rho)J_0(ka)e^{-kz}dk\right] = \frac{2\pi a\rho_i}{4\pi\varepsilon}\left[\int_0^\infty J_1(k\rho)J_0(ka)e^{kz}kdk\right]$$

$$E_z = -\frac{2\pi a\rho_i}{4\pi\varepsilon}\frac{\partial}{\partial z}\left[\int_0^\infty J_0(k\rho)J_0(ka)e^{-kz}dk\right] = \frac{2\pi a\rho_i}{4\pi\varepsilon}\left[\int_0^\infty J_0(k\rho)J_0(ka)e^{-kz}kdk\right]$$

Both Eqs. (72) admit close form integration $$\int_0^\infty J_0(k\rho)J_0(ka)e^{-kz}dk = \quad (73)$$

$$\frac{\pi}{\sqrt{2a\rho}}\frac{1}{(z^2+\rho^2+a^2)^{\frac{3}{2}}} \times {}_2F_1\left(\frac{3}{4},\frac{1}{4},\frac{1}{4},\frac{1}{(z^2+\rho^2+a^2)^2}\right)$$

The hypergeometric function $${}_2F_1(\alpha,\beta,\gamma,z) = 1 + \frac{\alpha\beta z}{1!\gamma} + \frac{\alpha(\alpha+1)\beta(\beta+1)z^2}{2!\gamma(\gamma+1)} + \ldots$$

can be absolutely and uniformly converging for $|z|<1$. The asymptotic expansion of ${}_2F_1$ shows that the contribution of the hypergeometric function can be neglected so the functional form of the electric field components is:

$$E_\rho = -\frac{2\pi a\rho_i}{4\pi\varepsilon}\frac{\partial}{\partial\rho}\left[\frac{\pi}{\sqrt{2a\rho}}\frac{1}{(z^2+\rho^2+a^2)^{\frac{3}{2}}}\right] \quad (74)$$

-continued $$E_z = -\frac{2\pi a\rho_i}{4\pi\varepsilon}\frac{\partial}{\partial z}\left[\frac{\pi}{\sqrt{2a\rho}}\frac{1}{(z^2+\rho^2+a^2)^{\frac{3}{2}}}\right]$$

The total E field is given by the superposition of the field from the coils at $-z'$ with charge $\rho_i$, using equation (73) with $z+z'$ in place of z. Several coils near the tip of the antenna have a charge density equal top. In a first approximation, the total electric field is given by the sum of the E-fields from the polariton exciter and the antenna top coils.

In some implementations, the underwater SEW antenna, having the compact helical design, can generate high intensity electromagnetic fields at 3 KHz. In some implementations, enclosing the antenna in DI water reduces substantially the volume of the structure and the amount of metal wire necessary to operate at ELF. The antenna has magnetic and electric characteristics that make it suitable for underwater operation because, for example both its currents and its charges are shielded from direct contact with seawater which tends to attenuate them.

Figure 48:
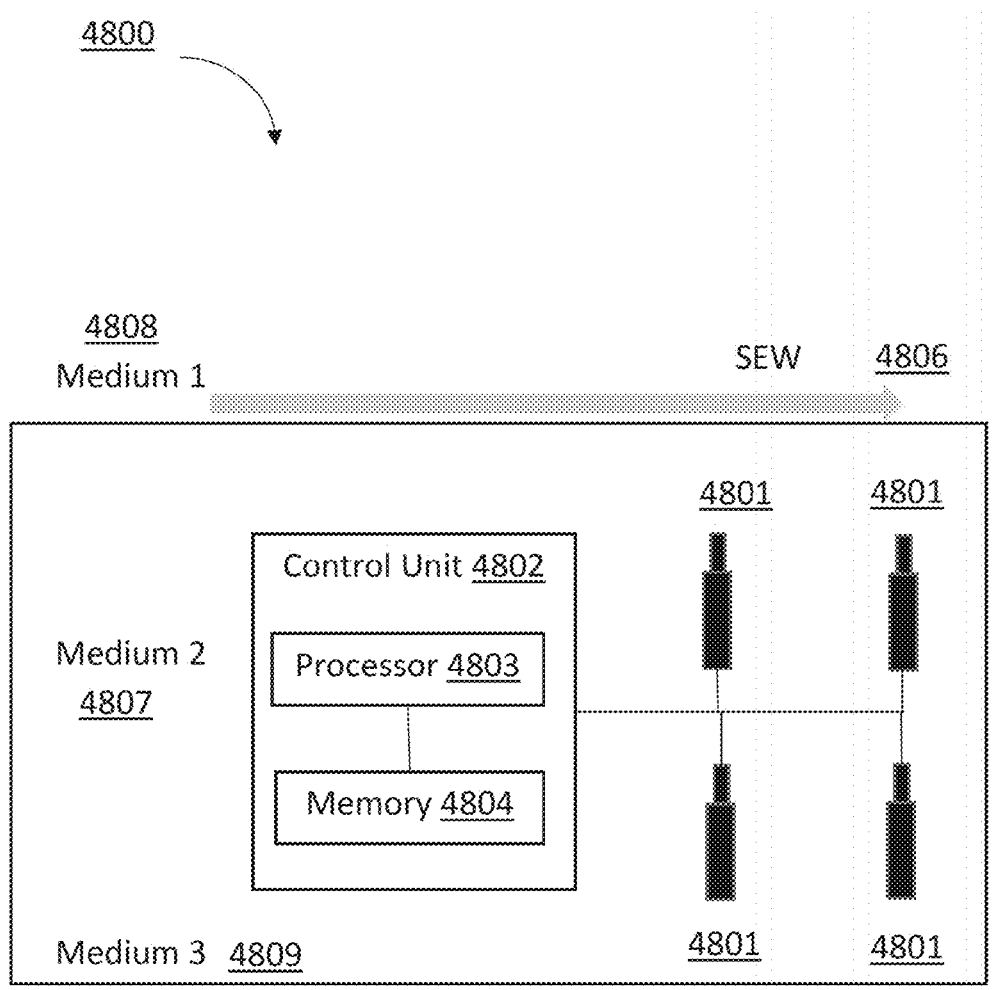
FIG. 48 shows an example of a surface electromagnetic wave (SEW)-based underwater communication and imaging system, in some embodiments.

FIG. 48 shows an example of a surface electromagnetic wave (SEW)-based underwater communication and imaging system 4800, in some embodiments. The SEW-based underwater communication and imaging system 4800 can be physically and functionally similar to the surface wave communication sensor system 600 described with regards to FIG. 6. The SEW-based underwater communication and imaging system 4800 includes a plurality of underwater SEW antennas 4801 to receive and transmit electromagnetic signals and a control unit 4802 having a processor 4803 and a memory 4804. The control unit 4802 is operatively and/or communicatively coupled to the plurality of underwater SEW antennas 4801. In some implementations, the plurality of underwater SEW antennas 4801 can be connected together such that their individual currents are transmitted in a specified amplitude or phase relationship. In other implementations, the plurality of underwater SEW antennas 4801 are not connected together and operate independently with the control unit 4802. The SEW-based underwater communication and imaging system 4800 can be placed in a conductive medium 4807, interfacing with a first medium 4808 and in some implementations, interfacing with a third medium 4809. For example, the SEW-based underwater communication and imaging system 4800 can be placed in seawater 4807 interfacing with air 4808 and seafloor 4809.

The control unit 4802 may include a processor 4803 and a memory 4804 operatively coupled to the processor 4803. The processor 4803 can be or include any processing device or component configured to perform the data collecting, processing and transmitting functions. The processor 4803 can be configured to, for example, write data into and read data from the memory 4804, and execute the instructions stored within the memory 4804. Processor 4803 can also be configured to execute and/or control, for example, the operations of the memory 4804. The memory 4804 can be, for example, a random-access memory (RAM) (e.g., a dynamic RAM, a static RAM), a flash memory, a removable memory, and/or so forth. In some embodiments, the memory can include, for example, a database, process, application, virtual machine, and/or some other software modules (stored and/or executing in hardware) or hardware modules.

In some embodiments, the plurality of underwater SEW antennas 4801 can be configured to generate surface electromagnetic (SEW) signals 4806 and communicate with (or image) an object (not shown). The plurality of underwater SEW antennas 4801 may receive electromagnetic signals back from the object and send them to the control unit 4802 for processing. During operation, the processor 4803 may generate an input signal and send the input signal to at least one antenna from the plurality of underwater SEW antennas 4801 to generate the electromagnetic signals. The processor 4803 can be configured to individually adjust one or more parameters (e.g., phase, power level, wavelength, direction of the electromagnetic signal, relative position and distance from another antenna, depth in the medium 4807, and/or the like) of each antenna from the plurality of underwater SEW antennas 4801. Upon receiving the signals back from the antenna, the processor 4803 can be configured to process the signals and in some implementations, produce an image of the object. In some implementations, the processor 4803 can determine, depending on the locations of the object and each antenna, one or more antennas from the plurality of underwater SEW antennas 4801 to use for optimal performance. In some implementations, the processor 4803 can send the input signal to a first antenna and a second antenna such that the first antenna and the second antenna transmit SEW signals in a relative amplitude or phase relationship (i.e., having a pre-determined phase or amplitude difference).

Figure 49:
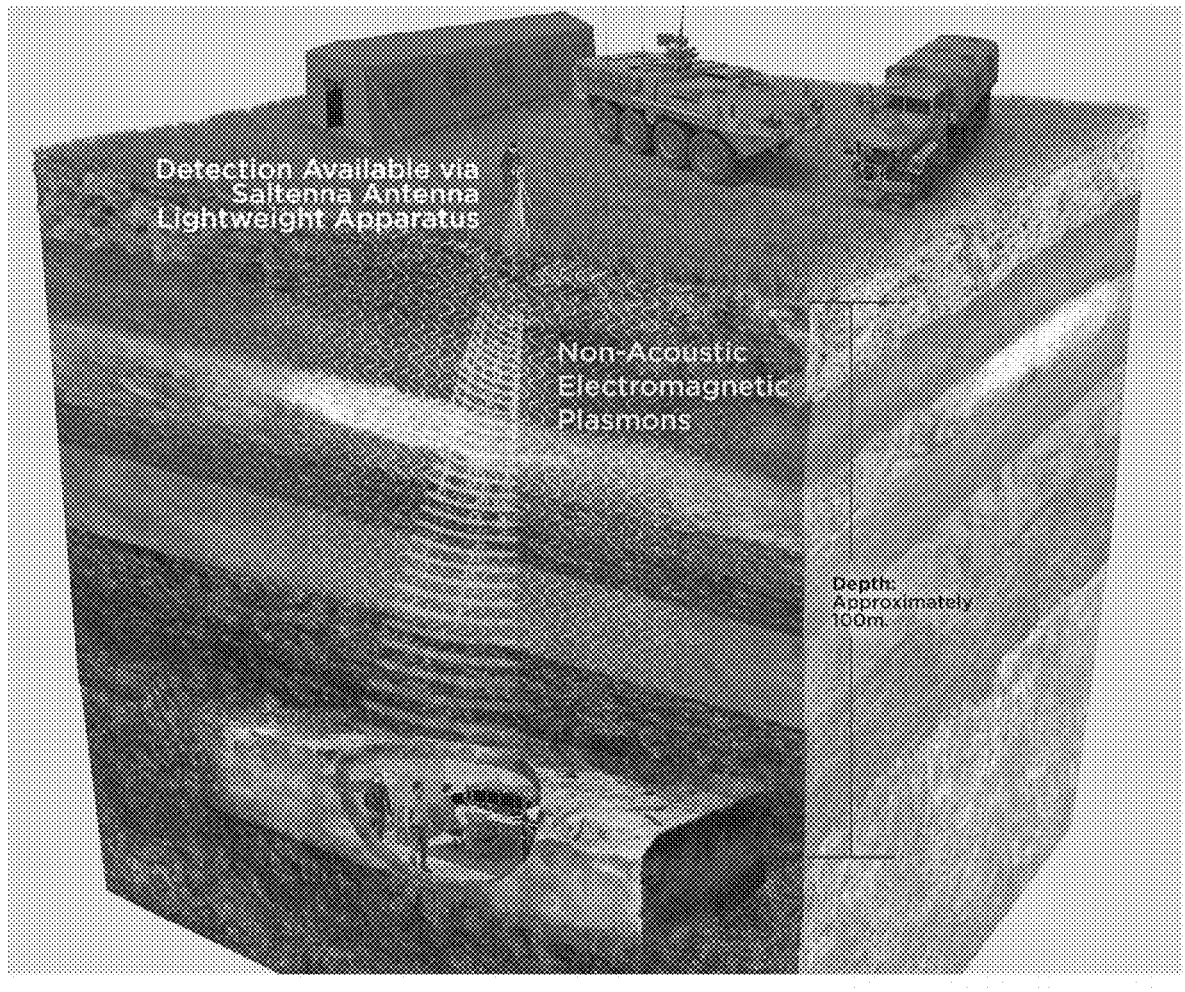
FIG. 49 shows a diagram of the operation of the SEW-based ground penetrating radar method, in some embodiments.

In some embodiments, the surface electromagnetic waves described herein can be used to detect hardened and deeply buried targets (HDBT) underground (via the underground SEW apparatus). The SEW may propagate over distances considerably larger than the conventional classical skin depth in the conductive media (such as different soils, clays, wet sand, etc.), which results in improved penetration ability of the SEW signals compared to the conventional ground penetrating radars (GPR). In addition to considerably extended scanning range, the method of using SEWs to detect underground targets described herein provides improved spatial resolution compared to conventional GPRs. In some implementations, the wavelength of SEWs used here can be much shorter than the free space wavelength at the same operating frequency. FIG. 49 shows a diagram of the operation of the SEW-based ground penetrating radar method, in some embodiments.

Abrupt step-like planar interfaces between media having different electromagnetic properties can support surface electromagnetic waves (SEW). Long-range low-loss propagation of such SEWs, including surface plasmons (SP), can propagate along metal-dielectric interfaces. Zenneck waves may propagate along interfaces between highly lossy conductive media and low-loss dielectrics.

As discussed above, the SEWs can exist at interfaces between two highly conductive media. In particular, the SEWs can exist at the walls of deeply buried targets of interests. Starting from the macroscopic Maxwell equations:

$$\vec{\nabla}\vec{D} = 0, \vec{\nabla}\vec{B} = 0, \vec{\nabla} \times \vec{E} = i\frac{\omega}{c}\vec{B}, \text{ and } \vec{\nabla} \times \vec{B} = -i\frac{\omega\varepsilon}{c}\vec{E} \quad (75)$$

For example, assuming gradual interface between two highly lossy conductive media, the equation which describes TM-polarized surface electromagnetic waves may be written in the form of an effective Schrodinger equation:

$$-\frac{\partial^2 \psi}{\partial z^2} + \left(-\frac{\varepsilon(z)\omega^2}{c^2} - \frac{1}{2}\frac{\partial^2 \varepsilon}{\varepsilon \delta z^2} + \frac{3}{4}\frac{(\partial \varepsilon/\partial z)^2}{\varepsilon^2}\right)\psi = -\frac{\partial^2 \psi}{\partial z^2} + V\psi = -k^2\psi \quad (76)$$

in which the effective wave function can be introduced as $E_z = \psi/\varepsilon^{1/2}$. The effective potential V, which guides SEW propagation along the interface may be defined as $$V(z) = -\frac{4\pi\varepsilon(z)}{\lambda_0^2} - \frac{1}{2}\frac{\partial^2 \varepsilon}{\varepsilon \delta z^2} + \frac{3}{4}\frac{(\partial \varepsilon/\partial z)^2}{\varepsilon^2} \quad (77)$$

where $l_0$ is the free space wavelength. In some implementations, the effective potential described by Eq. (77) can remain almost purely real, when, for example, the two bounding conductive and extremely lossy media are described by purely imaginary dielectric constants. Moreover, if e(z) of the media changes on the spatial scale x, and this spatial scale is much smaller than $l_0$ (e.g., in HDBT situations), the second and the third term can dominate in Eq. (77). For such HDBTs, Im(V)<<Re(V), so the wave vector of the resulting SEW solution can be large (k~1/x>>2p/$l_0$) and this SEW can have propagating character (Im(k)<<Re(k)). The very large wave vectors of the SEWs can provide much higher spatial resolution compared to the conventional GPR techniques.

In some implementations, when the underground media has purely imaginary dielectric permittivity e(z)=ie"(z)=is(z)/$e_0$w (where $e_0$ is the dielectric permittivity of vacuum, and the media conductivity s(z) is expressed in practical SI units), similar results can be obtained Im(V)<<Re(V):

$$V = -\frac{i\sigma\omega}{\varepsilon_0 c^2} - \frac{1}{2}\frac{\partial^2 \sigma}{\sigma \partial z^2} + \frac{3}{4}\frac{(\partial \sigma/\partial z)^2}{\sigma^2} \quad (78)$$

Figure 50A:
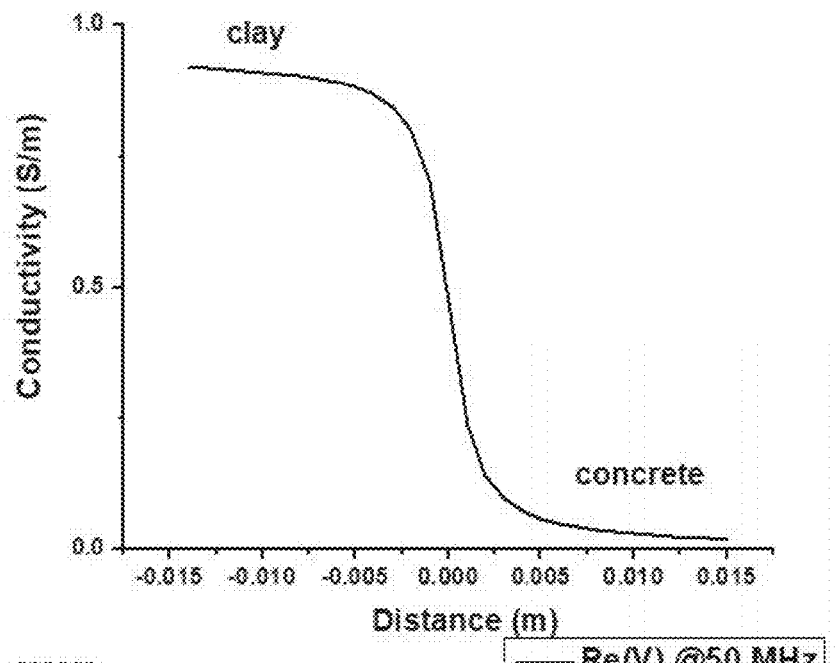
FIGS. 50A-50B show graphs of electric conductivity and effective potential as a function of distance from a concrete-clay interface, in some embodiments.
Figure 50B:
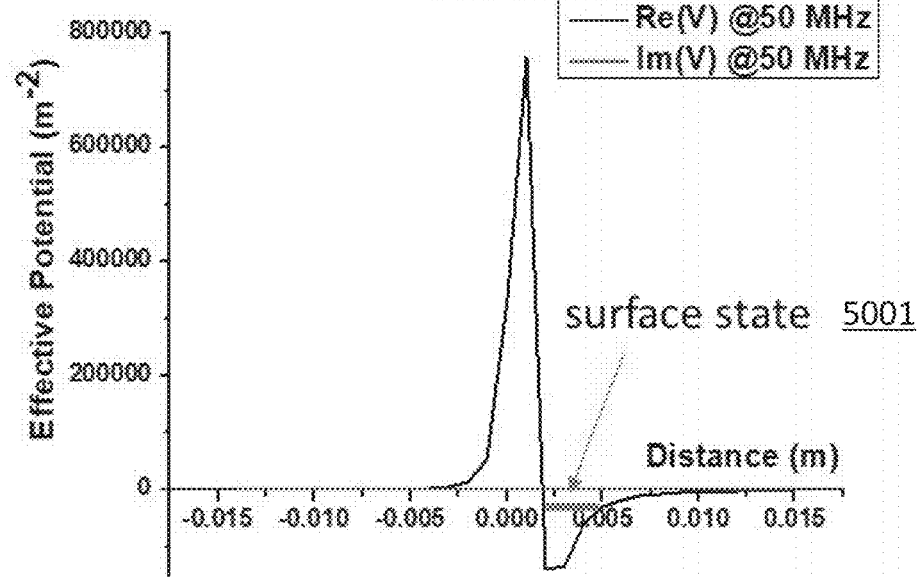
Figure 51:
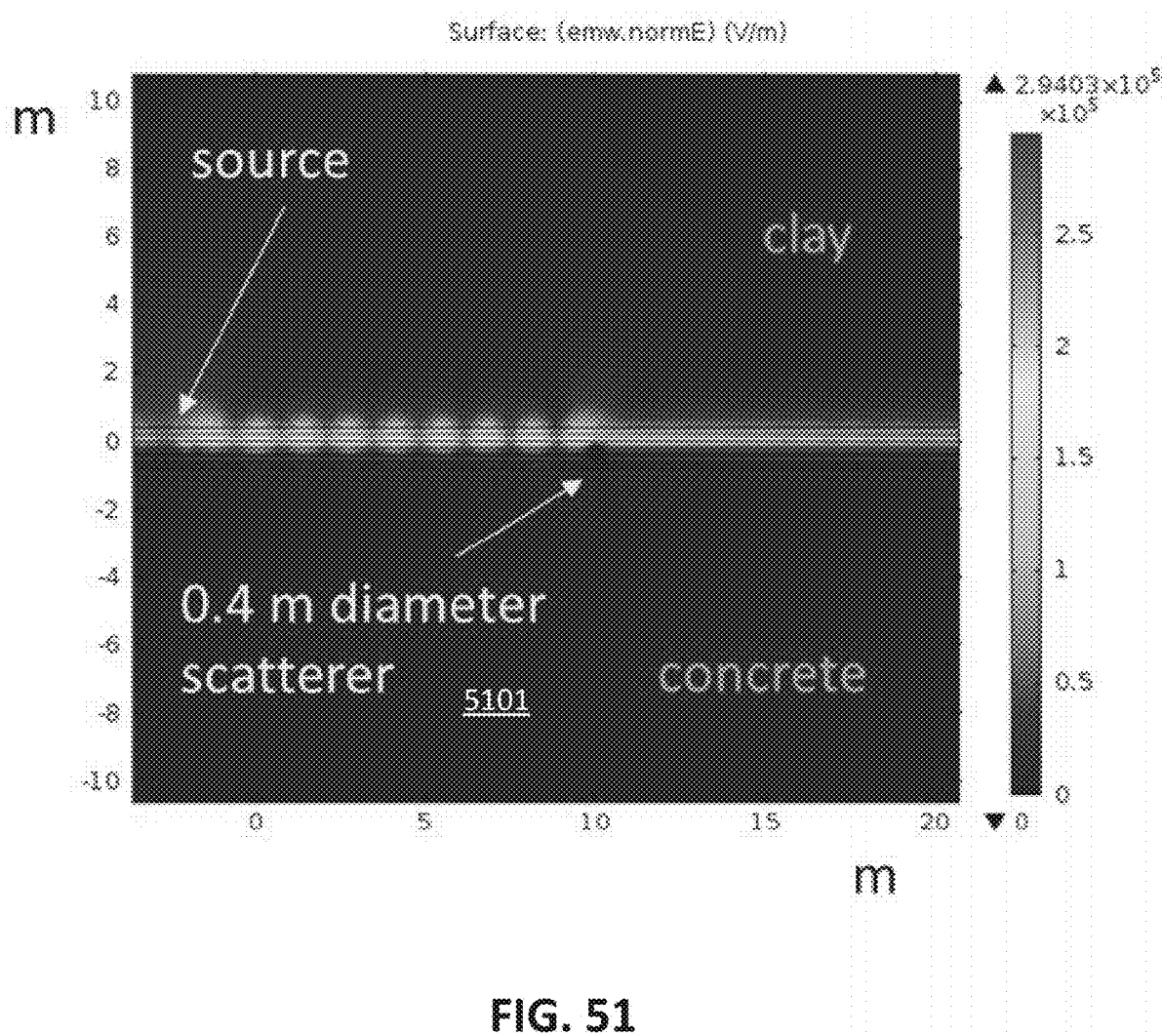
FIG. 51 shows example simulations of SEW propagation along the clay-concrete interface, in some embodiments.

The SEW propagation distance can be much greater than the typical skin depth. FIGS. 50A-50B show graphs of electric conductivity and effective potential as a function of distance from a concrete-clay interface, in some embodiments. The effective potential can be calculated at a frequency of 50 MHz, showing a surface electromagnetic state 5001 at the interface. The SEW can be used in, for example, locating concrete HDBTs underground. FIG. 51 shows example simulations of SEW propagation along the clay-concrete interface, in some embodiments. The SEW reflected from scatterers 5101 may be used to locate objects of interest (e.g., human, weapon, and/or the like) inside HDBTs.

In these embodiments, the surface electromagnetic waves described herein can be used to detect the presence of humans, animals, and other objects or materials underground (in some implementations, even internal to an underground bunker or space.) These methods greatly increase spatial resolution (greater than 10 times better) and penetration depth (greater than 10 times better) compared to conventional GPRs. The underground SEW apparatus can be much more compact in size due to much smaller antenna dimensions (as described with respect to FIGS. 41-48).

Design of a Plasmon/Polariton Antenna (or Radiator)

Figure 52:
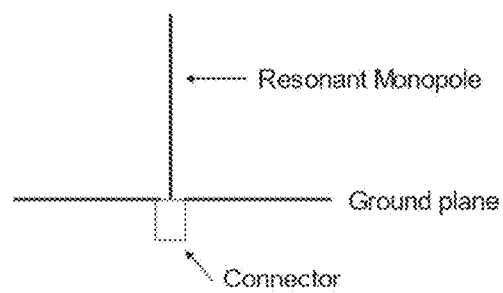
FIG. 52 shows an example schematic design of the SEW antenna having a resonant monopole, in some embodiments.

FIG. 52 shows an example schematic design of the SEW antenna having a resonant monopole, in some embodiments. In some implementations, the antenna (e.g., antenna 601 in FIG. 6 and/or antenna 4801 in FIG. 48) can be a quarter wave resonant monopole, as shown in FIG. 52. The monopole can have a ground plane and can be fed by an RF generator with 50Ω internal impedance. The quarter wave monopole can have a driving point impedance of about 37Ω which can be a match for the internal impedance of the generator (2% of the power can be reflected back to the generator). An antenna is resonant when its driving point impedance is purely real (R): the current and the voltage on the antenna are in phase over most of the length of the antenna. The monopole in FIG. 52 can be radiating in free space and about λ/4 long. The tip of the antenna has a large charge density (no current) and a large voltage set up by the accumulated charges. The impedance of the tip of the antenna can be practically infinite (large voltage/zero current) while the impedance at the feed point is small. This is the impedance transformation caused by the λ/4 length of the monopole which acts as transmission line with its ground plane.

Figure 53:
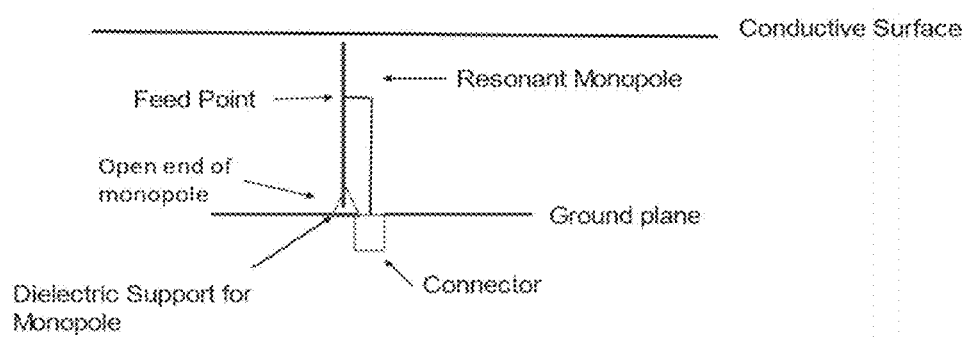
FIG. 53 shows an example schematic design of the SEW antenna having a resonant monopole, in some embodiments.

If the tip of the monopole is placed closed to a metal structure (conductive=low impedance), the capacitive coupling with the metal causes the high impedance of the monopole to collapse to a very low value. At λ/4 from the tip (at the generator), in some implementations, the impedance can be very low and the monopole can cease to radiate. The antenna is resonant so it can support a current and a voltage in phase. This characteristic can be used to make the antenna couple with a metal structure placed at its tip. The feed point for the antenna can be located near the tip of the monopole, yet far enough to have a current and a voltage in the proper ratio (about 50Ω), as shown in FIG. 53. The base of the monopole has a high impedance and can be disconnected from the generator. The generator can be connected to a suitable point along the monopole length. FIG. 53 shows an example schematic design of the SEW antenna having a resonant monopole, in some embodiments.

Figure 54:
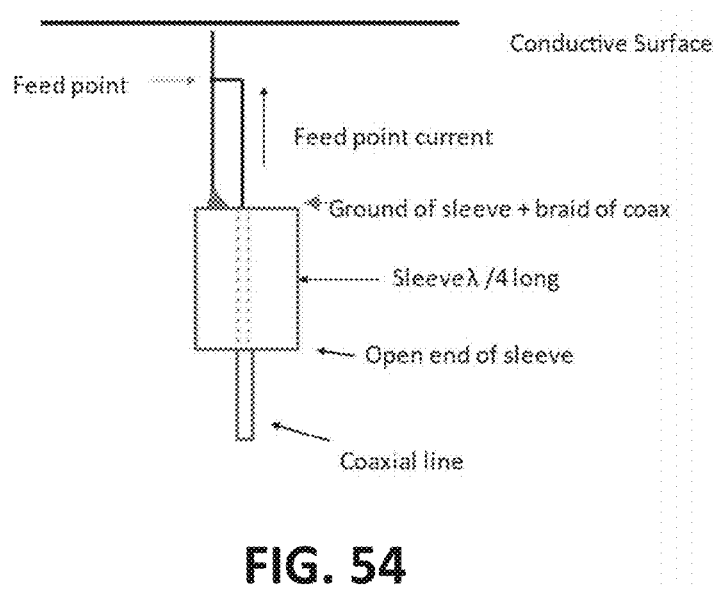
FIG. 54 shows an example schematic design of the SEW antenna having a sleeve dipole, in some embodiments.
Figure 55:
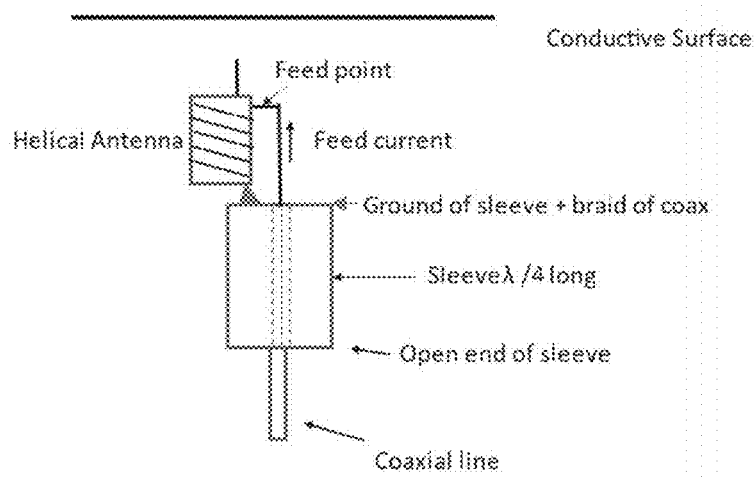
FIG. 55 shows an example schematic design of the SEW antenna having a coiled sleeve dipole, in some embodiments.

FIG. 54 shows an example schematic design of the SEW antenna having a sleeve dipole, in some embodiments. FIG. 55 shows an example schematic design of the SEW antenna having a coiled sleeve dipole, in some embodiments. In some implementations, a dipole can have a sleeve to isolate it from the feeding coaxial line as shown in FIG. 54. When using a helical monopole with its sleeve, the resonant helical winding having a higher charge density near its tip than a monopole, and thus, a higher charge density can be transferred to the conductive surface near the tip, as shown in FIG. 55.

The design of the antenna can enable the transfer of electromagnetic energy to a metal surface. In some implementations, wire antennas, radiating in free space, have a length that is a multiple of a quarter wavelength of the operating frequency. Such wire antennas can have high E-fields at their tips to excite the displacement currents necessary to the radiation process. If the tip is of these radiators is placed near a conducting surface, the E-fields collapse from free space (e.g., coupling in the metal surface nearby) and the antennas can cease to radiate because the low driving point impedance (50Ω) feed point of the antenna is presented now with a high impedance because of the transformation of the low tip impedance through the quarter wavelength of the wire. The antenna current drops to low levels and so is power fed to the radiator.

In some implementations, the polariton exciter can be used if the current on the feed line is very short with respect to wave length, as shown in FIG. 54. The polariton exciter can include a length of line transformer from the tapping point to the feed point. The impedance at the feed point, although real, is higher than 50Ω, so the antenna match to the generator depends on the length of the feed line. In FIG. 55, the resonant helical antenna resonates at a much lower frequency than a monopole, so the line length from the feed to the tapping point is short with respect to the wavelength of the antenna operating frequency. Thus, the impedance at the feed point can be very close to 50Ω. In these feed conditions, the performance of the polariton antenna can be optimized. The antenna is compact and can be used for low frequencies communications.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of the present technology may be implemented using hardware, firmware, software or a combination thereof. When implemented in firmware and/or software, the firmware and/or software code can be executed on any suitable processor or collection of logic components, whether provided in a single device or distributed among multiple devices.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus, comprising:
an antenna; and
a processor operatively coupled to the antenna,
the processor configured to generate an input signal and send the input signal to the antenna,
the antenna configured to, in response to the input signal, transmit first surface electromagnetic signals along an interface between a first medium and a second medium, the antenna configured to receive second surface electromagnetic signals in response to the first surface electromagnetic signals scattered by an object disposed in the first medium,
the processor configured to produce an image of the object based on the first surface electromagnetic signals and the second surface electromagnetic signals.

2. The apparatus of claim 1, wherein: the first medium is seawater; and the second medium is air or seafloor.

3. The apparatus of claim 1, wherein: the antenna is a first antenna;
the processor is configured to send the input signal to a second antenna;
the second antenna configured to transmit third surface electromagnetic signals having a pre-determined phase difference from the first surface electromagnetic signals.

4. The apparatus of claim 1, wherein:
the antenna is included in a set of antennas;
each antenna from the set of antennas is operatively or commutatively coupled with the processor;
each antenna from the set of antennas is commutatively coupled with remaining antennas from the set of antennas via the processor and not via direct connections between that antenna and an antenna from the remaining antennas.

5. The apparatus of claim 1, wherein the first medium is underground.

6. The apparatus of claim 1, wherein the processor is configured to detect electromagnetic properties of the object based on the first surface electromagnetic signals and the second surface electromagnetic signals.

7. The apparatus of claim 1, wherein the antenna is disposed in an impedance-matching antenna enclosure.

8. The apparatus of claim 1, further comprising:
a magnetic mirror to include magnetic dipole moment of the antenna.

9. The apparatus of claim 1, wherein:
the antenna is at least one of a straight wire antenna, a circular loop antenna, a monopole-type antenna, or a dipole-type antenna.

10. The apparatus of claim 1, wherein the antenna is a helical antenna.

11. The apparatus of claim 1, wherein the antenna includes at least one of a resonant monopole, a sleeve dipole, or a coiled sleeve dipole.

12. A method, comprising:
sending, via a processor, an input signal to at least one antenna element from a set of antenna elements;
in response to the input signal, transmitting, by the at least one antenna element, first surface electromagnetic signals along an interface between a first medium and a second medium, a dielectric permittivity of the first medium being greater than a dielectric permittivity of the second medium;
receiving, by the at least one antenna element, second surface electromagnetic signals in response to the first surface electromagnetic signals reaching an object disposed in the first medium; and
analyzing, by the processor, the first surface electromagnetic signals and the second surface electromagnetic signals to extract information associated with the object.

13. The method of claim 12, wherein:
the at least one antenna element is a first antenna element;
the method further includes:

sending, by the processor, the input signal to a second antenna element from the set of antenna elements; and transmitting, via the second antenna element, third surface electromagnetic signals having a pre-determined phase difference from the first surface electromagnetic signals.

14. The method of claim 12, wherein:

each antenna element from the set of antenna elements is operatively or commutatively coupled with the processor; and each antenna element from the set of antenna elements is commutatively coupled with remaining antenna elements from the set of antenna elements via the processor and not via direct connections between that antenna element and an antenna element from the remaining antenna elements.

15. The method of claim 12, wherein:

the first medium includes clay material underground; and the second medium includes concrete material.

16. The method of claim 12, wherein:

the interface between the first medium and the second medium includes a gradual transition layer between graphite and graphite-based compound.

17. The method of claim 12, further comprising:

detecting, by the processor, electromagnetic properties of the object based on the first surface electromagnetic signals and the second surface electromagnetic signals.

18. The method of claim 12, wherein the set of antenna elements is disposed in an impedance-matching antenna enclosure.

19. The method of claim 12, wherein:

the at least one antenna element is at least one of a straight wire antenna, a circular loop antenna, a monopole-type antenna, a dipole-type antenna, or a compact helical antenna.

20. An apparatus, comprising:

a set of antenna elements disposed in an impedance-matching antenna enclosure; and a processor operatively coupled to the set of antenna elements, the processor configured to send an input signal to at least one antenna element from the set of antenna elements, the at least one antenna element configured to, in response to the input signal, transmit first surface electromagnetic signals along an interface between a first medium and a second medium, a dielectric permittivity of the first medium being greater than a dielectric permittivity of the second medium, the at least one antenna element configured to receive second surface electromagnetic signals in response to the first surface electromagnetic signals reaching an object disposed in the first medium, the processor configured to analyze the first surface electromagnetic signals and the second surface electromagnetic signals to extract information associated with the object.

* * * * *